US012774015B2

(12) United States Patent
Bachman

(10) Patent No.: US 12,774,015 B2
(45) Date of Patent: Oct. 27, 2026

(54) RAIL BASED DIRECT AIR CARBON CAPTURE SYSTEM AND METHOD

(71) Applicant: CO2Rail Company (a Wyoming Company), Oberlin, OH (US)

(72) Inventor: Eric Bachman, Oberlin, OH (US)

(73) Assignee: CO2Rail Company, Houston, TX (US)

( * ) Notice: Subject to any disclaimer, the term of this patent is extended or adjusted under 35 U.S.C. 154(b) by 935 days.

(21) Appl. No.: 17/737,967

(22) Filed: May 5, 2022

(65) Prior Publication Data

US 2022/0355832 A1 Nov. 10, 2022

Related U.S. Application Data

(60) Provisional application No. 63/201,591, filed on May 5, 2021.

(51) Int. Cl.

*B61D 15/00* (2006.01)
*B01D 53/62* (2006.01)
*B61D 43/00* (2006.01)

(52) U.S. Cl.

CPC ............. *B61D 15/00* (2013.01); *B01D 53/62* (2013.01); *B61D 43/00* (2013.01); *B01D 2221/08* (2013.01); *B01D 2257/504* (2013.01)

(58) Field of Classification Search

CPC ........ B61D 15/00; B61D 43/00; B01D 53/62; B01D 2221/08; B01D 2257/504
USPC .......................................................... 423/220
See application file for complete search history.

(56) References Cited

U.S. PATENT DOCUMENTS

| | | | | |
|---|---|---|---|---|
| 6,973,880 | B2 | 12/2005 | Kumar | |
| 7,891,302 | B2 | 2/2011 | Bachman | |
| 8,196,518 | B2 | 6/2012 | Bachman | |
| 9,751,039 | B2 | 9/2017 | Gebald et al. | |
| 2009/0322099 | A1 | 12/2009 | Labankoff | |
| 2011/0067390 | A1 * | 3/2011 | Cook ........................ | F02G 5/04 60/320 |

(Continued)

FOREIGN PATENT DOCUMENTS

| | | | |
|---|---|---|---|
| EP | 2665544 | A1 | 11/2013 |
| WO | 2015177361 | A1 | 11/2015 |

(Continued)

OTHER PUBLICATIONS

Association of American Railroads (AAR). (Mar. 2021). Freight Rail & Preserving the Environment. Retrieved from aar.org: https://www.aar.org/wp-content/uploads/2020/06/AAR-Sustainability-Fact-Sheet.pdf, 2 pages.

(Continued)

*Primary Examiner* — Anita Nassiri-Motlagh
(74) *Attorney, Agent, or Firm* — Calfee, Halter & Griswold LLP

(57) ABSTRACT

Systems and methods are described for the direct air capture and removal of Carbon Dioxide Gas ($CO_2$) from ambient environmental air at the Gigaton scale and the powering thereof with renewable energy sources utilizing Rail Transportation Equipment. Additional systems and methods are described for the removal of Emissions from Locomotives and removal of Localized Air-Pollution from urban areas and the powering thereof with renewable energy sources also utilizing Rail Transportation Equipment.

19 Claims, 20 Drawing Sheets

*Enviro-Rail Car [Left-Front View]*

(56) References Cited

U.S. PATENT DOCUMENTS

| | | | | |
|---|---|---|---|---|
| 2019/0120106 | A1* | 4/2019 | Hamad | F01N 5/02 |
| 2021/0129873 | A1* | 5/2021 | Cook | B61D 43/00 |

FOREIGN PATENT DOCUMENTS

| | | | | | |
|---|---|---|---|---|---|
| WO | 2017009241 | A1 | | 1/2017 | |
| WO | WO-2020185507 | A1 | * | 9/2020 | E03B 3/28 |

OTHER PUBLICATIONS

Atlas Copco Compressors, LLC. (2021). Retrieved from https://www.atlascopco.com/en-us/compressors/products/energy-recovery.
Chemical Reviews. (2016). https://pubs.acs.org/doi/10.1021/acs.chemrev.6b00173.
Climeworks. (2021). https://climeworks.com/co2-removal.
Keith, D. E. (2018). A process for capturing CO from the atmosphere. Joule, vol. 2(No. 8), 1573-1594.
Jiang, L. et al. (Mar. 25, 2020). Comparative analysis on temperature swing adsorption cycle for carbon capture by using internal heat/mass recovery. Applied Thermal Engineering, vol. 169.
Lackner, K., Ziock, H.-J., & Grimes, P. (1999). Carbon Dioxide Extraction from Air: Is It An Option? US Department of Energy—Los Alamos National Lab., NM.
Younas, M., M. S. (2016). Feasibility of CO2 adsorption by solid adsorbents: a review on low-temperature systems. International Journal of Environmental Science and Technology (Abstract).
Stauffer, Nancy W., Mit Energy Initiative. (Jul. 9, 2020). A new approach to carbon capture. Retrieved from MIT News: https://news.mit.edu/2020/new-approach-to-carbon-capture-0709.
National Academies of Sciences, E. a. (2019), Negative Emissions Technologies and Reliable Sequestration: A Research Agenda. Washington, DC: The National Academies Press (36 pages).
National Oceanic and Atmospheric Administration. (Aug. 14, 2020). Climate Change: Atmospheric Carbon Dioxide. Retrieved from Climate.gov: https://www.climate.gov/news-features/understanding-climate/climate-change-atmospheric-carbon dioxide.
Socolow, R., e. a. (2019). http://www.cchem.berkeley.edu/molsim/personal_pages/berend/articles/2011/direct-air-capture-of-co2.html.
Susteon. (2020). A Rapid Temperature Swing Adsorption Carbon Capture Technology. Retrieved from susteon.com: https://susteon.com/project/a-rapid-temperature-swing-adsorption-carbon-capture-technology-for-optimal-operation-of-a-fossil-power-plant/.
Svante Inc. (2020). Retrieved from svanteinc.com: https://svanteinc.com/carbon-capture-solutions/.
The National Law Review—Eric L. Christensen, Brook J. Detterman. (Jan. 28, 2021). Treasury Department Finalizes Regulations to Govern 45Q Tax Credits for Carbon Capture and Sequestration. The National Law Review, vol. XI(No. 27). Retrieved from https://www.natlawreview.com/article/treasury-department-finalizes-regulations-to-govern-45q-tax-credits-carbon-capture.
International Search Report and Written Opinion from PCT/US2022/027944 dated Oct. 4, 2022 (23 pages).
International Preliminary Report on Patentability from PCT/US2022/027944 dated Nov. 16, 2023 (15 pages).

* cited by examiner

Figure 1[1]

Carbon removal methods can be compared based on cost, potential rate of carbon removal, and potential for total, cumulative storage of carbon dioxide, as well as in terms of side effects and risks. Estimates for some prominent methods' cost and potential are given below.

| | |
|---|---|
| COST | Cost of removing one ton of $CO_2$ and sequestering it ($/tCO2) |
| RATE | Amount of $CO_2$ that could be removed per year by 2050 (GtCO2/yr) |
| CUMULATIVE | Total amount $CO_2$ that could be removed in this century (GtCO2) |

Note that carbon removal methods that use the same kind of space, such as arable land, could either compete with or complement one another, depending on the details of location, implementations, etc.

INDUSTRIAL FACILITIES

DACCS (Direct Air Capture with Carbon Storage): Capture $CO_2$ from the atmosphere by chemical means and sequester it underground.

| COST | RATE | CUMULATIVE |
|---|---|---|
| 100–300 | 0.5–5 | 100–1000+ |

*BECCS, Enhanced Mineralization, and Ocean Alkalinization would also rely on industrial facilities.*

OPEN OCEANS

OCEAN ALKALINIZATION: Spread lime or other alkaline substances over the ocean to absorb $CO_2$ and counteract ocean acidification.

| COST | RATE | CUMULATIVE |
|---|---|---|
| 40–260 | N/A | N/A |

*Enhanced Mineralization could also be conducted in the open ocean. Proposals for ocean fertilization also target the open ocean.*

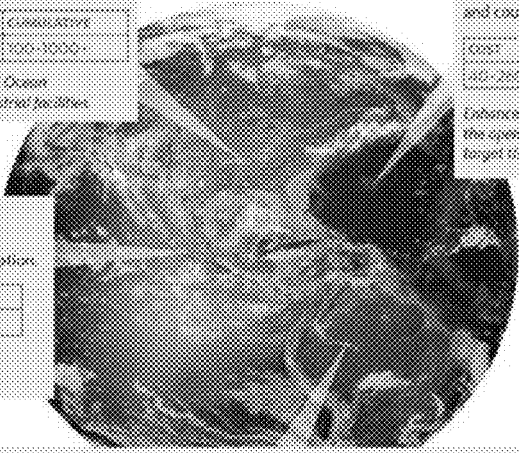

COASTAL AREAS

BLUE CARBON: Manage coastal wetlands and seagrass meadows to enhance their $CO_2$ absorption.

| COST | RATE | CUMULATIVE |
|---|---|---|
| N/A | N/A | N/A |

*Ocean Alkalinization could also be conducted at coastal sites.*

ARABLE LAND

BECCS (Bioenergy with Carbon Capture and Storage): Grow or collect biomass to produce biofuels, heat, or electricity and then capture and sequester the $CO_2$ released in the process.

| COST | RATE | CUMULATIVE |
|---|---|---|
| 100–200 | 0.5–5 | 100–1170 |

SOIL CARBON SEQUESTRATION: Increase soils' capacity to absorb carbon through practices such as no-till agriculture and crop rotation.

| COST | RATE | CUMULATIVE |
|---|---|---|
| 0–100 | 2–5 | 104–130 |

ENHANCED MINERALIZATION: Spread rock powder on land, where it reacts with $CO_2$ in the air, or expose it to $CO_2$-rich fluids.

| COST | RATE | CUMULATIVE |
|---|---|---|
| 50–200 | 2–4 | 100–367 |

BIOCHAR: Grow or collect biomass, convert it to charcoal, and bury it.

| COST | RATE | CUMULATIVE |
|---|---|---|
| 30–120 | 0.5–2 | 78–477 |

AFFORESTATION/REFORESTATION: Plant or restore forests, which absorb and hold carbon as they grow.

| COST | RATE | CUMULATIVE |
|---|---|---|
| 5–50 | 0.5–3.6 | 80–260 |

Estimates come from Fuss et al. 2018, "Negative Emissions—Part 2: Costs, Potentials, and Side Effects," *Environmental Research Letters* 2018. https://doi.org/10.1088/1748-9326/aabf9f. Estimates of cost and potential rate of carbon removal reflect the experts' assessments in Fuss et al. 2018 based on their review of existing studies, except for the cost of ocean alkalinization, which reflects the full range in the literature. See http://www.co2removal.org.

*Large-Scale DAC Deployment – Climeworks (Switzerland)*

*Exemplary Large-Scale DAC Deployment – Climeworks*

Fig 4.

| Investigator | Capturing method | Sorbent | Regeneration | Application | Maximum capacity (ton/year) | References |
|---|---|---|---|---|---|---|
| Carbon Engineering Company | Absorption | KOH solution | Calcination process (High temperature) | Synthetic fuels | 1,000,000**** | Keith et al., 2018 |
| Climeworks Company* | Adsorption | amine based porous sorbents | High temperature | Greenhouse, Synthetic fuels | 900 | Climeworks press release, 2017; Marshall, 2017 |
| Global Thermostat Company | Adsorption | amine based monoliths | High temperature and low pressure (vacuum) | Beverage and food | 4,000**** | Li et al., 2016; Chichilnisky, 2018 |
| Arizona State University and Columbia University*** | Adsorption | Anionic exchange resin | High moisture | – | Not declared | Lackner, 2009; Wang et al., 2011 |
| Others**: VTT, the Oak Ridge Laboratory, The US Naval research lab, X and PARC, European Space Agency, Infinitree | Adsorption/ Absorption | Amine-functionized polymer/Aqueous amino acid solutions/ Ion exchange | High temperature/low pressure/precipitation/ | Fuels/longer space mission/Greenhouse | <1 | Sandalow et al., 2018 |

*First company that commercially captured $CO_2$ from air, producing around 900 tCO2/year for a greenhouse.
**Produced $CO_2$ at very small scale.
***Produced $CO_2$ at low concentration (5%).
****They claimed this as their predicted production capacity.

*Current DAC Deployments*

Fig 5.

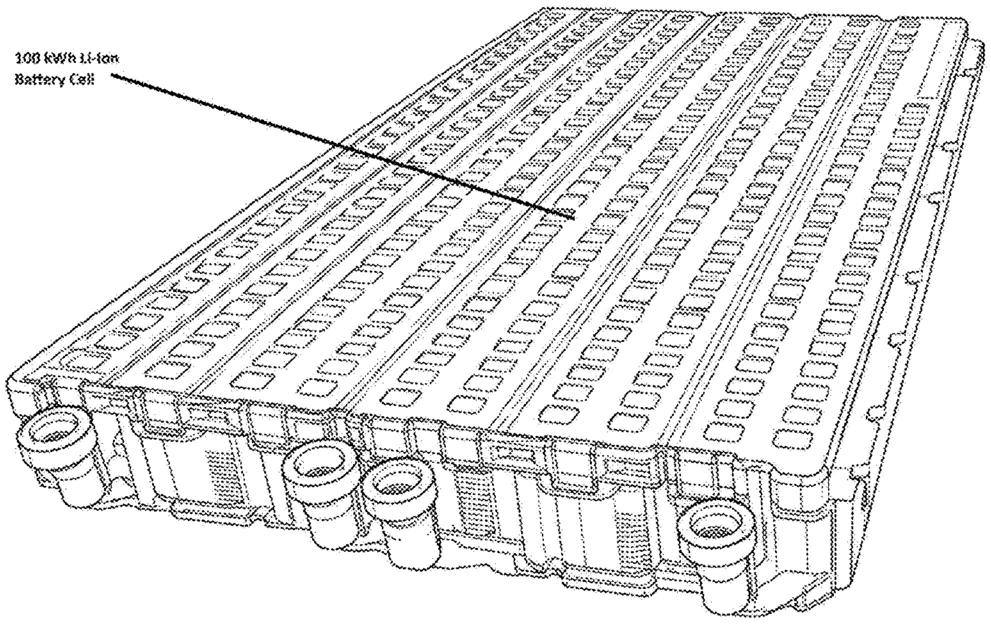

*Co2Rail Car Battery Array – Exemplary Battery Cell*

Figure 6[5]
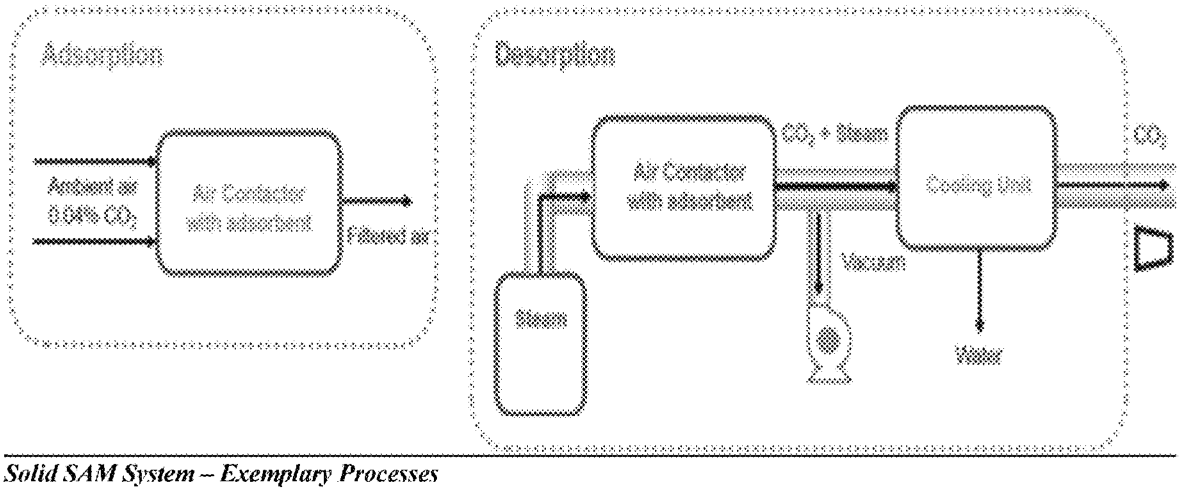
*Solid SAM System – Exemplary Processes*
Figure 7[6]
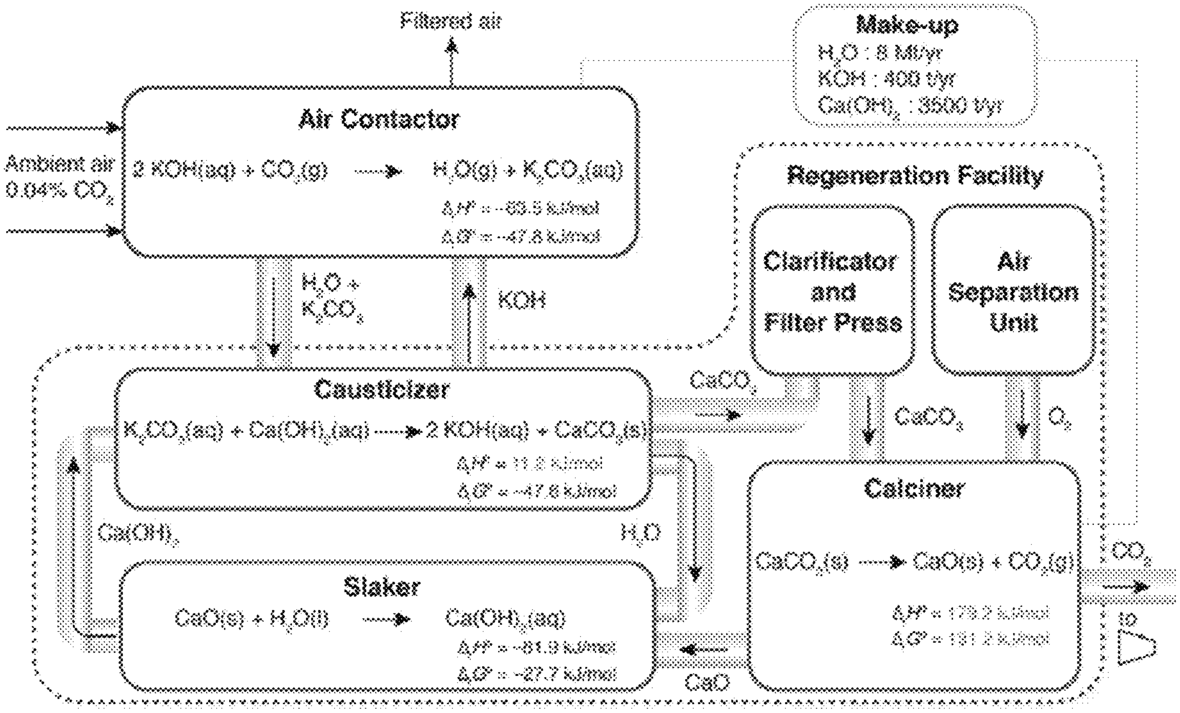
*Liquid SAM System – Exemplary Processes*

Fig 8. [1]
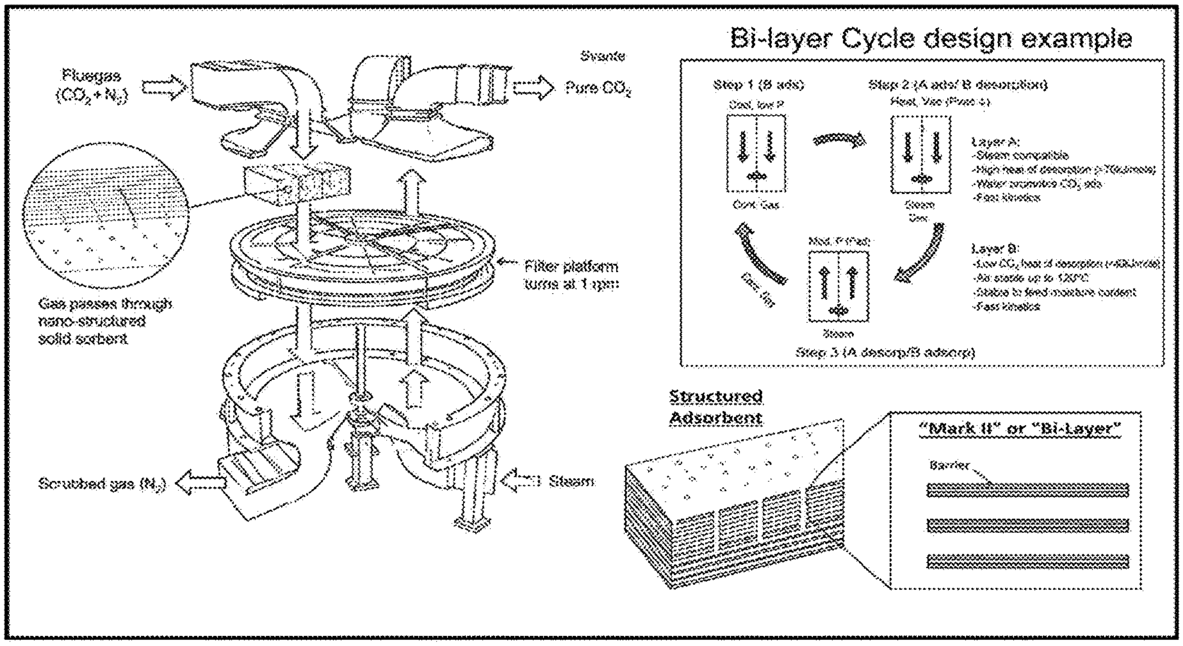
*Rotary SAM System – Exemplary Scale View*
Fig 9. [1]
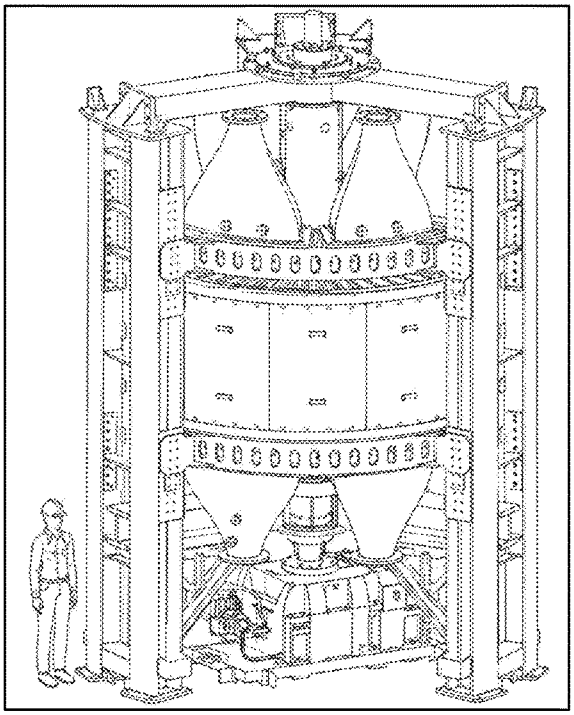
*Rotary SAM System – Exemplary Scale View*

Figure 10[9]
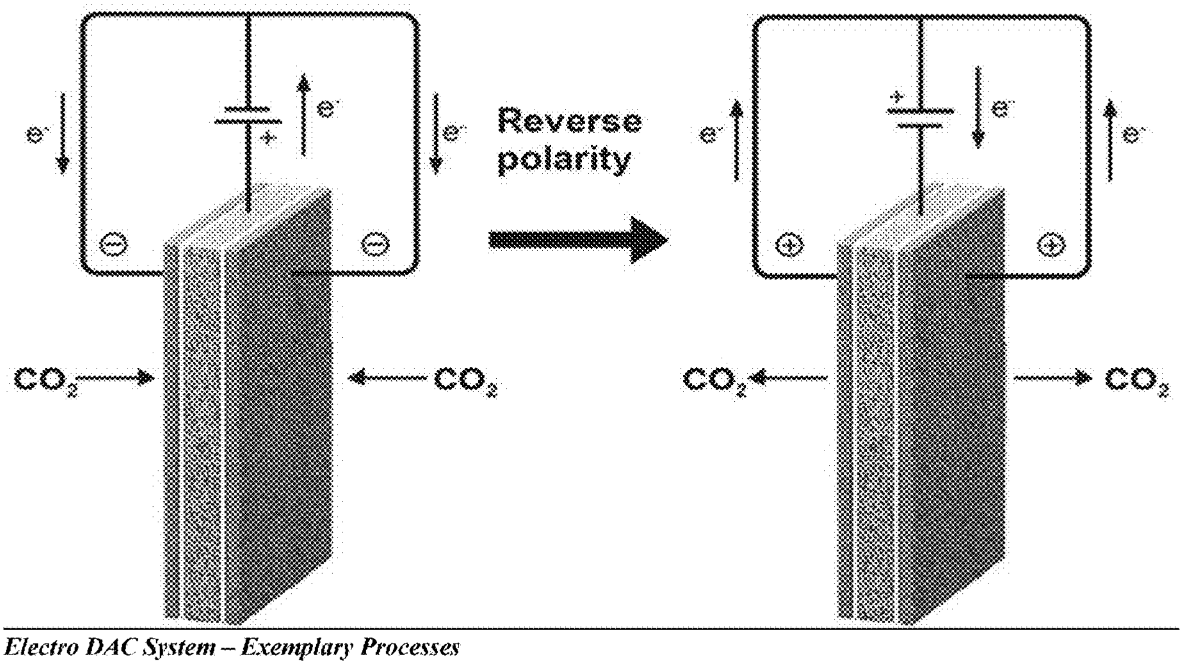
*Electro DAC System – Exemplary Processes*

*Enviro-Rail Car [Left-Front View]*

*Enviro-Rail Car [Left-Front View]*

*ERDB Locomotive [Front-Right View]*

*ERDB Locomotive [Left View]*

*ERDB Locomotive – Dynamic Brake Resistor Grids, Fan & Motor*

*ERDB Locomotive – Regenerative Dynamic Brake Power Cable Umbilicals to CDAC-Car*

*LEM-Car – Locomotive Exhaust Transfer Array or "LETA" [Right View]*

*LEM Car – Locomotive Exhaust Transfer Array or "LETA" [Front-Left View]*

*LEM-Car – Locomotive Exhaust Direct Array or "LEDA" [Left View]*

*LEM Car – Locomotive Exhaust Transfer Array or "LETA" [Front-Left View]*

*CDAC-Car – Standard Configuration [Left View]*

*LEM-Car – Locomotive Exhaust Direct Array or "LETA" [Right View]*

*UEM-Car – Standard Configuration [Right View]*

*Enviro-Car – Major System Locations [Left View]*

*Enviro-Car - Front Compartment & Exemplary Equipment [Front View]*

*Enviro-Car – Front Intake: Inlet Deflector*

*Enviro-Car – Front Intake: Debris Outlet*

*Co2Rail-Car – Empty Collection Chamber & Opened Access Door [Left View]*

*Co2Rail-Car – Exemplary Collection Chamber Configuration (Longitudinally Arranged SAM Cells) [Left View]*

*Co2Rail-Car – Exemplary Collection Chamber Configuration (Laterally Arranged SAM Cells) [Left View]*

*Co2Rail-Car – Exemplary Collection Chamber Configuration (Rotating Svante Adsorption/Desorption Device) [Left View]*

*Enviro-Car – Collection Chamber Interior ($CO_2$ Main Reservoir) [Rear-Facing View]*

*Enviro-Car – Exemplary Rear Configuration ($CO_2$ Liquification Compressor, Heat Exchanger & Other Rear Components) [Rear-Left View]*

*CDAC Tank Car [Front-Left View]*

*Enviro-Rail Consist – Lite-Deployment (ERDB Locomotive [1], Co2Rail Cars [2]) [Front-Right View]*

*Enviro-Rail Consist (ERDB Locomotives [2], LEM Cars [2], UEM-Car [1], Co2Rail Cars [3]) [Front-Left View]*

*Enviro-Rail Consist (Co2Rail Cars [3], UEM-Car [1], LEM Cars [2], ERDB Locomotives [2]) [Rear-Left View]*

RAIL BASED DIRECT AIR CARBON CAPTURE SYSTEM AND METHOD

CROSS-REFERENCE TO RELATED APPLICATIONS

This application claims priority to, and any other benefit of, U.S. Provisional Patent Application Ser. No. 63/201,591, filed on May 5, 2021, and entitled Gigaton-Scale, Rail-Based Direct Air Carbon Capture and Air-Pollution Mitigation Device, System and Method, which is hereby incorporated by reference in its entirety.

TECHNICAL FIELD

The present invention relates generally to the direct capture and storage, as well as utilization of Carbon Dioxide Gas ("CO2") from ambient environmental air at the Gigaton level and more particularly to systems and methods for achieving a carbon-negative mode of transportation that extracts $CO_2$ from the environment during normal operation of a vehicle, such as, for example, a train.

BACKGROUND

Since the beginning of the industrial age, humankind has imparted more than 440 (±20) Gigatons (Billion) tonnes of Carbon Dioxide into our environment through direct sources such as power generation, manufacturing, transportation, etc. Indirect anthropogenic Carbon Dioxide has also come from the destruction of natural carbon sinks such as rainforests and artic tundra. This has created a level of CO2 saturation in ambient environmental air that is the highest it has been in over 800,000 years—currently between 390 and 400 ppm. Since Carbon Dioxide is a potent greenhouse gas, this unprecedented increase will undoubtedly contribute to global warming and all the comorbid negative consequences thereof for humanity—both known and unknown.

Carbon removal, also known as Carbon Dioxide Removal (CDR), is the process of capturing Carbon Dioxide from the atmosphere and locking it away for centuries or millennia in plants, soils, oceans, geological features, or long-lived products like cement. Scientists have proposed many different methods of carbon removal. Some of these are already in use at relatively small scales, whereas others remain in the early stages of research and development. Technologies and practices for implementing carbon removal are often called negative emissions technologies or NETs.

Carbon removal is important because somewhere between 15%-40% of the CO2 that humanity emits will remain in the atmosphere for up to a thousand years, with 10-25% of it persisting for tens of thousands of years. Removing and sequestering that CO2 could permanently reduce climate risk by slowing or even reversing climate change. It will be very difficult to meet ambitious climate change mitigation goals without large-scale carbon removal.

Carbon removal is set to grow in visibility and importance, particularly as the U.S. Government considers the findings of a new National Academy of Sciences report arguing for a carbon removal research agenda and the international community considers carbon removal as part of rule-making under the Paris Agreement on climate change.

In the 2015 Paris Agreement, the international community committed itself to "holding the increase in the global average temperature to well below 2° C. above preindustrial levels and pursuing efforts to limit the temperature increase to 1.5° C." In their Fifth Assessment Report, the Intergovernmental Panel on Climate Change (IPCC) examined 116 scenarios in which society is likely to meet that 2° C. goal and found that 101 of them involve net negative emissions later this century, meaning that society would be removing more carbon from the atmosphere than it is emitting. The IPCC's Special Report on Global Warming identifies Carbon Removal as crucial to meeting the 1.5° C. target and is only feasible through very large-scale carbon removal projects.

SUMMARY

Trains operating on both diesel and electrified lines with direct-air capture and carbon storage systems powered by energy captured from an energy capture system and methods of operating the same are described herein.

An exemplary train includes an energy capture system for generating electrical power and a carbon capture train car. The carbon capture train car includes an air intake, a direct-air carbon capture system in fluid communication with the air intake, an energy storage device for storing electrical power received from the energy capture system via a power transfer interface and for providing electrical power to the direct-air carbon capture system, and a carbon dioxide storage container for storing carbon dioxide compressed by the compressor of the direct-air carbon capture system. The direct-air carbon capture system includes a collection chamber, a desorption chamber, and a compressor.

An exemplary method of capturing and storing atmospheric carbon dioxide includes steps of attaching a carbon capture train car to a locomotive of both diesel and electrified trains, separating carbon dioxide from air flowing through the air intake via a direct-air carbon capture system of the carbon capture train car, powering the direct-air carbon capture system via energy generated by an energy capture system of the train, and storing the separated carbon dioxide in a carbon dioxide storage device. The carbon capture train car comprising an air intake that is in fluid communication with the direct-air carbon capture system.

BRIEF DESCRIPTION OF FIGURES

FIG. 1 is an illustration of different carbon removal methods.

FIG. 4 is a representative chart of current DAC projects and details thereof.

FIG. 5 is an exemplary photograph of an Enviro-Car Battery Array Battery Cell.

FIG. 6 is an illustration of the basic steps, general processes and/or exemplary components in most Solid SAM carbon removal methods.

FIG. 7 is an illustration of the basic steps, general processes and/or exemplary components in most Liquid SAM carbon removal methods.

FIG. 8 is an illustration of the basic steps, general processes and/or exemplary components in most Rotary SAM carbon removal methods.

FIG. 9 is an illustration of the scale and exterior design of an exemplary Rotary SAM carbon removal device.

FIG. 10 is an illustration of the basic steps, general processes and/or exemplary components in most Electro-DAC carbon removal methods.

DETAILED DESCRIPTION

Figure 2:
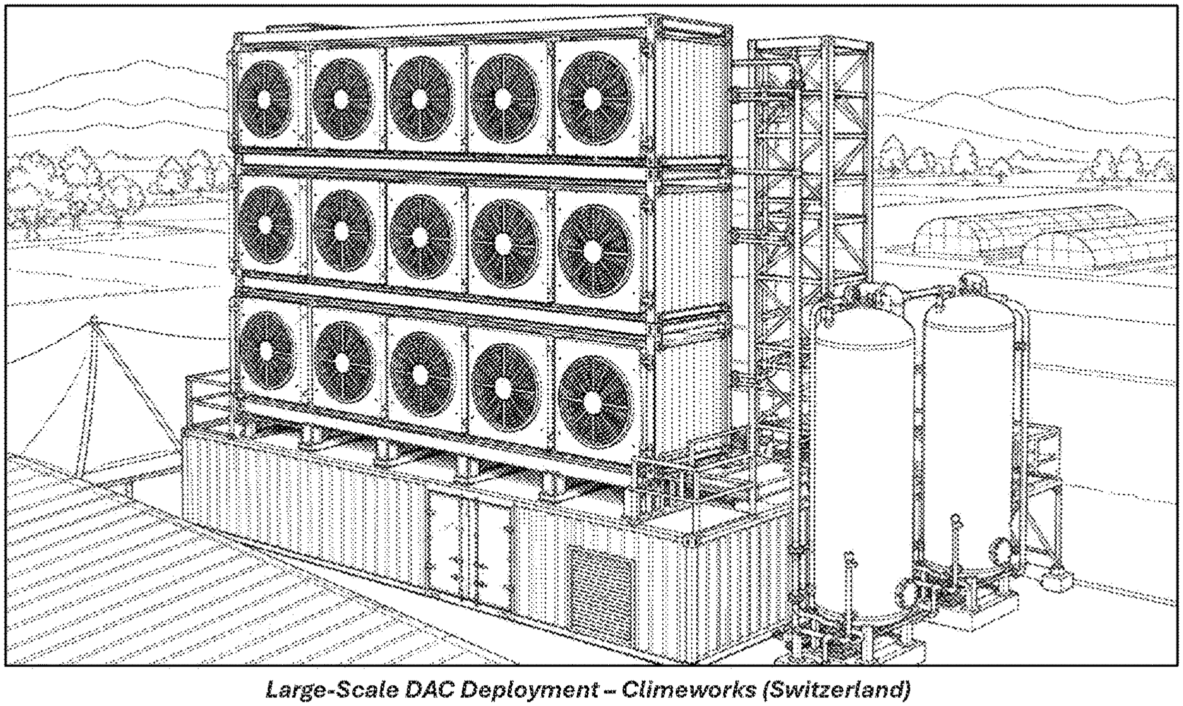
FIG. 2 is an exemplary photograph of a current Climeworks DAC deployment located in Switzerland.
Figure 3:
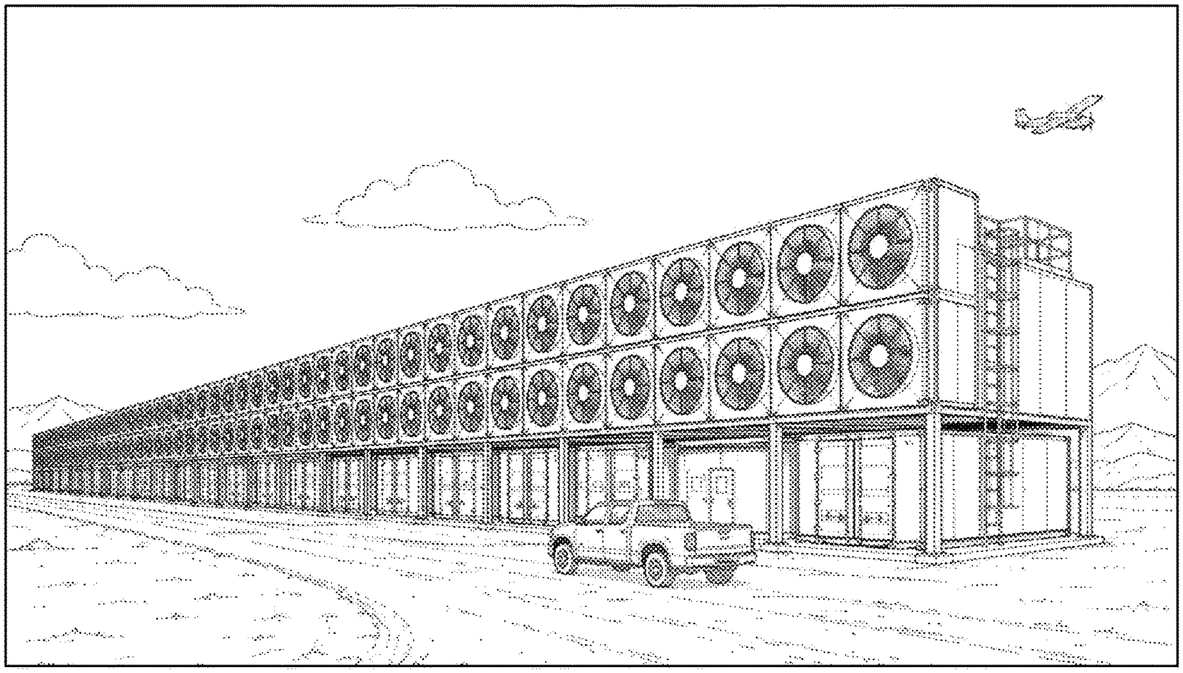
FIG. 3 is an exemplary illustration of a proposed large-scale Climeworks DAC deployment.

This detailed description merely describes exemplary embodiments of the invention and is not intended to limit the scope of the claims in any way. Indeed, the invention as claimed is broader than and unlimited by the preferred embodiments, and the terms used in the claims have their full ordinary meaning, unless an express definition is provided herein.

This invention relates to the direct capture and storage of anthropogenic Carbon Dioxide Gas ("$CO_2$") from ambient environmental air at the Gigaton level and a related energy capture system for powering the direct capture of CO2 that will transform Rail Transportation into the world's first large-scale, carbon-neutral mode of transportation. Taken together, these separate two elements create the world's first overall carbon-negative mode of transportation and, correspondingly, a large-scale answer to the deleterious issues related to greenhouse gas accumulation and global warming. An example of an energy capture system suitable for this purpose is a regenerative braking system that is described in further detail below.

The embodiments described herein remove excess CO2 from ambient environmental air by Direct Air Capture ("DAC") utilizing the Rail Transportation network, Rail Transportation infrastructure and Rail equipment which is otherwise in regular service. This technology is primarily powered by the excess energy created during the Regenerative Dynamic Braking of Freight or Passenger Trains but is also be powered by other means such as Photovoltaic Cells mounted atop the Train's long stretch of railcars or Track/Catenary electrification.

In a similar way, another embodiment described herein removes the CO2 emissions from the Locomotive exhaust by Point-Source Capture ("PSC") and, as a result, create a truly carbon-neutral mode of large-scale transportation.

Yet another embodiment described herein can be deployed in Urban Centers that experience Poor Air Quality where it can be configured to remove Particulate Matter (including Black Carbon), Ground-Level Ozone, Nitrogen Dioxide, Sulfur Dioxide and/or Carbon Monoxide and, as a result, help mitigate this global health crisis and improve lives.

An example of a train according to the present invention includes an energy capture system for generating electrical power and an atmosphere processing train car. The atmosphere processing train car includes an air intake, a separation system in fluid communication with the air intake, and an energy storage device for storing electrical power received from the regenerative braking system via a power transfer interface and for providing electrical power to the separation system, and a storage container for storing at least one of the carbon dioxide or particulate pollution separated from the air by the separation system. The separation system is configured to separate at least one of carbon dioxide or particulate pollution from the air flowing through the air intake. The separation system can be a filter system for removing particulate or can be a direct-air carbon capture system configured to remove not less than about 5 kilograms of carbon dioxide per mile traveled by the train, or about 5 to about 20 kilograms per mile traveled, or about 17.5 kilograms per mile traveled.

It is important to note that this technology is designed to be added to already running Freight or Passenger Trains in regular service as they would otherwise normally do. It involves only the minimum addition of one extra railcar to Trains that sometimes consist of 100 or more railcars.

At a maximum with ten additional Carbon Capture Railcars, one Enviro-Rail system is capable of removing the yearly Carbon Dioxide emissions of nearly 22,000 automobiles.

If deployed globally, in only those Countries with more than one-billion tonne-kilometers in Rail traffic per, the Enviro-Rail System is capable of removing Carbon Dioxide from the ambient environmental air at the multiple giga-tonne-scale every year.

As Rail Transportation grows and as Direct Air Capture media improves, it is estimated that Enviro-Rail could be capable of removing nearly 15 Gigatons of Carbon Dioxide per year by 2050. This assumption is based upon a 3.5% yearly increase in rail traffic and a 2.5% yearly increase in Direct Air Capture media and other system productivities and/or efficiencies. Given that Rail—with the technology herein disclosed—becomes the world's first and only conceivable large-scale carbon-negative mode of transportation, a 2.5% annual growth rate could perhaps be grossly understated as would be, likewise, any future carbon capture projections. In fact, with these same growth and improvement assumption, if just 30% of truck transport was diverted to Rail, perhaps 20 Gigatons of Carbon Dioxide per year could be removed from our atmosphere by 2050. This is in addition to the CO2 emission reductions that would come from Rail Transport becoming a true carbon-neutral mode of transport in conjunction to a de facto carbon sink.

The technology described herein is designed to remove anthropogenic Carbon Dioxide from all emission sources wherever and whenever they may have occurred. In essence, this invention brings Hybrid Rail Transportation Technology to bear on the global anthropogenic CO2 problem in one high-capacity, scalable, efficient, environmentally sound, no-footprint, cost effective, modular and upgradable design that can actually make a meaningful, gigaton-scale carbon-negative impact on the problem of global warming.

It is important to note, that while carbon removal might play an important role in fighting climate change, carbon removal is not nor should be viewed as a replacement or reprieve from the urgent need to drastically reduce global greenhouse gas emissions and develop alternatives to carbon-heavy technologies.

Direct Air Capture and Carbon Storage ("DACCS" or "DAC") is an approach to carbon removal in which mechanical systems capture Carbon Dioxide directly from the atmosphere and was first proposed by Lackner, et al. in 1999. DAC is related to the more common "site-specific" carbon removal that has been in industrial use for many years—namely in industries such as power generation, cement processing, chemical production, etc. This Point-Source Carbon Capture and Storage (PSCCS) is a well-proven technology that has gone far in drastically reducing or eliminating carbon emissions from some of the most notorious historic emitters.

It should be noted that, although DACCS is generally evaluated in comparisons against Point-Source gas capture, they are two different technologies with differing end goals, whereby DACCS is meant to skim or extract CO2 from the atmosphere while Point-Source gas capture is meant to scrub or purify CO2 from an exhaust gas. Additionally, the environmental community is increasingly not considering DACCS and conventional CO2 capture from large point sources as either/or technologies, with many suggesting their development in parallel. When considering that roughly half of annual CO2 emissions are derived from these distributed sources, it is obvious why something other than solely point-source capture must be considered to truly impact anthropogenic emissions.

Direct air carbon capture produces a stream of pure CO2 that can be then compressed and injected into geological storage like certain spent deep-shaft oil wells or used to make long-lasting products such as cement. Other uses include using the captured CO2 in greenhouses to enhance plant growth or as a primary component in the manufacture synthetic fuels. Synthetic fuels made with Direct Air Carbon Capture ("Air-to-Fuels") contribute to mitigating climate change by displacing an equal amount of fossil fuels. These, however, are a form of "Carbon Capture and Use" or "Carbon Recycling" because the CO2 returns to the atmosphere quickly after the products are consumed.

This captured Carbon Dioxide can be used in other ways as well. For instance, it can be used to produce more oil and, surprisingly, it may actually reduce the total amount of CO2 released into the atmosphere from burning crude oil. Called "Carbon Dioxide Enhanced Oil Recovery", the process involves capturing CO2 emissions then transporting it to nearly spent oil fields where production has peaked. By injecting this captured CO2 into these existing oil wells, hard-to-get crude oil can become pressurized and/or thinned by the CO2 and production can be revived. As counterintuitive as it may seem, EOR may have positive environmental benefits as compared to non-EOR oil production because often more carbon dioxide is needed to be pumped into the wells and thereby sequestered than is emitted from the oil's later use.

This, however, is not an anticipated, preferred, or desired form of sequestration to be utilized by the technology described herein. Indeed, the embodiments described herein are anticipated to be "maximum-yield" negative emissions technologies and rely only on pure geological sequestration within appropriate rock formations wherein there exists little to no risk of transcendence back into the atmosphere within—at a minimum—many centuries. Our capacity to sequester Carbon Dioxide in this way is astonishingly vast. In total, the global geological capacity to store Carbon Dioxide lies somewhere between 5 and 30 trillion tons.

Apart from being targeted to a specific emission source, DAC aims to remove excess anthropogenic Carbon Dioxide from our atmosphere wherever it might have originated. Moreover, since Carbon Dioxide concentrations are nearly equal at every point on the globe, DAC infrastructure can be widely deployed and remain similarly effective. This uniform disbursement comes at a cost, however, in that atmospheric Carbon Dioxide is quite dilute and has an average atmospheric concentration of only 0.04%. With this level of concentration it has, historically, been a significant challenge to economically remove CO2 at scale or even that approaching scale.

Indeed, even though we consider the CO2 concentration in air to be high, it is very low regarding separation purposes. Therefore, a highly selective separation process is required. A wide array of approaches employing different sorption materials have been described. In particular, the last five years have seen a rapid expansion of reports using various chemisorbents for CO2 capture from ultra-dilute gas streams such as ambient air.

There are a variety of technologies for Direct Air Capture. Some use liquid chemicals that bind with CO2 in the air and release the CO2 when heated. Others use solid filter-type media that chemically adsorbs the CO2 when contact is made and then use changes in pressure or humidity to release CO2 when desired. Another type uses electrical charge to capture the CO2 and the releases it when the charge is reversed in polarity. Opportunities exist for new materials that can capture CO2 from ultra-dilute gas streams and operate under all humidity levels to play a role in emerging DAC technologies.

Sorbents should not be seen in isolation from practical processes which deploy them in the environment. The ultra-dilute nature of the gas stream will require highly efficient gas/sorbent contacting strategies for any such process to be economically feasible.

Generally, for adsorption-based gas separation processes, configurations of the sorbent material are desired which impose little pressure drop on the gas flow in order to minimize the energy required for gas pumping and at the same time achieve maximum contact between the sorbent and the gas stream in order to maximize the mass transfer rates of the components to be removed from the gas stream. In particular, all DAC approaches have one major challenge in common which is the very large air volumes that have to be passed through any capture system in order to extract a certain amount of CO2 from the air. This in turn means that economically feasible capture systems must have a very low pressure drop on the air flow passing through them. Otherwise the energy requirements for air pumping will render the system uneconomical. However, any low-pressure drop configuration should not compromise the mass transfer properties of the system.

DACCS also usually requires large areas of land in which to build and operate the immense number of DAC facilities that would be required to make a meaningful impact. However, it requires less land than approaches like BECCS and forestation. It could be sited near appropriate geological reservoirs, avoiding the need for extensive pipelines.

Costs per tonne of captured CO2 with current technologies vary widely. In recent years, costs have reportedly been as high as $600 per ton. However, an independent expert assessment in 2018 projected costs of $100-300 per tonne of captured CO2. Significant uncertainties result in a wide, asymmetric range associated with this estimate, with higher values being more likely than lower ones but likely at or under $300 per ton. With current technology, DACCS is likely not currently an economically viable approach to mitigating climate change. A commercially interesting, large-scale DACCS system would require significantly lower CO2 costs and would likely have to be designed very differently than current technologies.[15] Indeed, there is now a consensus among climate scientists that new negative carbon technologies are needed to address the scale of the current problem. The embodiments described herein certainly meet this need and, indeed, are quite divergent from current technology and a complete paradigm shift in both Direct Air Capture of Carbon Dioxide and Rail Transportation as a whole.

A handful of companies currently have direct air carbon capture facilities in operation, all in North America or Europe, and a growing number of start-ups are exploring new approaches to or uses for direct air carbon capture. Most existing facilities are small, capturing tens to hundreds of tonnes of CO2 per year. Three companies currently run direct air capture facilities, most of which are relatively small facilities that reuse the captured CO2 rather than sequestering it. Two larger scale DACCS facilities are currently under development. A Swiss company, Climeworks, sequesters CO2 in rock at its facility in Iceland which will sequester thousands of tonnes of CO2 per year as part of the "CarbFix2" project. Second, a Canadian company, Carbon Engineering, has a plant in place Alberta and also has partnered with an arm of Occidental Petroleum to build a DACCS plant in Texas that will capture roughly one million tonnes of CO2 per year and use it for enhanced oil recovery—which sequesters the captured CO2 but increases production of fossil fuels.[16] Carbon Engineering claims its Texas facility will capture CO2 at around $200 per ton, and several other companies project costs to fall to around $100 per tonne or even less.

Direct Air Carbon Capture has two primary stages in its carbon removal cycle: (1) adsorption/adsorption; and (2) desorption.

a. In Adsorption/Absorption, Air is blown through a structure (contactor) that contains a suitable CO2-adsorbing/absorbing material or liquid and CO2-depleted air is emitted from the process. In the adsorber/absorber, the main contributor to energy use is the electrical energy required for fans to drive air through the contactor containing the sorbent.
b. In Desorption, after the sorbent has been saturated with CO2, it is moved to the desorption stage where, in the case of solid sorbent systems, Heat ("Thermal Swing"), Vacuum ("Vacuum Swing"), Pressure ("Pressure Swing"), Humidity ("Humidity Swing"), Electrification ("Electrification Swing") a combination of any of the four ("i.e. Thermal/Vacuum Swing"), or, in the case of liquid sorbent systems, Causticization/Calcination ("Causticization/Calcination") is used to desorb CO2, regenerate the media and produce a concentrated CO2 stream. Desorption/Regeneration is the most energy-intensive step for any direct air capture system and includes, for instance, the energy requirements needed to create heat or steam and induce CO2 desorption in Thermal Swing systems or the energy requirements needed to operate vacuum pumps in Vacuum Swing systems or for recovery stream purity purposes.

Drilling down from there, Adsorption/Absorption comes in a handful of general categories: Physical absorption, Chemical absorption, Physical adsorption, Chemical adsorption, and Membrane technology. From there, adsorption/absorption comes in two main media groups: Liquid Media Based DAC, and Solid Media Based DAC. Drilling down yet again from there, the specific means of adsorption/absorption in both the liquid and solid media groups have a variety of proven technologies and ever-changing number of newly proposed technologies. Liquid Media Based DAC technologies include Aqueous Potassium Hydroxide (KOH), Liquid Monoethanolamine (MEA), Aqueous Amino Acid Solutions, and Causticization/Calcination with Alkali and Alkali-Earth Hydroxides. Solid Media Based DAC technologies include Bulk Alkali Carbonates, Supported Alkali Carbonates, Organic-Inorganic Hybrid Sorbents, Amines Physically Adsorbed on Oxide Supports, Amines Covalently Tethered to Oxide Supports, Amines Supported on Solid Organic Materials, Tetraethylenepentamine (TEPA), Zeolites, Metal-Organic Frameworks (MOFs), Amines Tethered to MOFs, Microporous organic polymers (MOPs), Carbon Monolith, Meso-Carbon•Graphene•Electro-Chemical, and Membrane technology.

Alternative Approaches for DAC. Apart from the sorbents described above, there are a number of alternative approaches to achieve DAC already proposed in the literature but not yet widely studied for this purpose. Additionally, the Desorption step in the cycle has, itself, a variety of proven technologies and ever-changing number of newly proposed technologies, such as Causticization/Calcination, Temperature Swing, Humidity Swing, Vacuum Swing, Electrification Swing, and Combination.

Liquid Sorbent Aeration Media DAC Systems ("Liquid DAC") have two main processes—absorption and desorption. For instance, after the liquid has been saturated with CO2 in the Contactor it is pumped into other areas where the CO2 is desorbed, and the liquid is regenerated through various processes whereafter the liquid is returned to the Contactor for further use.

Solid Sorbent Aeration Media DAC Systems ("Solid DAC") also have two main processes—adsorption and desorption. However, in these systems both the adsorption/desorption cycles usually occur within the same chamber. Importantly, this means that during one cycle the other is not in operation. For instance, during the desorption stage in most Solid SAM systems, adsorption is not occurring. This functionally reduces the productivity of the system by the proportion of time the entire cycle dedicated to desorption and the contactor is not in contact with ambient air. In this regard, it is of paramount concern to reduce the time any Solid SAM system of this type spends in the desorption cycle. Amines in particular are suitable for CO2 capture, as is evident from the benchmark CO2 absorption process using an aqueous ethanolamine solution (Topham et al., 2014).[26] Both adsorption and absorption are promising techniques for CO2 capture, but low-temperature adsorption processes using solid adsorbents are the prevailing technique nowadays.

a. Temperature-Swing Solid Sorbent Aeration Media DAC Systems are designed where the adsorption process takes place at ambient conditions in which air is streamed through the sorbent material and a portion of the CO2 contained in the air is chemically bound to the sorbent material. During the subsequent desorption, the material is heated to about 50-110° C. and the partial pressure of Carbon Dioxide surrounding the sorbent is reduced by applying a vacuum or exposing the sorbent to a purge gas flow. Thereby, the previously captured Carbon Dioxide is removed from the sorbent material and obtained in a concentrated form.

b. Rotary Solid Sorbent Aeration Media DAC Systems ("Rotary DAC") are a relatively new solution that operate cyclically in a rotary perpetual loop configuration at approximately one (1) RPM. (FIG. 4) In these systems, ambient air is blown through a portion of the radial solid adsorbent media where the CO2 in that air is adsorbed. Next, that same portion rotates around to the desorption stage with the Rotary DAC device. Here the solid adsorbent saturated with CO2 is exposed to heat and/or vacuum to liberate the CO2 from the solid adsorbent. Finally, the solid sorbent is cooled and rotated back to its starting position where the cycle repeats and the adsorption stage is restarted.

c. Electro Solid Sorbent Aeration Media DAC Systems ("Electro DAC") are a new form of Solid SAM DAC developed at MIT's Energy Initiative Lab in 2020. In this embodiment, electrical charge flowing through a saturated carbon fiber substrate is used to both adsorb CO2 and then—when reversed—to desorb the captured CO2. The power source creates a voltage that causes electrons to flow from ferrocene to quinone through the wires. The quinone is now negatively charged. When CO2-containing air or exhaust is blown past these electrodes, the quinone will capture the CO2 molecules until all the active sites on its surface are filled up. During the discharge cycle, the direction of the voltage on the cell is reversed, and electrons flow from the quinone back to the ferrocene. The quinone is no longer negatively charged, so it has no chemical affinity for CO2. The CO2 molecules are released and swept out of the system by a stream of purge gas for subsequent use or disposal. The quinone is now regenerated and ready to capture more CO2.

Although other embodiments are likely if not certain, the primary preferred exemplary embodiments for the Enviro-Rail System anticipate the deployment of Heat/Vacuum Swing, Pressure-Swing and/or Electro-Swing solid SAM media within the collection chamber. As described above, this CO2 adsorption media type selectively capture and then selectively release Carbon Dioxide in a two-step process. The Enviro-Rail Systems brings novel advantages to both. First, a tremendous quantity of air is pushed into the collection chamber through large air intakes that extend into the moving Train's slipstream thereby usually requiring no energy-intensive fans to move ambient air through the chamber. Thereafter, Carbon Dioxide begins to chemisorb into the Solid SAM media that sit inside the collection chamber.

After the Solid SAM media is full of Carbon Dioxide, the collection chamber is closed and a partial vacuum is applied to the chamber. High-pressure steam is then released into the now sealed and low-pressure chamber and the temperature is increased to between 80 and 100° C. At this point, the CO2 is released from the media and begins to fill the collection chamber.

Finally, the released high-purity CO2 is collected and compressed by pumping down the collection chamber with a high-efficiency compressor. Thereafter, the resulting CO2 is dried of residual water vapor so that the water can be recycled and reused during the next cycle. The CO2 is then cooled by an energy recovery system that transfers most of its heat to the next batch of water to be used for steam generation. It is then further compressed, cooled, liquified and then transferred into the Onboard CO2 Main Reservoir or an Attached CDAC Tank Car for storage and an in-situ means of transportation to the final sequestration site.

The captured CO2 comes at a cost, however, and DACCS processes do require significant amounts of input energy in order to capture and then release Carbon Dioxide from ambient environmental air. Additionally, this input energy must always be carbon-neutral in order to maximize the technology's climate impact. Whereas natural materials provide the primary inputs to other carbon removal technologies, the primary input in DACCS is energy.

This requirement for large amounts of low or no-carbon energy and the potentially high costs thereof impose practical constraints on upscaling most DACCS technologies. As a comparison, a low-efficiency DAC process which requires 7 GJ per one tonne captured CO2 which is downstream of a, say, coal power plant, over two tonnes of CO2 would be released into the atmosphere for every one tonne of CO2 that is captured. At −100% carbon efficiency, an obviously bad environmental investment. At the other end of the spectrum (and taking the diversion problem out of the equation), a relatively efficient DAC process which requires only 2 GJ per one tonne captured CO2 which is downstream of a natural gas power plant, would elicit just over 500 lbs. (~225 kg) of CO2 for every one tonne of CO2 that is captured a 75% carbon efficiency.

This requirement for carbon-neutral energy inputs in DAC processes becomes even more complex by the diversion problem in those large geographical regions that use both carbon-heavy and carbon-neutral means of energy production. For instance, if a region has solar power generation closest to the site of a fixed land-based DAC deployment, one might be lulled into the conclusion that this deployment utilizes carbon-neutral energy inputs. However, with the complexities of the world's electrical grid system, this might not always be the correct assumption. For example, if the greater area of the regional electrical grid utilizes both a mixture of, say, coal power and solar power, direct use of the solar power electrical output might actually just divert an equal amount of that green energy away from another far-off consumer. This creates an energy deficit that will likely be filled by increased production from the carbon-heavy coal power plant. This is because power generation always equals demand and green energy deployments usually operate at or near 100% capacity. As a result, the slack created by additional demand is taken in by those sources with excess capacity and these are usually carbon-heavy sources. We can see that with mixed-source electrical grids, direct utilization of seemingly carbon-neutral energy is no guarantee of "end-of-day" carbon neutrality. Any use—despite the direct source—might actually just further contribute to carbon emissions. This is illustrative of the need to rapidly deploy carbon-neutral energy production across the entirety of the electrical grid and avoid myopic perspectives to green energy implementation.

a. This troublesome diversion problem raises its head even with a hypothetical dedicated, direct connection to a carbon-neutral energy source in that there is an indirect opportunity cost of that carbon-neutral energy source not otherwise being built somewhere else to replace an existing or proposed carbon-heavy energy source. For instance, let us say a large-scale DAC plant with average power efficiencies is about to be built with an adjacent solar farm to supply 100% of its power needs. At the same time in another part of the world a similar sized inexpensive coal power plant is about to be constructed because of, say, lax environmental regulations, budget constraints or inaccessibility of technology.

b. Somewhat surprisingly, it would probably produce a greater positive environmental impact to simply box up and donate the solar farm technology to be used in that other part of the world in lieu of both the coal plant and the DAC plant being constructed. This extreme analogy is illustrative of the complexities surrounding this issue given the high-entropy and nomadic nature of this particular pollutant. Unlike other environmental contaminants, with carbon dioxide emissions it matters not whether the source is 10 miles away or 10,000 miles away—they both are exactly equal in local effect. With higher efficiencies in DAC processes, this problem becomes less relevant (but never absent) because more net $CO_2$ can probably be captured than is released in the production of a given amount of electricity. As we have seen, however, any use of mixed source grid power can have rippling consequences down the proverbial line. There are only two ways around this persistent problem:

i. Transform 100% of the electrical generating sources within the greater regional, nay national, nay global power grid into carbon-neutral sources;

ii. Utilize an energy source that is "Point-Source" and "Capture-Resistant" in its full extent. "Point-Source" being defined as a source of energy that exists in one location and cannot be reasonably duplicated in another location. "Capture-Resistant" being defined as a source of energy that cannot be fully captured in storage or contributed immediately to the grid. Put another way, this point-source of power is either used "then and there" or mostly lost because it cannot be fully captured.

c. This is exactly the case with Regenerative Braking Energy created by Locomotives and certain other point-sources such as Geographically Isolated Geothermal. Just like with Hybrid Automobiles, this Regenerative Braking Energy is produced whenever and wherever a braking deceleration might occur. It is Point-Source and cannot be "boxed up" and duplicated elsewhere. It also cannot be fully captured in storage or contributed immediately to the grid. For instance, after just three braking maneuvers it is anticipated in some deployments that the Enviro-Car Battery Array will likely be charged to full capacity. Therefore, this energy must be used continuously or lost very quickly. Due to factors such as the down-rounding the number of attached Enviro-Rail Cars given a route's anticipated energy generation potential, it is likely that the system will have excess battery array energy unallocated to DAC operations that will be supplied to train propulsion efforts either directly with car installed traction motors or indirectly by resupplying such back to the locomotive's traction motors.

Definitions a. "Air-Pollution" is the presence or higher concentrations of deleterious substances in ambient atmospheric air.

b. "Localized Air-Pollution" is the presence or higher concentrations of deleterious substances in ambient atmospheric air which are generally localized to a specific area or geographic location such as might occur in and around urban areas. This includes—but is not limited to—Particulate Matter (including Black Carbon), Ground-Level Ozone, Nitrogen Dioxide, Sulfur Dioxide, Carbon Monoxide, etc.

c. "Particulate Matter" are Localized Air-Pollution or Emission substances that present in solid or liquid form. This includes—but is not limited to—Environmental Particulate Matter, Black Carbon, small droplets of Fuel, Oil or Chemicals, etc.

d. "Pollution Gases" are Localized Air-Pollution substances that present in gaseous form. This includes—but is not limited to—Ground-Level Ozone, Nitrogen Dioxide, Sulfur Dioxide, Carbon Monoxide, etc.

e. "Locomotive Emissions" are deleterious substances emitted from Locomotives during operation which are contained within the exhaust stream of their internal combustion diesel engine. This includes—but is not limited to—Carbon Dioxide ($CO_2$), Carbon Monoxide (CO), Hydrocarbons (HC), Nitrogen Oxides ($NO_x$), Particulate Matter (PM), etc.

f. "Emission Gases" are Locomotive Emission substances that present in gaseous form. This includes—but is not limited to—Carbon Dioxide ($CO_2$), Carbon Monoxide (CO), Hydrocarbons (HC), Nitrogen Oxides ($NO_x$), etc.

g. "Remove" is to adsorb, absorb and/or filter or otherwise capture a substance whereby it is permanently or semi-permanently eliminated from the open environment.

h. "Harvest" is to adsorb, absorb and/or filter or otherwise capture a substance then selectively release, isolate, compress, concentrate, liquefy and/or off-load or otherwise recover that captured substance then utilize such recovered substance for another purpose—including permanent, non-EOR geological sequestration. Examples include the recovering anthropogenic Carbon Dioxide gas from ambient environmental air or recovering of Emission Gases such as Carbon Dioxide from Locomotive Emissions to be used for permanent, non-EOR geological sequestration.

i. Mitigate" is to remove, harvest or make less harmful a deleterious substance from the environment. This could include any technology used for that purpose and include filtration, adsorption, absorption, catalytic conversion, catalytic reduction, diesel exhaust fluid ("DEF") or other such process or method.

j. "Carbon Pricing" is a market-based strategy for lowering global warming emissions. The aim is to put a price on carbon emissions—an actual monetary value—so that the costs of climate impacts and the opportunities for low-carbon energy options are better reflected in our production and consumption choices.[30]

k. "Pollution Pricing" is a market-based strategy for lowering pollution emissions. The aim is to put a price on pollution emissions—an actual monetary value—so that the costs of pollution impacts and the opportunities for low-pollution options are better reflected in our production and consumption choices.

l. "Locomotive" is the motorized unit of a Train that is the primary source of locomotion for that Train and at the most basic level consists of a large diesel engine, a large generator/alternator, four to six large wheel-mounted electric motors, an air compressor that supplies compressed air to operate the friction brakes for the entire Train and usually dynamic brake equipment that can be used to convert forward Train momentum into electrical energy to slow or stop the Train in a frictionless manner. Large Freight or Passenger Locomotives usually produce between 3,000 HP-6,000 HP and are "diesel-electric" meaning the main engine is primarily used to produce electricity to power the wheel-mounted electric motors. Locomotives are not direct-drive nor is there any sort of connection between the engine/generator and the wheels other than electrical connections to each wheel's electric motor.

m. "Dynamically-Braked Locomotive" or "DB Locomotive" is a normal and customary Locomotive usually of higher horsepower and generally used in "Road-Haul" or long-distance rail deployments. It differs in that it has "Dynamic Brake" capability wherein electrical energy is created during braking maneuvers and is described in greater detail below.

n. "Locomotive Consist" is a group of two or more Locomotives attached together. Road-Haul Locomotives are designed to be used in multiple-unit ("MU") configurations where one locomotive—and operator—can control any other Locomotives in a multiple-unit Locomotive Consist.

o. "Railcar" is the generalized term for the non-motorized, wheeled carriages that are designed to be pulled behind one or more Locomotives and carry or contain a specific type of bulk cargo. Railcars come in a multitude of shapes, sizes and configurations but can be generally grouped in main categories such as tank cars, box cars, flat cars, gondolas, etc.

p. "Train" is the collective term for one or more Locomotives being attached to a group of one or more Railcars moving (or stationary) as a single unit. Trains can have more than one Locomotives which power their movement, usually consist of 50-100+ Railcars of various types and can be over one mile in total length.

q. "CO2 Direct Air Capture Railcar device" or "CDAC-Car" is a novel term put forth herein and a unique embodiment of an Enviro-Car where the primary focus is on Mitigation of Anthropogenic Carbon Dioxide from ambient environmental air and at the most basic level consists of a Tank-Type Railcar, large ambient air intake(s), a large adsorption/desorption chamber, a large ambient air outlet vent, vacuum/heating equipment, CO2 compression/liquification equipment and a large battery array to supply the power needed for operation.

r. "Locomotive Emissions Mitigation Railcar device" or "LEM-Car" is a novel term put forth herein and a unique embodiment of an Enviro-Car where the primary focus is on Mitigation of Locomotive Emissions which primarily includes Carbon Dioxide and Particulate Matter (including Black Carbon) but may also include other such emissions.

s. "Urban Emissions Mitigation Railcar Device" or "UEM-Car" is a novel term put forth herein and a unique embodiment of an Enviro-Car where the primary focus is on Mitigation of Urban Emissions which might include—but is not limited to—Particulate Matter (including Black Carbon), Ground-Level Ozone, Nitrogen Dioxide, Sulfur Dioxide and/or Carbon Monoxide.

t. "Enviro-Car(s)" or "Air-Pollution Mitigation Car(s)" are novel terms put forth herein and a unique embodiment of a Railcar where the primary focus is on Mitigation of Air-Pollution from ambient environmental air and at the most basic level consists of a Tank-Type Railcar, large ambient air intake(s), a large contacting chamber, a large outlet vent, and a large battery array to supply the power needed for operation. "Enviro-Car" is a collective colloquialism referring to any or all of the embodiments of CDAC-Car(s), LEM-Car(s) and/or UEM-Car(s). All are of similar types of technologies where one is primarily focused on Mitigation of Anthropogenic Carbon Dioxide (CDAC-Car), another is primarily focused on Mitigation of Locomotive Emissions (LEM-Car), and yet another is primarily focused on Mitigation of Urban Emissions (UEM-Car). All have a very similar internal structure and are nearly identical on the exterior in every aspect. The notable differences are a modified front intake in a "direct-to-exhaust" LEM-Car embodiment, reduced adsorption/desorption cycle times and the additional emissions mitigation processes (besides CO2) in certain LEM and UEM-Car embodiments. For the purposes of this discussion, "Enviro-Car" can mean and refer to a CDAC-Car(s), LEM-Car(s) and/or UEM-Car(s) since all are of a near identical form and employ similar processes.

u. "Locomotive Exhaust Transfer Array" or "LETA" is a novel term put forth herein and a unique embodiment of a ERDB Locomotive deployment. The Locomotive Exhaust Transfer Array is installed atop of a ERDB Locomotive directly above the engine exhaust in a front-to-back horizontal direction which transfers a substantial portion of the Locomotive's diesel engine exhaust to be scrubbed of Carbon Dioxide or other emissions while the Train is in motion.

v. "Locomotive Exhaust Direct Array" or "LEDA" is a novel term put forth herein and a unique embodiment of a ERDB Locomotive deployment. The Locomotive Exhaust Direct Array is installed between the ERDB Locomotive and a dedicated, semi-permanently attached LEM-Car which allows for complete Locomotive to LEM-Car emissions transference.

w. "CDAC Tank Car" is a type of Railcar that is used to store and transport the CO2 recovered from the Enviro-Rail System. This CDAC Tank Car has been slightly modified to be ideally suited for the purposes of this embodiment and is primarily used to provide storage of the captured CO2 and in-situ transportation to the final sequestration site after it has become filled to capacity. One or more CDAC Tank Cars may be deployed within the same Train.

x. "Enviro-Rail Consist" is the collective term for one or more ERDB Locomotives, one or more CDAC-Cars, LEM-Cars and/or UEM-Cars, zero or more CDAC Processing Cars and zero or more CDAC Tank Cars attached together either directly or intermittently throughout the Train.

y. "Enviro-Rail System" or "Enviro-Rail" is the collective term for one or more ERDB Locomotives, one or more CDAC-Cars, LEM-Cars and/or UEM-Cars, zero or more CDAC Processing Cars and zero or more CDAC Tank Car plus the systems, components, equipment, parts and processes of each and any ancillary equipment such as Locomotive Exhaust Transfer Array ("LETA"), Locomotive Exhaust Direct Array ("LEDA") and/or Railcar-Mounted Photovoltaic Cells (if any).

z. "Dynamic Brakes" are a form of frictionless energy braking currently equipped in extreme majority of Freight and Passenger Locomotives across the world's Rail Transportation network. Dynamic Brakes are integrated systems that utilize the four (4) or six (6) (usually six [6]) electric Traction Motors located in the undercarriage of the Locomotive to create a braking force upon the Train when slowing or stopping is desired by the operator. These electric Traction motors normally power the wheels from either A/C or D/C current supplied by the rotation of a Main Generator which is attached and powered by the Prime Mover (aka Main Engine) located behind the Locomotive Cab. However, since there is tremendous forward momentum from the speed of the Train coupled with the significant weight of the entire Train traveling in a forward direction, these Traction Motors can create significant braking forces upon the Train simply by switching their configuration from that of Motors to that of Generators being rotated by the spinning of the wheels as a natural product of that forward momentum. This forced rotation of the Traction Motor's Armature (conductive wire) within its Stator (electro-magnetic field) is what produces electricity by its most basic and traditional means. The production of electricity in this way naturally creates a rotational dragging force upon the Armature which is directly transferred to the Wheels and is outputted as a frictionless energy braking force upon the entire Train. This is what is known as "Dynamic Braking".

i. The electrical energy produced as a result of these Traction Motors being periodically switched by the Operator into Dynamic Braking Mode is, in almost all current applications, routed from the Traction Motors (Generators) in the undercarriage by high-voltage cabling to resistor grids located atop the Locomotive in the mid-section of the carbody hood. The electrical impedance of these metal/ceramic resistor grids produce significant waste heat which is, in the vast majority of applications, blown out the top of the Locomotive by high-capacity, electrically driven fan motors and fan blades approximately one (1) meter in diameter.

aa. "Regenerative Brakes" are a form of Dynamic Brakes that utilizes and/or stores this intermittent but substantial Dynamic Braking Energy for one or more specific purposes. In this way, the originally equipped Dynamic Brakes become Regenerative Brakes. For instance, U.S. Pat. No. 7,891,302—"System and Method for Providing Head End Power for Use in Passenger Train Sets" and U.S. Pat. No. 8,196,518—"Head End Power System for Passenger Train Sets" are prior work of this same Inventor and describe the modification of the originally equipped Dynamic Brake system in Passenger Locomotives to create a Regenerative Braking System.

i. In that method, the resultant energy is utilized and power the electrical needs of Passenger Rail Cars and their occupants. These needs include but are not limited to lighting, heating, air-conditioning, air filtration, food preparation, electrical outlets, etc. This energy is supplied by both direct means and/or the charging of high-capacity batteries for sustained power output between braking cycles.

ii. In that method, there is no wasting this excess Dynamic Braking energy and concurrently having separate pollution-creating, maintenance and fuel-consuming, Head-End Power Generators supply this energy requirement to the Passenger Cars.

iii. In this application, a similar modification and utilization of the output Energy from the Locomotive's Dynamic Braking System is utilized but for a substantially different and more impactful purpose.

bb. "Railcar-Mounted Photovoltaic Cells" or "Train Solar" is a novel term put forth herein and a collective colloquialism referring to any or all of the Thin-Film Photovoltaic Cells installed atop some or all of the usual railcars that make up the entirety of the Train to augment the Regenerative Braking Energy and support the overall operation of the Enviro-Rail System.

i. Many railcars have a large and unobstructed flat or curved top section that are well suited for a retrofit of this type. This retrofit would, obviously, need to be made in advance to a large fleet of railcar types or deployments. As much as 1,500-3,000 KW could be obtained in this way from solar power alone in certain deployments.

cc. "Exemplary" shall be defined herein as "being one of a plurality of examples" and shall not be construed as necessarily meaning an "an ideal example".

dd. "Preferred Embodiment" shall be defined herein as "being an embodiment that is currently and/or generally preferred over other possible embodiments" and shall not be construed as meaning "an only embodiment".

Direct Air Capture media technology is becoming increasingly efficient in both the adsorption cycle and the desorption cycle—with even more exciting technologies on the horizon. We can conservatively assume from the rapid advancements on this front that future DAC media technology and methods will surpass even the highest expectations and achieve untold efficiencies in carbon capture and release. The larger macro-scale problems hampering widespread DAC deployment, however, still remain formidable and the ultimate criteria that will determine real-world success are eight-fold:

a. Productivity: Can a particular DAC solution actually produce substantial outputs of anthropogenic atmospheric Carbon Dioxide in a form that can be readily sequestrated?

b. Scalability: Can a particular DAC solution be productively scaled to actually make a meaningful, large-scale carbon-negative impact on the problem of global warming?

c. Footprint: Can a particular DAC solution be productively scaled to actually make a meaningful, large-scale carbon-negative impact on the problem of global warming without a large and unbecoming footprint upon our landscapes or cityscapes?

d. Energy Efficiency: Can a particular DAC solution be productively scaled to actually make a meaningful, large-scale carbon-negative impact on the problem of global warming without becoming a tremendous consumer of electrical energy capacity?

e. Carbon-Neutral Energy Input: Can a particular DAC solution be productively scaled to actually make a meaningful, large-scale carbon-negative impact on the problem of global warming without consuming—or diverting—anything but carbon-neutral energy so as to not exacerbate the problem with the solution?

f. Economics: Can a particular DAC solution be productively scaled to actually make a meaningful, large-scale carbon-negative impact on the problem of global warming at an economical cost that does not require the diversion of whole percentages of world-wide GDP?

g. Life-Cycle: Can a particular DAC solution be productively scaled to actually make a meaningful, large-scale carbon-negative impact on the problem of global warming at an economical cost that does not require the diversion of whole percentages of world-wide GDP?

h. Modular and Upgradable: Can a particular DAC solution be productively scaled to actually make a meaningful, large-scale carbon-negative impact on the problem of global warming and still remain flexible in its deployment parameters in order to capitalize on adsorption/desorption technology improvements? Rail DAC System disclosed within is a truly revolutionary DAC technology that exceeds expectations in all eight of the criteria outlined above:

Productivity: At scale, each DAC-Car in the Enviro-Rail System has a preliminary Carbon Dioxide productivity projection of over 20 Tonnes p/day or 7,500 tonnes p/year when deployed and in motion for an entire 24-hour day.

a. Since multiple CDAC-Cars can be included on a given Train, the entire Enviro-Rail System per Train will have the corresponding multiple of this projected daily production depending on the number of CDAC-Cars actually deployed.
   i. In certain deployments, up to Ten (10) CDAC-Cars could be included on the longest, heaviest Trains with multiple Locomotives and still have sufficient energy reserves from the Train's Regenerative Dynamic Braking and/or Train Solar Array Energy to power non-stop DAC operation.
   ii. In an exemplary deployment of five (5) CDAC-Cars, that total productivity of the entire system would be on the order of over 100 Tonnes of Carbon Dioxide per 24-hour day.

b. Many factors affect an Enviro-Car's daily productivity. These include:
   i. Number of Enviro-Cars deployed within Train;
   ii. Type of Enviro-Cars deployed within Train (i.e. DAC, LEM, UEM);
   iii. Enviro-Cars processes deployed within Train (i.e. UEM configured for particulate matter capture vs. CO2 capture);
   iv. Configuration of Enviro-Cars deployed within Train (i.e. Solid SAM DAC w/steam potentiated desorption);
   v. Total volume of media deployed within Collection Chamber;
   vi. Size and number of Air-Intakes deployed upon Enviro-Car;
   vii. Direct or Indirect Locomotive to LEM-Car connection;
   viii. Placement of Enviro-Cars deployed within Train;
   ix. Duration of day in-motion;
   x. Number of Locomotives deployed within Train;
   xi. Total Booster Unit contribution to RDB Energy;
   xii. Speed of Train (Velocity);
   xiii. Total weight of Train including all attached Railcars (Mass);
   xiv. Number of decelerations;
   xv. Magnitude of decelerations;
   xvi. Terrain traveled;
   xvii. Altitude;
   xviii. Number of attached Railcars configured with Photovoltaic Cells;
   xix. Efficiency of PV panels;
   xx. Actual daily solar radiation received at PV panel;
   xxi. Battery Array total capacity;
   xxii. Battery Array charge level at start-of-day;
   xxiii. Total Booster Unit Kinetic Energy contributed to Train (if any);
   xxiv. Onboard CO2 Main Reservoir utilized (8-hour-12-hour capacity) or dedicated 100-Ton CO2 Tank Car included within Train;
   xxv. Precipitation, ambient air temperature, relative humidity, relative wind speed and direction;

Scalability. Enviro-Rail can be incrementally scaled to ultimately utilize the entire global Rail Transportation network and its mobile infrastructure. Globally there is approximately 1,380,882 km of mainline railway. If set end-to-end this is enough mainline railway to reach from the Earth to the Moon nearly four times. The global rail system also consists of approximately 105,000 Locomotives and over 6,000,000 Railcars. If coupled end-to-end this is enough Locomotives and Railcars to circle the globe over three times at the equator. Additionally, there are over 450,000 Tank Cars in service in North America alone—the type of Railcar most similar to the Enviro-Rail System. Clearly if all other criteria for large-scale deployment are met, the Enviro-Rail System described within has a vast scalability potential and, thereby, can make substantial progress towards reducing anthropogenic Carbon Dioxide in the atmosphere and diminish the threat posed by global warming. As Rail Transportation grows and as CO2 Direct Air Capture media improves, it is estimated that Enviro-Rail could be capable of harvesting 2-4 Gigatons of Carbon Dioxide per year by 2050.

Footprint. By utilizing the mobile infrastructure and rolling stock of the global rail transportation network, Enviro-Rail has absolutely no fixed, land-based footprint. Moreover, this system requires a minimum of only one additional railcar to any particular Train. With the Enviro-Rail System described herein, not only can land acquisition, preparation and maintenance costs be thereby excluded from any economics calculation but so too can we continue to enjoy the intangible benefit that comes with unadulterated landscapes and cityscapes.

Energy Efficiency. The energy requirements of other traditional fixed-base DAC operations are mostly two-fold. First, there is the energy required to take in massive volumes of air in order to interact ambient CO2 with the collection media—whatever form that collection media might take. Second, there is the energy requirement to desorb that media from its grip on that captured CO2. Whether that desorption comes from heat, humidity, vacuum pressures or electrification—each are intensive energy consumers. The Enviro-Rail System described herein has game-changing advantages over typical DAC systems.

a. First, Enviro-Rail usually has no additional energy requirements for moving significant volumes of ambient air through the collection media. This is because Enviro-Rail is designed to primarily utilizes the tremendous relative velocity of the Train's slipstream for air-stream throughput.

b. Second, the Enviro-Rail System needs no external source of energy to potentiate a desorption cycle—whether that desorption comes from heat, humidity, vacuum pressures, electrification, or a combination of more than one. This is because Enviro-Rail is designed to capture and store the Train's tremendous Regenerative Braking Energy and Train Solar Energy to perform all the required CO2 adsorption/desorption processes.

Carbon-Neutral Energy Input. Regenerative Braking energy is one of the very definitions of carbon-neutral energy. Again, this Enviro-Rail System utilizes this braking energy that—in almost all current applications—is utterly wasted by being blown out the top of the Locomotive as heat. Undoubtedly, Regenerative Braking Energy is one of the few energy sources which is immune to the diversion problem making it uniquely carbon-neutral. Enviro-Rail is actually uniquely carbon-neutral in a number of ways:

a. Enviro-Rail with a deployed "Locomotive Emissions Mitigation Railcar" captures nearly all of the carbon emissions from the Locomotive—a first in large-scale transportation.

b. Enviro-Rail is deployed only with already running Freight or Passenger Trains in regular service, so there is almost no additional carbon debt incurred from operation even if emissions went uncaptured.

c. Enviro-Rail is deployed only with already running Freight or Passenger Trains in regular service which are 4-5× more fuel efficient per tonne transported than trucks. Moreover, any additional freight traffic diverted to Rail reduces those previous Truck related carbon emissions by nearly 100% with this technology.

d. Enviro-Rail can supply carbon-free kinetic energy motive-power to the Train when needed from its Battery Array and onboard motors and can increase overall efficiency and can even reduce the number of Locomotives needed to transport a particular Train in certain deployments;

e. The embodiments herein describe a Railcar-Mounted Photovoltaic system that can capture many thousands of kWh per day to be utilized for CO2 removal processes or supplying carbon-free kinetic energy to the Train;

f. Enviro-Rail utilizes only Regenerative Braking Energy and Photovoltaic Cells to power its operation and carbon removal processes in a carbon-free way;

g. Enviro-Rail is immune from potential negative downstream power diversion carbon consequences in mixed-source power grids;

h. Enviro-Rail is immune from even indirect opportunity cost carbon consequences in deployment;

i. Enviro-Rail uses all these carbon-negative sources and inputs to remove mass quantities of carbon dioxide from the ambient environmental air—creating the world's first large-scale carbon-negative mode of transportation.

j. Lastly, Enviro-Rail is even extraordinarily efficient in its use of this carbon-free energy to power its operation and carbon removal processes and utilizes many high-efficiency and/or hybrid-type component systems.

Economics. As mentioned earlier, the single greatest input in Direct Air Capture technologies is energy and, as a result, we can come to a fairly accurate analysis of the techno-economic feasibility of DAC by merely focusing on this single aspect.

a. Using an energy input per tonne of CO2 captured of 410 kWh/ton and an average solar-sourced energy cost of $0.057/kWh (not including energy storage systems), the cost for typical land-based DAC deployments to recover One (1) Gigaton of Carbon Dioxide is nearly 25 Billion USD for energy inputs alone.

b. Moreover, at this scale it is not just about Energy Costs, it is also about the tremendous additional demand on an already thinly stretched electrical generating and distribution system. An analysis of the additional energy demand to recover One (1) Gigaton of Carbon Dioxide per year is 410 TWh. This equates to the entire annual power output of over 4.5 Three Gorges Dams.

c. Given that this Enviro-Rail System has no external energy requirements and no incremental energy costs by way of utilizing the train's Regenerative Braking Energy, this substantial primary operating expense inherent in other DAC systems can be excluded from the equation and Enviro-Rail's cost per tonne of recovered CO2 is reduced by 25 Billion USD per gigatonne as compared to typical land-based DAC deployments from energy costs alone with no additional demand placed upon scarce renewable generating sources or inputs that will be needed for critical decarbonization efforts.

d. The range of estimates for total cost per tonne of removed CO2 with traditional DAC systems is quite large—reportedly ranging somewhere between $100 and $300 per ton. However, much progress has been made in getting these incremental costs down and there are now some deployments that forecast costs under $75 p/ton. This also agrees with our techno-economic comparative assessment of other DAC systems.

e. Pure, liquefied Carbon Dioxide is a commodity with an inherent market value and used in a variety of sectors and industries. Even permanent geological sequestration of CO2 can be monetized through such means as Enhanced Oil Recovery (EOR).

f. Despite this, the simple aim of this technology is to achieve the highest carbon-negative impact upon anthropogenic atmospheric Carbon Dioxide levels. Therefore, permanent, non-EOR, geological sequestration is the only focus hereof and we do not anticipate any source of traditional revenue to off-set production costs. Governmental subsidies, tax credits and other such financial endowments or incentives are not only welcome but critical for both the commercial and environmental success of technologies such as these. The United States, for instance, has one of the most encouraging—and prolific—environments for Carbon Capture Storage and/or Utilization ("CCSU") primarily because of the foresight that went into what is known as the "Section 45Q Tax Credit".

Life-Cycle. Rail Equipment as a whole is well-known for long asset life-cycles—usually measured in decades rather than years. Indeed, most rail equipment is completely rebuilt a number of times within its life-cycle and many Locomotives and Railcars can remain in service for 30+ years. Moreover, each rebuild cycle brings to the asset the latest in technology and efficiency improvements. It is expected that Enviro-Rail equipment will follow in this same trend.

Modular and Upgradable. The Enviro-Rail System described herein has voluminous interior that is well suited for most liquid, solid or rotary deployments. Moreover, it can be easily adapted, changed or upgraded mid-stream to capitalize upon improvements or prove-outs in current media technologies and even those anticipated in the future.

Enviro-Rail is a Regenerative Braking and Photovoltaic powered DAC technology that solves the most fundamental of problems in wide-spread adoption and economical deployment of this critical tool we have at our disposal to combat global warming. In most forms, modest quantities of water are its only necessary consumable input. This technology is a game-changing advancement not only in the economics but also all of the other important criteria in deploying DAC systems world-wide.

a. As outlined above, the Enviro-Rail System is a truly carbon-neutral consumer of the energy inputs required to produce the carbon-negative outputs. However, a closer look into Rail Transportation itself would be prudent—despite how this Enviro-Rail System stands alone on its own merits.
b. Indeed, if one anticipates utilizing a transportation network and its mobile infrastructure to combat anthropogenic increases in Carbon Dioxide, it stands to reason that one must first examine the ecological impact of that network and infrastructure itself as it relates to climate change. A clear-minded examination of the data shows that preserving the environment and combatting climate change is a responsibility Railroads take seriously.
    i. U.S. freight railroads, on average, move one tonne of freight more than 470 miles per gallon of fuel. In 2019 alone, U.S. freight railroads consumed 656 million fewer gallons of fuel than they would have if their fuel efficiency had remained constant since 2000. Since greenhouse gas emissions are directly related to fuel consumption, freight railroads account for just 0.6% of total U.S. greenhouse gas emissions, according to EPA data, and just 2.1% of transportation-related greenhouse gas emissions.
    ii. Surprisingly, a single freight Train can replace several hundred trucks, freeing up space on the highway for other motorists. On average, railroads are 3×-4× more fuel efficient than trucks. That means moving freight by rail instead of truck lowers transportation-related greenhouse gas emissions by up to 75%—or up to nearly 100% using the technology described herein.
    iii. Moreover, unlike other modes of transportation, when there are improvements to regulatory standards aimed at cutting rail equipment emissions, these standards usually apply to all applicable railroad equipment—both new and old. This differs substantially from other modes of transportation such as cars or trucks where new emissions standards usually only apply to newly manufactured vehicles.
    iv. While rail freight is by far the most carbon friendly mode of surface transportation and there have been great advancements in both increasing the fuel-efficiency and reducing emissions of rail transportation equipment, it is important to note that rail equipment—most notably Locomotives—do, obviously, contribute Carbon Dioxide to our atmosphere during their, albeit fuel-efficient operation. The technology described herein can change this, heretofore, unavoidable fact and make Rail Transportation not only the world's first carbon-neutral mode of transportation but also the world's first carbon-negative mode of transportation with the technology described herein.
c. Put another way, a very efficient original mode of transportation is first attached to in a non-parasitic way, scrubbed of any—albeit efficient—carbon emissions, then utilized to create carbon-free input energy from Regenerative Braking and Solar Energy which is used to harvest anthropogenic Carbon Dioxide from ambient environmental air at the Gigaton scale. All while being capable of supplying additional motive-power to increase overall kinetic efficiency and having no downstream energy diversion potential.

Enviro-Rail DB Locomotive ("ERDB Locomotive") is a novel invention herein disclosed and an alternate embodiment of a DB Locomotive. In this exemplary embodiment, it has the structural embodiments of a normal and customary Dynamically Braked Locomotive used in Freight or Passenger service. This Locomotive is slightly modified to have the capability to automatically reroute, when appropriate, some or all of their intermittent but substantial Regenerative Braking Energy to the attached Enviro-Car Car(s) to directly power their operation and/or charge their onboard Battery Array(s). These modifications include:

a. The installation of a microprocessor Dynamic Brake Control System including intelligent Enviro-Car Control System interface;
b. In an alternate embodiment with the inclusion of an Enviro-Car with Booster Capability, the installation of a microprocessor Motive-Power Control System including wheel-slip control and intelligent Enviro-Car Control System interface;
c. Installation of an anti-idling, Stop-Start Systems that shut down the Locomotive when it is not in use and restarts it when needed—thereby significantly saving on fuel and reducing emissions.
d. The installation of additional Heavy-Gauge, High-Voltage Cabling from the high-voltage cabinet near the cab to the rear of the DB locomotive which will carry the electrical energy created during Regenerative Dynamic Braking to the attached Enviro-Car Car(s) cars in the Enviro-Rail Consist when so deployed.
e. The installation of additional Relays, Interlocks, Switches and/or other such Electrical Equipment that can automatically route power between the typical resistor-based dynamic braking capability and the upgraded DAC Consist regenerative-based dynamic braking capability when so thereto attached. The typical resistor-based dynamic braking capability in the DB Locomotive is maintained after the upgrade and is automatically switched by the DB Control System between the two so that the DB Locomotive can continue to utilize dynamic braking when not connected to an Enviro-Car or in situations where the Enviro-Car battery array is already at maximum capacity.
f. The installation of a Power Umbilical quick-connection junction box at the rear end of the DB Locomotive to enable a leader cable to be attached between the DB Locomotive and a similarly placed quick-connection port junction box on the front end of the Enviro-Car. The ease of cable connection between the Locomotive and the secondary Enviro-Cars allows a traditional railroad switch-persons to perform the task in seconds without the need of tools or equipment at the same time as other connections are made during normal and customary railyard Train-making operations.
g. A fixed, high-pressure, valved Pass-Through CO2 Connection Fitting mounted to the front of the Vehicle which receives a hose of the same characteristics as the below-described CO2 Connection Hose. Thereafter, this connection traverses the length of the Vehicle as insulated steel pipe and finally terminates at a rear-mounted valved connection fitting which allows pass-through of captured CO2 from any additionally connected forward Enviro-Car(s) in Multiple-Unit ("MU") Locomotive Consists to the mutual downstream CDAC Tank Car or other offloading site.

h. Once the aforementioned appurtenances are installed and/or modifications are performed to a normal and customary FRA approved Locomotive, it becomes the herein described Enviro-Rail DB Locomotive ("ERDB Locomotive") and becomes a component vehicle within the larger Enviro-Rail Consist when so to then deployed.

Locomotive Exhaust Transfer Array ("LETA") is a novel invention herein disclosed and an alternate embodiment of a ERDB Locomotive deployment. The Locomotive Exhaust Transfer Array is installed atop of a ERDB Locomotive directly above the engine exhaust in a front-to-back horizontal direction which transfers a substantial portion of the Locomotive's diesel engine exhaust to be scrubbed of Carbon Dioxide or other emissions while the Train is in motion.

a. In this embodiment, the Locomotive Exhaust Transfer Array is of a tubular steel construction, open at both ends, narrower at the rear ("LETA Discharge") and incrementally wider at the front in a narrow, funnel-type shape ("LETA Intake").

b. By being open at the front and installed only slightly forward of the ERDB Locomotive exhaust, the engine exhaust is discharged normally while the Locomotive is idle but is forced in a rearward direction down the LETA tube when the Train is in sufficient forward motion by the compressive forces of the forward-facing, funnel shaped LETA Intake traveling within the Train's slipstream.

c. This forward-facing, funnel shaped LETA Intake and its precise placement only slightly forward of the engine exhaust hood opening is important design feature so as not to subject the diesel engine to excessive exhaust back-pressures from which it would suffer incomplete fuel burn and resultant stalling, significantly reduced performance and dramatically increased emission levels. This exhaust back-pressure and subsequent incomplete fuel-burn would occur both while at idle and while in operation if the Locomotive Exhaust Transfer Array were not open at both ends or did not have a funnel-shaped design that dramatically increases gas throughput down the LETA Tube.

d. Immediately behind a LETA equipped ERDB Locomotive is attached an operational LEM-Car. In this way, the terminal end of the LETA Discharge is positioned directly facing the Front Intake located atop of the LEM-Car.

e. This "indirect connection" configuration captures approximately 75% of engine emissions while, at the same time, allowing for both the Locomotive and the LEM-Car to move independently of one another without suffering damage, for small, solid particulate matter (carbon) to be discharged from the diesel engine without fouling the LEM-Car's sorbent media and allows the LEM-Car to operate in a dual capacity of both scrubbing the CO2 emissions from the ERDB Locomotive but also anthropogenic Carbon Dioxide from the atmosphere.

Locomotive Exhaust Direct Array ("LEDA") is a novel invention herein disclosed and an alternate embodiment of a ERDB Locomotive deployment. The Locomotive Exhaust Direct Array is installed between the ERDB Locomotive and a dedicated, semi-permanently attached LEM-Car which allows for complete Locomotive to LEM-Car emissions transference.

a. While this would involve cooperation from diesel engine manufacturers and/or relatively complex engine exhaust reengineering and modification, it allows the opportunity to capture nearly 100% of Locomotive emissions and would be a paradigm shift in transportation emissions technology.

b. This would include a high-strength, high-temperature, flexible, large-diameter semi-permanent exhaust transfer tube being installed between the Locomotive and the LEM-Car and engine modifications that might include the addition of a high-capacity engine exhaust blower system.

c. Given the complexity of this exhaust tube connection, the Locomotive would likely have a dedicated LEM-Car that is only detached and reassigned when extended Locomotive downtime is anticipated.

CO2 Direct Air Capture Railcar Device ("CDAC-Car"); and Locomotive Emissions Mitigation Railcar Device ("LEM-Car"); and Urban Emissions Mitigation Railcar Device ("UEM-Car") are novel inventions herein disclosed and embodiments of an Enviro-Car. In this exemplary embodiment, each has the structural form of an enclosed, cylindrically shaped Railcar. Each of these three similar forms of Railcars, moreover, might have seven or more distinct DAC process types—including but not limited to—Solid DAC, Liquid DAC, Rotary DAC, Electro DAC, and/or UEM Particulate Filtration. In most cases, these specific DAC processes can operate equally well in both a forward and backward directions. This would include most traditional Solid DAC, most Liquid DAC, most Rotary DAC and most Electro DAC. In this exemplary embodiment, all the similar forms of CDAC-Cars, LEM-Cars and UEM-Cars and all seven or more specific DAC process types exhibit the following primary characteristics:

a. A non-motorized, wheeled carriage embodiment that is designed to be pulled behind one or more Locomotives and presenting as an enclosed, cylindrically shaped Railcar.

b. An enclosed, voluminous Collection Chamber which comprises the majority of the above-deck structure. Onto the Collection Chamber's interior walls is affixed an insulative coating or material to reduce heat energy transfer to or from the exterior environment and to reduce water condensation on these surfaces.

c. Large Intake Air Scoop(s) ("Intake(s)") orientated in a forward-facing direction mounted atop or the side of the Vehicle and are the primary source of ambient environmental air obtained from the Train's slip-stream while in forward motion for supply within the Collection Chamber. These Intakes may have various structural embodiments, distinct forms, differing frontal area, placement and/or number:

i. In one exemplary embodiment, there is one large Intake mounted atop the most forward part of the Vehicle.

ii. In another embodiment, there are two Intakes—one mounted atop the most forward part of the Vehicle and another mounted atop the middle part of the Vehicle.

iii. In yet another embodiment, there are two Intakes—one mounted atop the most forward part of the Vehicle and another mounted atop the rear part of the Vehicle.

iv. In yet another embodiment, there are three Intakes—one mounted atop the most forward part of the Vehicle, another mounted atop the middle part of the Vehicle, and yet another mounted atop the rear part of the Vehicle. In this embodiment chamber venting occurs through the bottom part of the Vehicle through the Battery Array compartment thereby providing an auxiliary benefit of also cooling such.

v. Other embodiments may have some or all of the Intakes mounted on the side of the Vehicle.

vi. Still another embodiment is an Extended-Length Intake where the Front Intake extends back atop the roof of Vehicle into a half-tubular structure that traverses most of the Vehicles longitudinal length. This allows for one primary air intake scoop to provide sufficient air-flow to multiple top-mounted Collection Chamber Inlets. This allows for placement of multiple arrays of SAM Cells along the length or width of the Collection Chamber without sacrificing interior volume to abundant bulkheads or interior ducting.

vii. In most embodiments, these Intakes have a width of between 2.5-3.5 meters and a height of between 1-2 meters.

d. Large Outlet Air Vent(s) ("Vent(s)") orientated in a rearward-facing direction mounted atop or the side of the Vehicle and is the primary means of discharge back into the environment of the volume of air which has passed through the Collection Chamber. These Vents may have various structural embodiments, distinct forms and number.

i. In one exemplary embodiment, there is one large Vent mounted atop the most rearward part of the Vehicle.

ii. In yet another embodiment, there is one large Vent mounted atop the middle-front part of the Vehicle.

iii. Other embodiments may have some or all of the Vents mounted on the side of the Vehicle.

iv. In most embodiments, these Vents have a width of between 2.5-3.5 meters and a height of between 1-2 meters.

e. Two diagonally placed Air Ramps ("Front Air Ramp" or "Rear Air Ramp") located at both the front and back of the Collection Chamber that direct air, firstly, from the Front Inlet down and laterally through the Collection Chamber and then, secondly, up and laterally out the Rear Outlet.

f. Two high-output Air Fans ("Front Air Fan" or "Rear Air Fan" or "Fans") approximately eight feet in diameter, placed at the foot of both the Front Air Ramp and the Rear Air Ramp and both orientated in a rear-facing direction.

i. These have multiple, variable pitch blades approximately 3.5 feet in length and orientated around a central axis.

ii. Within this central axis point to power high-RPM blade rotation is mounted an appropriate high-efficiency electric motor with an output of approximately 10 HP-30 HP depending on the specific DAC process so to then deployed.

iii. The variable pitch blades are utilized to precisely control Collection Chamber air-stream throughput and velocity in addition to being rotated in a longitudinal direction to minimize contributed air-drag and/or pressure drop within the Collection Chamber when not in use.

iv. When deployed at full capacity, the Front Air Fan brings in ambient environmental air by way of the Front Intake, through the Front Inlet, down the Front Air Ramp and into the Collection Chamber an approximately equivalent amount as would be otherwise supplied if the Train were traveling in a forward direction at normal speeds.

v. Likewise, when deployed at full capacity, the Rear Air Fan expels scrubbed air by way of the rear portion of the Collection Chamber, up the Rear Air Ramp, through the Rear Outlet and out the Rear Air Vent an approximately equivalent amount as would be otherwise supplied if the Train were traveling in a forward direction at normal speeds.

vi. These Fans serve important and varied functions throughout the day to support the Enviro-Car's operation.

vii. When the Train is traveling in a forward direction at normal speeds and ideal Collection Chamber air-stream throughput and velocity is being achieved, both the Front and Rear Fans would not be in operation and their variable pitch blades are rotated in a longitudinal direction to minimize contributed air-drag and/or pressure drop within the Collection Chamber.

viii. When the Train is traveling in a forward direction under normal speeds and Collection Chamber air-stream throughput and velocity is less than ideal, both the Front and Rear Fans are made operational at the precise RPM and blade pitch to bring Collection Chamber airstream throughput and velocity back to ideal parameters.

ix. When the Train is traveling in a forward direction at normal speeds, but Collection Chamber air-stream throughput and velocity is less than ideal, both the Front and Rear Fans are made operational at the precise RPM and blade pitch to bring Collection Chamber airstream throughput and velocity to ideal parameters.

x. When the Train is traveling in a forward direction over normal speeds and Collection Chamber air-stream throughput and velocity is greater than ideal, if required, both the Front and Rear Fans could adjust their blade pitch to provide an air-stream drag-force and thereby bring Collection Chamber air-stream throughput and velocity back to ideal parameters. A small amount of Regenerative Power could even be recovered in this way and supplied back to the Battery Array.

xi. When the Train is traveling in a backwards direction in those DAC deployments that allow for both forward and backward operation, the Front and Rear Fans would simply operate with reverse rotation or reverse blade pitch and all other operational parameters and capabilities would remain constant.

xii. When the Enviro-Car is idle with no forward or backwards motion, both the Front and Rear Fans are made operational at the precise RPM and blade pitch to bring through the Collection Chamber an approximately equivalent amount of ambient environmental air at ideal throughput and velocity as would be otherwise supplied if the Train were traveling in a forward direction at normal speeds thereby allowing for non-stop, maximum-output operation irrespective of movement for a period of up to 16 hours from energy stored within the Battery Array.

g. One Front Compartment located at the front of the Vehicle located within the hull of the Collection Chamber but separated from such by the underside of the aforementioned Front Air Ramp with the access door being comprised of the front domed end of the Enviro-Car. In this compartment various components and/or pieces of equipment are placed which enables the operation of the Enviro-Car.

h. Two large exterior-convex, air-tight Collection Chamber Access Doors located on both the right and left side of the Collection Chamber which can be fully opened by a compression latch and single hinge mechanism to enable the servicing of components, SAM Cells, or other such equipment, parts or devices located with the chamber.

i. A large number of cells of Sorbent Aeration Media Cells ("SAM Cells") and the housings to contain them ("SAM Housing"). The Collection Chamber is also outfitted with the necessary mounting hardware, ductwork and/or devices necessary to properly deploy that particular SAM Cell process or method so utilized at that time. Such mounting hardware, ductwork and/or devices may be changed, upgraded, added, removed as necessary as required by subsequent improvements, proving-out or changes of such.

j. Multiple, Heavy-Gauge Umbilical Cables emanating from the front of the Vehicle which allow easy connection to the ERDB Locomotive(s) which transfers the Dynamic Brake Energy from the Locomotive Traction Motors (Generators) to the Enviro-Car for use or storage in the Battery Array.

k. Multiple, Heavy-Gauge Pass-Through Umbilical Cables traversing the length of the Vehicle and exiting from the rear of the Vehicle which allow easy pass-through connection for additionally connected Enviro-Cars to the ERDB Locomotive(s) which transfers the Dynamic Brake Energy from the Locomotive Traction Motors (Generators) to that additional Enviro-Car for use or storage in the Battery Array.

l. A large Battery Array contained within a large Battery Compartment mounted under the Collection Chamber with access doors on both the left and right side of the Vehicle.

i. The Battery Array powers the operation of the Enviro-Car and is charged by the Regenerative Braking Energy from the ERDB Locomotive/Enviro-Rail Consist, the Enviro-Car Solar Array, the Train Solar Array and/or Track/Catenary Electrification.

ii. This Battery Compartment can be of varying size and dimensions depending upon the power needs of the specific DAC processes and/or Train Handling activities so to then deployed and the corresponding size of an appropriately configured Battery Array.

iii. In the primary preferred embodiment, the Battery Array has a power capacity of 2,400 kWh and is comprised of 24 individual 100 kWh, high-output, lithium-ion battery cells (See Figure) and the Battery Compartment is sized as shown in the Illustrations.

iv. In other embodiments the total kWh may be higher or lower with differing quantity and kWh capacity of component battery cells. The battery cells may use lithium-nickel-cobalt-aluminum, lithium-nickel-manganese-cobalt, lithium iron phosphate, lithium vanadium oxide, lithium polymer, silicon nanowires, silicon nanoparticles, tin nanoparticles, graphene or other materials in their constituency as long as the batteries exhibit preferred capacity, performance, weight, dimensional, life-cycle, sourcing, safety and/or other such characteristics.

m. A large Thin-Film Photovoltaic Panel ("Enviro-Car Solar Array") that covers the majority of the top portion of the Enviro-Car. This primarily allows the Battery Array to be kept in a fully-charged state with approximately 15-25 kW of daytime input energy during those times that the Enviro-Car is idle or detached from a ERDB Locomotive Consist. This allows for immediate commencement of DAC operations once attached to a regular revenue service Train and placed into motion rather than necessitating several Dynamic Braking operation cycles in order to achieve the charging state required to come online and begin DAC operations. When not idle, these Solar Panels will likewise supply a relatively small but reliable daytime input charge to the Battery Array during operation in conjunction with the Regenerative Dynamic Braking, Train Solar Array or other charging inputs.

n. An Enviro-Car Control System located in either the Front or Battery Compartment that consists primarily of a microprocessor-based electronic control unit/computer that:

i. Performs control, communication, monitoring, troubleshooting and safety operations of various types and may dependently consist of many electrical, electronic, or mechanical devices or systems located both within and without various parts of the Enviro-Car.

ii. Utilizes a myriad of switches, sensors, gauges, modules, probes and other such devices located both within and without various parts of the Enviro-Car.

iii. Controls a plethora of types and applications of relays, interlocks, rectifiers, inverters, motors, pumps, valves, compressors, heating elements, charging systems, discharging systems, current modulators, alerting systems, lights, telemetry systems, transmitters, receivers, consoles, human interface devices and/or other such devices located both within and without various parts of the Enviro-Car.

iv. Communicates wirelessly by way of a Wi-Fi LAN network with the ERDB Locomotive(s) within the Enviro-Rail Consist and:

v. Intelligently coordinates Regenerative Braking Energy off-loading and energy routing based on need to some or all of the attached Enviro-Car Battery Array(s) by way of the Pass-Through Umbilical Cables;

vi. Intelligently coordinates Train Handling operations such as the addition of tractive effort or motive-power to the Train in those deployments that utilize Enviro-Cars with Booster Capabilities;

vii. Communicates wirelessly by way of a Wi-Fi LAN network with other like DAC or LEM-Cars within the Enviro-Rail Consist and:

viii. Intelligently coordinates $CO_2$ transfers between Enviro-Cars and other Enviro-Cars by way of the Pass-Through $CO_2$ Connection such as might be operationally prudent where one Enviro-Car has a $CO_2$ Main Reservoir at or near capacity and another within the larger Enviro-Rail Consist does not;

ix. Intelligently coordinates $CO_2$ transfers between Enviro-Cars and the $CO_2$ Tank Car in those deployments where such is made part of the Enviro-Rail Consist by way of the Pass-Through $CO_2$ Connection as might be operationally prudent where one Enviro-Car has a $CO_2$ Main Reservoir at or near capacity;

x. Communicates wirelessly by way of a Cellular WAN network with the primary Enviro-Rail mainframe to upload operational, performance and maintenance data;

xi. Communicates wirelessly by way of a Cellular WAN network with the primary Enviro-Rail mainframe to download operational and performance data related to then or near-future geographical deployments;

xii. Makes predictive assumptions based on previously accumulated Enviro-Car operational and performance data similarly obtained on that particular geographical route in which it is then deployed;

xiii. Based on that previously accumulated Enviro-Car operational and performance data and subsequent predictive assumptions:

xiv. Determines probable energy inputs from Regenerative Dynamic Braking, Train Solar Array, Enviro-Car Solar Array and/or Track/Catenary Electrification and sharing thereof between other Enviro-Cars.

xv. Determines probable required or requested energy outputs to Train Handling operations such as the addition of tractive effort or motive-power to the Train in those deployments that utilize Enviro-Cars with Booster Capabilities;

xvi. Determines best practices configuration based on predictive assumptions for DAC processes such as ideal Fan RPM (if any) and blade pitch, ideal adsorption cycle time, ideal Collection Chamber vacuum pressure preceding desorption, ideal desorption energy input (i.e. steam), ideal desorption cycle time, ideal CO2 pump-down cycle time, ideal CO2 liquification processes, ideal CO2 offloading processes (if any) and determines probable energy outputs thereof;

xvii. Determines best practices configuration based on predictive assumptions for ideal "end-of-day" Battery Array charge level to maximize non-stop, maximum-output DAC operation irrespective of movement for a period of up to 16 hours from energy stored within the Battery Array until the next future in-motion deployment and subsequent energy inputs.

o. Multiple large Liquid Reservoir Tanks located within the undercarriage of the Vehicle that contains adequate reserves of those liquids necessary for supply to other systems in the Enviro-Car during operation. The necessary liquid compounds or ratios thereof required by a particular process or method may be changed, eliminated or added through subsequent improvements of such. As a result, these storage tanks may be used to store differing compounds or quantities as process or method improvements are developed. Additionally, the use of two (2) separate tanks is only exemplary in this illustration and there may be more or less than this number as required by the particular process or method so utilized at that time.

p. An electrically driven Liquid Pump System located within the undercarriage or Front Compartment of the Vehicle that supplies adequate liquids when needed to other systems in the Enviro-Car during operation. There is also a network of pipes, valves, hoses, tanks, reservoirs and/or other such components throughout the vehicle.

q. An electrically operated CO2 Compressor located in the Rear Compartment to evacuate the free Carbon Dioxide from the entirety of the Collection Chamber after the completion of the Desorption Process. Thereafter, the CO2 is devoided of residual water, cooled, piped to the rear of the Enviro-Car and discharged into the CO2 Main Reservoir for short-term storage prior to further cooling, compression and liquification for final Enviro-Car to CDAC Tank Car off-loading.

r. In an alternate embodiment, a Hybrid CO2 Compressor is installed which transfers a substantial amount of the CO2 compression heat into the water utilized by the Steam Generator. According to the laws of thermodynamics, the energy used to compress air is transformed into heat and the major portion of this heat—more than 90%—remains in the compressed air. Hot water up to 90° C. can be recovered from the compressed air system. In this way, a substantial amount of the energy requirements for steam production can be derived from the CO2 compression cycle energy inputs.[43] Correspondingly, the high-pressure CO2 is inversely cooled in this process prior to being devoided of residual water, cooled, piped to the rear of the Enviro-Car and discharged into the CO2 Main Reservoir for short-term storage prior to further cooling, compression and liquification for final Enviro-Car to CDAC Tank Car off-loading.

s. An Air Dryer in place either before or after the CO2 Compressor to remove and recover the free gaseous water vapor from the Collection Chamber through either/or both a method of compression and/or a method of cooling and returning such recovered water back into the Water Reservoir Tank.

t. Two large Front and Rear Heat Exchangers ("Heat Exchangers") installed within (or as) the exposed grill structure of the Front Intake and Rear Vent. These heat exchangers take in the high-pressure CO2 gas after it has been devoided of water and discharged by the Air Dryer. In this way, the high-pressure CO2 is cooled prior to being piped to the rear of the Enviro-Car and discharged into the CO2 Main Reservoir for short-term storage prior to further cooling, compression and liquification for final Enviro-Car to CDAC Tank Car off-loading.

u. One Large Onboard CO2 Main Reservoir located at the rear of the Vehicle and is comprised of the rear domed end of the Enviro-Car as well as a similar, interior dome of similar construction that together with the cylindrical circumference of a portion of the Collection Chamber comprise a large, semi-spherical reservoir capable of handling a fairly large volume of liquid and/or gaseous CO2 at high-pressures prior to final discharge into a CDAC Tank Car or other site in a liquid state.

i. In this exemplary embodiment, the Onboard CO2 Main Reservoir would have a holding capacity of approximately 15 tonnes of liquid CO2 and would likely hold approximately eighteen (18) hours of production capacity.

ii. This exemplary eighteen hours of storage volume is equivalent to that a normal long-distance Freight Train might travel between significant Rail Yard stops where crew changes, fueling or minor service will occur. At this same stop, the Onboard CO2 Main Reservoir on each deployed Enviro-Car within that Train is emptied into a stationary group of one or more CO2 Tank Cars located at that particular Rail Yard.

v. In some deployments, each Enviro-Car within the Enviro-Rail Consist is connected to the other by way of the Pass-Through CO2 Connection described below, only one connection to the off-loading site would have to be made in order to empty every CO2 Main Reservoir within that Train. In this way, multiple connections and/or Train indexing would not have to occur during the CO2 off-loading process. In this way, needing an attached, dedicated, "in-consist" CO2 Tank Car to off-load the harvested CO2 while in-motion could be avoided and the corresponding increase in efficiency and productivity are realized.

w. As CO2 capture productivity or time between significant stops increases and more CO2 can be harvested within an eight-hour period, this CO2 Main Reservoir could be made larger by carefully removing the interior welds securing the interior dome to the Collection Chamber circumference and moving it a corresponding amount towards the front of the of the Vehicle.

x. In an alternate embodiment, there is no Onboard CO2 Main Reservoir or the Onboard CO2 Main Reservoir is used in conjunction with an attached, dedicated, "in-consist" CO2 Tank Car is utilized to off-load the harvested CO2 while in-motion.

y. A flexible high-pressure CO2 Connection Hose installed at the rear of the Vehicle with a diameter of approximately 3"-6" inches and a length of approximately 4-6 meters with a quick-connection termination fitting to enable downstream connection to the CDAC Tank Car or another off-loading site.

z. A Connection Hose Support Arm mounted in an appropriate location at the rear to the Vehicle to enable the safe and proper deployment of the Connection Hose(s) between the Enviro-Car and CDAC Tank Car to maintain the proper height above the Couplers and limiting lateral movement while the vehicle is in motion.

aa. A fixed, high-pressure, valved Pass-Through CO2 Connection Fitting mounted to the front of the Vehicle which receives a hose of the same characteristics as the above-described CO2 Connection Hose. Thereafter, this connection traverses the length of the Vehicle as insulated steel pipe and finally joins the rear CO2 Connection Hose at a "Y" connection which allow pass-through of captured CO2 from any additionally connected forward Enviro-Car(s) to the mutual downstream CDAC Tank Car or other off-loading site.

bb. Two normal and customary FRA Compliant Truck Assemblies which contain the Wheel and Axle Assemblies, Brake Components, Suspension Components and other such parts and equipment which allow the Vehicle to travel by rail in a regular fashion located behind the forward Locomotive(s).

cc. Z. In addition, there are a variety of Air Brake Components, Reservoir Tanks, Valves and Piping for compressed air from the Locomotive to operate the Vehicle Brakes which is also umbilically supplied to trailing Train cars. There are a number of air hoses with "Glad Hand" style connections located at both the front and rear of the Vehicle and other such parts and devices which allow the Vehicle to travel by rail in a regular fashion located behind the forward Locomotive(s).

dd. Two normal and customary FRA Compliant Coupler Assemblies and Draft Gears mounted at both the front and rear of the Vehicle which contain the Coupling Devices, Lateral Force Suppression Device ("Draft Gears") which mitigate excessive forward and backward forces placed upon the Couplers, Uncoupling Devices and other such parts and equipment which allow the Vehicle to travel by rail in a regular fashion located behind the forward Locomotive(s).

ee. One normal and customary FRA Compliant Handbrake mounted at rear of the Vehicle which allows for the application of the Vehicle brakes without Locomotive supplied compressed air allowing the Vehicle to travel and remain stopped in a regular fashion.

ff. In all exemplary embodiments, Automation of Systems and Processes is utilized to the greatest extent possible to minimize required human interface or labor inputs.

Optional Enviro-Car Equipment and Embodiments a. Environmental Particulate Pre-Filter is an alternate embodiment where an appropriate low-resistance filter media is installed forward of the SAM Cells that would capture and prevent the fouling of the SAM media with most macro-scale particulate matter such as dirt, dust, debris, insect or those particulates emanating from the diesel engine.

b. Top Platform is an alternate embodiment where there is a platform surrounded by aerodynamic fairings mounted atop the Vehicle between the Front Intake and Rear Vent that can contain components and/or equipment necessary for the operation of the Enviro-Car in the configuration so utilized at that time. In this embodiment there is also a ladder leading to the Top Platform that is mounted to the side of the Vehicle either on the right or left side.

c. Rear Compartment is an alternate embodiment where there is no CO2 Main Reservoir but rather a compartment located at the rear of the Vehicle. This is placed within the hull of the Collection Chamber but separated from such by the underside of the aforementioned Rear Air Ramp with the access door being comprised of the rear domed end of the Enviro-Car. In this compartment various additional or reconfigured components and/or pieces of equipment are placed which enables or enhances the operation of the Enviro-Car.

Solid SAM Enviro-Car is a novel method herein disclosed and an alternate embodiment of an Enviro-Car where the deployed sorbent aeration media are all solid in composition but have differing characteristics, various structural embodiments and many distinct forms. In the primary exemplary embodiment, heat or steam is used to potentiates the desorption process. In other examples, application of a vacuum or changes in humidity might potentiate the desorption process. In still other examples, the reversal of an electric charge passed through the media potentiates the desorption process. Even additional examples of absorption media technology exist now or might exist in the future which this Enviro-Rail technology could utilize in its DAC processes. In fact, Enviro-Rail will almost certainly utilize more than one DAC media type across its broad deployment.

a. Temperature/Vacuum-Swing Solid SAM DAC is a novel method herein disclosed and an alternate embodiment of a Solid SAM Enviro-Car where the deployed Solid SAM DAC Cells have Temperature/Vacuum-Swing potentiated desorption. In this exemplary embodiment, all the aforementioned features and characteristics disclosed in Section [0098] are present with the additions, subtractions and/or modifications pertaining to the following:

i. Multiple Banks of Temperature/Vacuum Swing Solid SAM Cells totaling many cubic meters in volume and the SAM Housings to contain them.

ii. Two Air-Tight Doors or Shutter Mechanisms ("Vacuum Doors") located within or around the Front Inlet and Rear Outlet to allow for the complete sealing off of the Collection Chamber to enable the application of a strong vacuum to the entirety of the Collection Chamber when needed on a periodic basis to potentiate the SAM Cell Desorption Process.

iii. An electrically operated Vacuum System ("Vacuum System") located in the Front Compartment and/or Rear Compartment to allow for the rapid evacuation of the contained air volume and the creation of a strong vacuum in the entirety of the Collection Chamber when needed on a periodic basis to potentiate the SAM Cell Desorption Process.

iv. An electrically operated Steam Generator ("Steam Generator") located in the Front Compartment and/or Rear Compartment to allow for the rapid heating of the entirety of the Collection Chamber and SAM Cells with gaseous water vapor when needed on a periodic basis to potentiate the SAM Cell Desorption Process.

v. At least two (2) large Water Reservoir Tank ("Water Reservoir Tank") located within the undercarriage of the Vehicle that supplies adequate liquid water to the Steam Generator when needed on a periodic basis to potentiate the SAM Cell Desorption Process.

vi. An electrically driven Water Pump System ("Water Pump") located within the undercarriage of the Vehicle that supplies adequate liquid water to the Steam Generator when needed on a periodic basis to potentiate the SAM Cell Desorption Process.

vii. A Liquid Water Recovery System ("Water Catch Basin") which encompasses the entirety of the bottom part of the Collection Chamber and catches and recovers any free liquid water that has condensed within the Collection Chamber such as upon the SAM Cells, SAM Housings, or Collection Chamber walls and drains at a central point back into the Water Reservoir Tank.

b. Electrification-Swing Solid SAM DAC System ("Electro-Swing or Electro DAC") is a novel method herein disclosed and an alternate embodiment of an Enviro-Car which utilizes currently available proprietary technology. It is an alternate embodiment of a Solid SAM DAC system and is disclosed as having Electrification-Swing potentiated adsorption/desorption. In this exemplary embodiment, all the aforementioned features and characteristics disclosed in Section [0098] are present with the additions, subtractions and/or modifications pertaining to the following:

i. Multiple Banks of Electro-Swing Cells totaling many cubic meters in volume and the SAM Housings to contain them.

ii. An Electrification System ("Electrification System") to enable the application of the appropriate charge to the Electro-Swing Cells in the Collection Chamber when needed on a periodic basis to potentiate the Electro-SAM Cell Desorption Process.

iii. At least two (2) large Liquid Reservoir Tanks which store the required electrolyte fluid located beneath the frame in the undercarriage of the Vehicle.

iv. Piping and Distribution System in the Collection Chamber above and/or around the Electro-Swing Cells to evenly distribute the electrolyte fluid onto and/into the substrate.

v. Two Air-Tight Doors or Shutter Mechanisms ("Vacuum Doors") located within or around the Front Inlet and Rear Outlet to allow for the complete sealing off of the Collection Chamber to enable the application of a strong vacuum to the entirety of the Collection Chamber when needed on a periodic basis to potentiate the SAM Cell Desorption Process.

vi. An electrically operated Vacuum System ("Vacuum System") located in the Front Compartment and/or Rear Compartment to allow for the rapid evacuation of the contained air volume and the creation of a strong vacuum in the entirety of the Collection Chamber when needed on a periodic basis to potentiate the SAM Cell Desorption Process.

c. Rotary Solid SAM DAC System ("Rotary DAC") is a novel method herein disclosed and an alternate embodiment of an Enviro-Car which utilizes currently available proprietary technology. It is an alternate embodiment of a Solid SAM DAC system and is disclosed as having Temperature Swing (Steam) potentiated desorption. In the exemplary case, all the aforementioned features in Section [0098] are present with the additions, subtractions and/or modifications pertaining to the following:

i. One or more large cylindrical Rotary DAC Systems of approximately the same diameter are installed within the Collection Chamber which primarily contains the Solid SAM Cells mounted upon a laterally rotating wheel-type structure. This Rotary Solid SAM DAC System operates cyclically in a rotary perpetual loop configuration at approximately one (1) RPM. (See Figures) In these systems, ambient air is blown through a portion of the radial solid adsorbent media where the $CO_2$ in that air is adsorbed. Next, that same portion rotates around to the desorption stage within the Rotary DAC device. Here the solid adsorbent saturated with $CO_2$ is exposed to heat and/or vacuum to liberate the $CO_2$ from the solid adsorbent. Finally, the solid sorbent is cooled and rotated back to its starting position where the cycle repeats and the adsorption stage is restarted.

ii. A network of Ductwork ("Ductwork") is installed within and without the Collection Chamber to route the appropriate volumes of pre-adsorption air, post-adsorption air and recovered Carbon Dioxide either into the Rotary DAC device adsorption stage (pre-adsorption air), from the Rotary DAC device adsorption stage to the Rear Vent for release back into the atmosphere (post-adsorption air), or from the desorption stage to the $CO_2$ Compressor (recovered Carbon Dioxide).

iii. An electrically operated Vacuum System ("Vacuum System") located in the Front Compartment and/or Rear Compartment to allow for the rapid evacuation of the contained air volume and the creation of a strong vacuum in the entirety of the Collection Chamber when needed on a periodic basis to potentiate the SAM Cell Desorption Process.

iv. An electrically operated Steam Generator ("Steam Generator") located in the Front Compartment and/or Rear Compartment to allow for the rapid heating of the entirety of the Collection Chamber and SAM Cells with gaseous water vapor when needed on a periodic basis to potentiate the SAM Cell Desorption Process.

v. At least two (2) large Water Reservoir Tank ("Water Reservoir Tank") located within the undercarriage of the Vehicle that supplies adequate liquid water to the Steam Generator when needed on a periodic basis to potentiate the SAM Cell Desorption Process.

vi. An electrically driven Water Pump System ("Water Pump") located within the undercarriage of the Vehicle that supplies adequate liquid water to the Steam Generator when needed on a periodic basis to potentiate the SAM Cell Desorption Process.

Liquid SAM Enviro-Car is a novel method herein disclosed and an alternate embodiment of an Enviro-Car where the deployed sorbent aeration media is liquid in composition but may have differing characteristics, various process embodiments and many distinct forms. In this exemplary embodiment, all items in Section [0098] are present with the additions, subtractions and/or modifications pertaining to the following:

a. At least two (2) large Liquid Reservoir Tanks which store both the input,
b. Decarbonized Sorbent Fluid and output, Carbonized Sorbent Fluid located beneath the frame in the undercarriage of the Vehicle.
c. SAM Cells in the Collection Chamber to temporarily contain and aerate the decarbonized Liquid SAM fluid during the absorption cycle.
d. Piping and Distribution System in the Collection Chamber above and/or around the SAM Cells to evenly distribute the decarbonized Liquid SAM fluid onto and/into the SAM Cells.
e. A CS Fluid Catch-Basin ("Catch Basin") which encompasses the entirety of the bottom part of the Collection Chamber and catches and recovers the CS Fluid after it has traveled through the SAM Cells and become carbonized by interaction with ambient air.
f. Desorption and Liquid Regeneration Components, Equipment, Parts and/or Processes that take in the carbonized sorbent fluid and, through one or more steps, remove the chemisorbed Carbon Dioxide from the solution. Thereafter, the free Carbon Dioxide gas is removed from the system for further compression, cooling, and liquefication. The now decarbonized sorbent fluid either is returned to the Liquid Reservoir Tanks for further use or continues to be processed in one or more steps to complete the full regeneration cycle before being returned to the Liquid Reservoir Tanks for further use. This entire process may involve the addition, removal or modification of chemicals or compounds and contain relevant steps and utilize equipment such as causticizers, slakers, clarificatory, calciners, filters, stirrers, heaters, coolers, pressure vessels, vacuum chambers and/or other such equipment required by the particular process or method so utilized at that time.

Locomotive Emissions Mitigation Railcar Device ("LEM-Car") is a novel invention herein disclosed and an alternate embodiment of an Enviro-Car where the primary focus is on Mitigation of Locomotive Emissions which primarily includes Carbon Dioxide and Particulate Matter (including Black Carbon) but may also include other such emissions. In this exemplary embodiment, all the aforementioned features and characteristics disclosed in Section [0098] are present with the additions, subtractions and/or modifications pertaining to the following:

a. DAC Processes Since the partial pressures of Carbon Dioxide are much higher in exhaust than in ambient environmental air, this first LEM-Car connected immediately behind the ERDB Locomotive would have significantly higher Carbon Dioxide capture productivity than a regular CDAC-Car and would most likely have different operational characteristics such as utilizing different DAC systems—such as Rotary DAC Systems—and/or operating with reduced cycle times.
b. Locomotive Exhaust Transfer Array ("LETA") is a novel invention herein disclosed and an alternate embodiment of a LEM-Car deployment. The Locomotive Exhaust Transfer Array is installed atop of a ERDB Locomotive directly above the engine exhaust in a front-to-back horizontal direction which transfers a substantial portion of the Locomotive's diesel engine exhaust to be scrubbed of Carbon Dioxide or other emissions while the Train is in motion.
c. Locomotive Exhaust Direct Array ("LEDA") is an alternate and novel embodiment of a LEM-Car deployment. The Locomotive Exhaust Direct Array is installed between the ERDB Locomotive and a dedicated, semi-permanently attached LEM-Car which allows for complete Locomotive to LEM-Car emissions transference. This would include the installation of a LEDA Inlet Port within or near the Front Intake of the LEM-Car and other such modifications to the basic CDAC-Car embodiment.
d. Exhaust Particulate Pre-Filter is installed forward of the SAM Cells that would capture and prevent the fouling of the SAM media with both small and large particulate emanating from the diesel engine such as might especially occur with a direct connection between the ERDB Locomotive and the LEM-Car as disclosed above.
e. Pass-Through MU Connection is installed at both the front and aft-ends of the Vehicle which receives a standard Multiple-Unit ("MU") connection cable and traverses the length of the Vehicle. This allows pass-through of Locomotive MU control in deployments where a LEM-Car is placed between two or more lead Locomotives.
f. Additional Emission Reduction is an alternate embodiment where there are processes contained and active within the Collection Chamber to scrub other types of pollutants besides CO2 from the exhaust gasses of the Locomotive. This could be used to mitigate Carbon Monoxide (CO), Hydrocarbons (HC), Particulate Matter (PM), Nitrogen Oxides (NOx) and/or other such pollutants. These processes could include any technology used for that purpose and include filtration, adsorption, absorption, catalytic conversion, catalytic reduction, diesel exhaust fluid ("DEF") or other such process or method.

Urban Emissions Mitigation Railcar Device ("UEM-Car") is a novel invention herein disclosed and an alternate embodiment of an Enviro-Car where the primary focus is on Mitigation of Urban Emissions which might include—but is not limited to—Particulate Matter (including Black Carbon), Ground-Level Ozone, Nitrogen Dioxide, Sulfur Dioxide and/or Carbon Monoxide. 4.2 million deaths every year occur as a result of exposure to ambient (outdoor) air pollution and 91% of the world's population live in places where air quality exceeds WHO guideline limits.[44] Until now, no large-scale system exists that can help mitigate this important global health issue.

The UEM-Car can process up to seven million cubic meters of urban air per day. At this level of productivity, one UEM-Car can process a cubiform of air 10 city blocks by 10 city blocks and 100 meters high in less than 1 day—or—one kilometer by one kilometer and 100 meters high in under 14 days—significantly improving urban air quality and respiratory health. It is anticipated that the UEM-Car will be utilized in major urban areas that experience moderate to severe air-quality issues either intermittently or continually and will be primarily deployed in consist with Passenger Rail Trains but can also ideally be deployed with local-service Freight Rail Trains. In an exemplary embodiment, an urban-area Passenger Train is configured with one LEM-Car including a LEDA Array coupled directly behind a ERDB Locomotive, one UEM-Car coupled thereafter, two CDAC-Cars coupled thereafter, the normal and customary consist of Passenger Rail Cars coupled last, and with Rail Solar deployed atop all of these cars. In this deployment:

a. Particulate Matter and $CO_2$ emissions from the ERDB Locomotive are captured by way of the LEM-Car;
b. Particulate Matter from ambient urban air is captured by way of the UEM-Car;
c. Anthropogenic Carbon Dioxide from ambient environmental air is captured by way of the twin CDAC-Cars;
d. Each Enviro-Car receives an appropriate proportionate share of the Regenerative Dynamic Braking and the Train Solar Energy to recharge its independent Battery Array and power operations.
e. In this embodiment, a primary focus is on the capture of particulate matter within filter media of varying density and micron capability. In this way, we can see that this type of deployment will require frequent service and filter changes depending on ambient air Particulate Matter density and UEM-Car daily usage.
f. In this exemplary embodiment, all the aforementioned features and characteristics disclosed in Section [0098] are present with the addition and subtraction of the following:
g. Higher capacity Fans and/or fan motors are installed in both the Front Air Fan and Rear Air Fan locations to improve Collection Chamber air-stream throughput due to increased pressure drop inherent with particulate filtration.
h. $CO_2$ Direct Air Capture SAM Cells and SAM Housings in a traditional CDAC-Car deployment are removed and replaced with the Particulate Matter filter and housing deployment shown below:
i. Particulate Pre-Filter is a large housing containing many physical media filters that encompasses the entirety of the Collection Chamber's diameter and is installed at the foot of the Front Air Ramp. This filter is designed to trap most macro-scale matter that enters the Collection Chamber such as dirt, dust, debris, insect or those particulates emanating from the diesel engine;
j. E4 Particulate Filter is a large housing containing many physical media filters that encompasses the entirety of the Collection Chamber's diameter and is installed immediately behind the Particulate Pre-Filter. This filter is designed to absorb Large Particulate Matter exceeding 10.0 μm in size;
k. E3 Particulate Filter is a large housing containing many physical media filters that encompasses the entirety of the Collection Chamber's diameter and is installed immediately behind the E4 Particulate Filter. This filter is designed to absorb Medium Particulate Matter including some Black Carbon particles between 3.0 μm to 10.0 μm in size;
l. E2 Particulate Filter is a large housing containing many physical media filters that encompasses the entirety of the Collection Chamber's diameter and is installed immediately behind the E3 or Electrostatic Particulate Filter. This filter is designed to absorb Small Particulate Matter including most Black Carbon particles between 1.0 μm to 3.0 μm in size;
m. Optional Electrostatic Particulate Filter is a large housing containing many horizontally or vertically spaced electrodes that encompasses the entirety of the Collection Chamber's diameter which electrostatically charge and collect small particles and is installed behind the E3 Particulate Filter. This filter is designed to selectively entrap some Particulate Matter under 3.0 μm in size.
n. DAC Processes have been exclusively discussed within this document as pertaining solely to the selective capture and release of Carbon Dioxide. However, DAC is not the exclusive dominion of Carbon Dioxide and has been demonstrated as being productive with a variety of contaminants—albeit with differing media structure and composition. Another embodiment of a UEM-Car includes the appropriate SAM Housings and SAM Cells to capture and store non-particulate pollutants such as Ground-Level Ozone, Nitrogen Dioxide, Sulfur Dioxide and/or Carbon Monoxide.

Booster Unit Capability is a novel invention herein disclosed and an alternate embodiment of an Enviro-Car of the CDAC-Car, LEM-Car or UEM-Car form which is deployed with the addition of Locomotive-Type Truck Assemblies containing Traction Motors. These electric motors are utilized for both additional Dynamic Braking Stopping Power and the resulting additional Dynamic Braking Energy when the Train needs to either slow or stop. Additionally, these Traction Motors affixed to the Enviro-Car would add Booster Unit operability to the Train and would—when needed—either receive excess generated electrical power, umbilically, from the Locomotive(s) or stored power from its own Battery Array.

a. In Train-starting operations, the Unit receives excess electrical power from the Locomotive(s) to add additional tractive effort to the Train. This is primarily useful when starting a Train from a dead-stop when the Locomotive(s) have excess horsepower available but are primarily limited in their capability by their weight upon the rails (tractive effort). This enables significantly heavier Trains to be started from a dead-stop but does not add to the ability of the Train to achieve higher maximum operating speeds. This is particularly desirable to Railroads which operate heavy Trains but at low operating speeds.
b. In line-haul operation, the Unit utilizes its own self-contained source of power within the Battery Array—when needed—to add additional motive-power to that Train allowing it to achieve higher maximum operating speeds. This is particularly desirable to Railroads which operate heavy Trains at normal operating speeds which sometimes need additional motive-power.
c. This Battery Array is regenerated by Dynamic Braking Energy from its own Traction Motors and those of the Locomotive(s), track/catenary electrification and/or the photovoltaic cells mounted atop the Railcars.
d. Enabling an Enviro-Car in this way allows for a reduced number of Locomotives being required for a given Train of a certain size in some types of operations and/or reduced fuel consumption and corresponding reduced emissions. This Booster Unit could impart an additional 3,000 HP or more of zero-emission power to the Train under certain circumstances and would be a paradigm shift in both Railroad operations and environmental stewardship.
e. Moreover, an Enviro-Car with Booster Capability could utilize such to add small amounts of motive-power to the Train which is fundamentally equal to its additional (albeit slight) incremental train-loading and aerodynamic demands—thereby eliminating any loss of efficiencies or increased fuel consumption.

f. In this embodiment, a unit with Booster Capability would have the following equipment in addition to that for a customary Enviro-Car:

g. Locomotive-style Truck Assemblies including high-efficiency AC or DC Traction Motors;

h. Microprocessor Motive-Power Control System including wheel-slip control and intelligent Locomotive Control System interface;

i. Cables, wires, connectors, harnesses, conduits, relays, interlocks, rectifiers, inverters, sensors, alerting systems, lights, telemetry systems, consoles, human interface devices and/or other such components which pertain to the electrical and Motive-Power Control System's design.

Track/Catenary Electrification Capability is an alternate embodiment of an Enviro-Car of the CDAC-Car, LEM-Car or UEM-Car form which is deployed with the equipment enabling Track/Catenary Electrification Capability. In this way, the Regenerative Dynamic Braking and/or Train Solar Array energy could be augmented by additional power obtained from Track/Catenary Electrification on those Rail Lines with this feature. This allows for greater DAC productivity and additional Booster Unit capabilities. In this embodiment, the Enviro-Cars are outfitted with "3d Rail" and/or Catenary electrical contactors and all required components and equipment thereto related.

Fixed-Charging Station/Direct-Connection Capability is an alternate embodiment of an Enviro-Car of the CDAC-Car, LEM-Car or UEM-Car form where there is an appropriate high-voltage receptacle mounted to one or both sides of the Vehicle that allows for a connection to a land-based Fixed-Charging Station or Direct-Connection Receptacle.

a. Fixed-Charging Station Capability and Direct-Connection Capability are different operational methodologies that present with the same physical embodiment.

b. For instance, Fixed-Charging Station Capability is used to maintain the Battery Array at an ideal charge during periods of equipment down-time. In an ideal deployment, if the Solar Panels mounted atop the Vehicle were not adequately maintaining the battery charge, the host Railroad would connect the Enviro-Car to a land-based Fixed Charging Station (ideally carbon-neutral) to maintain the Battery Array at full capacity when the unit was not in active service.

c. Alternatively, Direct-Connection Capability is used to permanently or semi-permanently connect the Enviro-Car to a land-based source of carbon-neutral power from which to continually operate its environmental functions. (See below)

d. In both cases, this appropriate high-voltage receptacle mounted to one or both sides of a Vehicle would likewise supply the Battery Array charging needs and/or Direct Connection power needs of up to ten (10) additional Enviro-Cars in consist with the first by way of their Pass-Through Umbilical Cables. In this way, multiple connections to the land-based receptacle could be avoided.

Autonomous Operations Capability is a novel invention herein disclosed and an alternate embodiment of an Enviro-Car of the CDAC-Car or UEM-Car form which is deployed with Booster Capability, possibly with Track/Catenary Electrification Capability and equipment enabling Autonomous Operation Capability. In this way, on those Railways where there is significant periods of the day, night or weekends in which Rail Traffic is halted or greatly reduced, the Enviro-Cars could continue their CO2 DAC or Urban Emissions Mitigation operation outside of the greatly preferred method of being attached to a Train already running in regular service.

a. Enviro-Cars so equipped with this capability are able to operate autonomously during those periods when normal rail traffic is reduced or halted and would not need to be attached to a Locomotive. During operation, these Autonomous Enviro-Cars would route either Battery Array power or Track/Catenary power to their onboard Traction Motors to enable motion.

b. An exemplary deployment of this type is imagined in major urban areas that experience moderate to severe air-quality issues either intermittently or continually which deploy Enviro-Cars during the peak hours within normal and customary Passenger Rail Trains but have extended periods where rail traffic is halted or reduced. In this case, a UEM car could be detached at the end of the day from its normal Train consist, be made operational in autonomous mode and continue nonstop operations.

c. This is especially ideal for Particulate Matter mitigation processes in that both thermal and ground activity lofting of most particulates is greatly reduced during night hours. This nighttime "settling" increases near-ground particle density and would increase UEM productivity and overall PM mitigation efforts.

d. The UEM-Car would travel to a pre-designated location or neighborhood based upon air-quality reports and/or population size where it would come to a stop, engage both the Front and Rear Collection Chamber Fans and commence Urban Emissions Mitigation ("UEM") operations for a predetermined period of time. Thereafter, the UEM-Car would, perhaps, move to a secondary location and recommence UEM operations or return to its origin Rail Yard for re-inclusion within its normal Train consist for standard, non-autonomous operation.

e. Many other Autonomous UEM-Cars would so too be configured in this way and are deployed to a number of various locations within the greater urban area. This system will address Urban Air Pollution in a real and demonstrable way using the most advanced modeling algorithms to predict air quality and best practices operational parameters such as fleet deployment planning, ideal UEM locations, preferred UEM duration and/or employed UEM processes.

f. In this type of deployment, the following criteria and transportation infrastructure are required:

i. There are extenuating circumstances that make construction of fixed land-based DAC/UEM deployments unfeasible such as political climate, funding, local regulations, zoning laws, varied dispersion patterns, and/or no or uneconomical availability of sufficient land to contain the required footprint.

ii. There must exist certain extended periods of time in which rail traffic is halted or greatly reduced such as might be the case with Passenger Railroads during the late-night hours and the DAC and/or UEM Equipment would otherwise sit idle.

iii. Positive Train Control infrastructure exits in which automated, self-driving Train deployments could be easily integrated.

iv. Uninterrupted, high-accuracy GPS coverage or Positive Train Control wayside sensors exist throughout the selected 30-60+ km section of Rail Line.

v. Visibility throughout the selected 30-60+ km section of Rail Line is generally unobstructed by weather phenomenon which would inhibit the performance of electronic sensors such as daytime or nighttime cameras, LiDAR, FLIR, etc.
vi. There exist no or few grade-crossings and/or advanced grade-crossing infrastructure exists which would mitigate most risk associated with grade-crossing accidents.
vii. If desired, warning devices such as horns or bells could safely be unused such as would be important if deployed in a metropolitan area during the late-night hours.

g. In an alternate embodiment, the Enviro-Cars could utilize Track/Catenary Electrification or even their onboard Battery Array to continue movement at the same time that they perform their other assigned environmental duties. We immediately see that this sort of deployment comes inherent with certain obvious draw-backs. Since the Enviro-Car would not be in consist with a Train already running in regular service, the Enviro-Car's kinetic energy requirements are no longer close to a zero-sum game and must be fully factored into the efficiency equation. With these facts in mind however, this exemplary capability might be warranted as long as both the aforementioned criteria and below criteria are met:
i. There must be Track/Catenary Electrification throughout the entirety of a 30-60+ km section of Rail Line where the autonomous, self-driving Enviro-Car would travel back-and-forth at an ideal speed for the specific DAC process so to then deployed.
ii. The direct electric feedstock of the Track/Catenary Electrification must be carbon-neutral.
iii. The direct electric feedstock of the Track/Catenary Electrification must be in ample or excess supply such as might occur during the late-night or weekend periods in major metropolitan areas.
iv. The direct electric feedstock of the Track/Catenary Electrification must be carbon-neutral and not divert away output from other regions within the larger electrical grid that would require increased production from non-carbon-neutral generation stations.
v. The specific DAC or UEM processes so to then deployed are capable of operation in both a forward direction and a backward direction. This would include most traditional Solid DAC, most Liquid DAC, most Rotary DAC and most Electro DAC.

h. In these cases, the Autonomous Enviro-Car would have the following equipment in addition to that for Booster Capability and/or Track/Catenary Electrification Capability:
i. Autonomous Operation Control System;
ii. Positive Train-Control System and related way-side sensors and equipment;
iii. Long-range or way-side Radio, Wi-Fi, cellular and/or satellite interface equipment;
iv. Manual Override, long-range or way-side radio, Wi-Fi, cellular and/or satellite Remote Control equipment;
v. Extreme-reliability Fail-Safe sensors and equipment;
vi. GPS sensors;
vii. Electromagnetic emitting and receiving equipment such as daytime or nighttime cameras, RADAR, LiDAR, FLIR, etc.;
viii. Intrusion or proximity sensors such as infrared, ultrasonic and/or daytime or nighttime cameras;
ix. Audio receiving and emitting equipment.

Stationary Operations Capability is a novel invention herein disclosed and an alternate embodiment of an Enviro-Car of the CDAC-Car or UEM-Car form with Track/Catenary Operation Capability and/or Direct-Connection Capability which is deployed with Stationary Operation Capability. In this way, DAC and/or UEM equipment can be operated in stationary deployments like traditional land-based DAC operations but retain the mobility and other benefits inherent with the Enviro-Rail System. While this type of deployment is in no way as efficient or as productive as the greatly preferred method of being attached to a Train already running in regular service and recouping the benefits therein related, Enviro-Rail in a stationary deployment is just as efficient and productive as other land-based DAC operations—perhaps more so.

a. An entity may wish to deploy DAC or UEM functionality in a stationary setting for the following reasons:
i. Rail Traffic is not sufficient in that geographical area to support mobile Enviro-Rail operations at the desired scale;
ii. Train operating speeds are not sufficient in that geographical area to create adequate Regenerative Braking Energy production to support mobile Enviro-Rail operations at the desired scale;
iii. Train loadings are not sufficient in that geographical area to create adequate Regenerative Braking Energy production to support mobile Enviro-Rail operations at the desired scale;
iv. Train Solar Energy production is not sufficient in that geographical area to adjunct Regenerative Braking Energy production to support mobile Enviro-Rail operations at the desired scale;
v. Renewable, carbon-neutral energy production in that geographical area is massive and overly abundant and enormous DAC and/or UEM deployments are desired without logistical processes that come inherent with mobile Enviro-Rail systems;

b. However, an entity may wish to deploy DAC or UEM functionality in a stationary setting but also have asset mobility for the following reasons:
i. For purposes of potential UEM redeployment to areas of highest need;
ii. For purposes of potential redeployment to other areas with a higher supply of renewable, carbon-neutral energy;
iii. For purposes of potential redeployment to other areas with a lower cost of renewable, carbon-neutral energy;
iv. For purposes of potential redeployment to other areas where large-scale photovoltaic generating assets are planned or under construction;
v. For purposes of potential redeployment to other areas where photovoltaic generating capacity is reduced during certain seasons and will only support a reduced number of units;
vi. For purposes of potential redeployment to other areas where large-scale wind generating assets are planned or under construction;
vii. For purposes of potential redeployment to other areas where wind generating capacity is reduced during certain seasons and will only support a reduced number of units;

viii. For purposes of potential redeployment to other areas where hydroelectric generating assets are planned or under construction;

ix. For purposes of potential redeployment to other areas where nuclear generating assets are planned or under construction;

x. For purposes of potential redeployment to other areas with more ideal access to geothermal resources;

xi. For purposes of potential redeployment to areas of less geopolitical risk;

c. An entity may wish to deploy DAC functionality in a stationary setting but recognizes the cost advantages of construction and deployment occurring in separate geographical areas. For instance, construction can enjoy economies of scale by being undertaken in urban centers whereas deployment would occur in remote geographical areas;

d. An entity may wish to deploy DAC or UEM functionality for purposes of "Carbon Pricing" or incremental increases or decreases of carbon-negative production to correspondingly match carbon-positive emissions in those industrial operation where there is an internal or external mandate to remain carbon-neutral in their production activities.

i. For instance, the vast majority of medium to large industrial operations have rail access, rail sidings and sizeable rail yards in which they receive production inputs and ship production outputs. These operations also have abundant access to energy which—currently—may or may not be from renewable, carbon-neutral sources.

1. As an example, a chemical production plant with abundant access to renewable, carbon-neutral energy could take in, say, twenty-five (25) CO2 DAC Enviro-Cars to approximately correspond to their CO2 emission of 150,000 tonnes for that period. These cars are made operational in a stationary deployment within their industrial rail yard and connected to their energy supply.

2. This chemical production plant would, for instance, pay for both the Lease of the 25 CO2 DAC Enviro-Cars and also the Energy required to operate them.

3. In this way, the chemical production plant has removed an equivalent amount of CO2 from the atmosphere with the Enviro-Rail System as it has emitted during that period. Moreover, the chemical company receives compensation from the US Treasury in the form of a Section 45Q Tax Credit in the amount of $50 USD per tonne of sequestered CO2.

4. As the production and corresponding CO2 emissions of the chemical production plant increases or decreases at various intervals, the number of stationary deployed CO2 DAC Enviro-Cars could also be modulated accordingly.

5. In this way, if CO2 emissions were reduced, the corresponding number of CO2 DAC Enviro-Cars could be removed from operation at the end of the, say, six-month Lease term and moved by the connecting Railroad to another location with greater need.

6. By having the carbon removal equipment on-site there would be a substantial soft-benefit for that company in demonstrating their commitment to the environment in a clear and obvious way.

ii. This same type of Enviro-Rail Carbon Pricing (without the soft-benefit) could even occur off-site at a central yard of many hundreds of CO2 DAC Enviro-Cars with direct access to a renewable, carbon-neutral energy source.

1. Companies would lease the appropriate number of Enviro-Cars to correspond with their emissions and reimburse the operator for the energy costs.

2. The companies could also "sponsor" an appropriate number of Enviro-Cars to correspond with their emissions and pay a flat rate per month per car sponsored.

3. Alternately, these companies could also pay a predetermined flat-rate for their respective carbon emissions and the operator would ensure that an additional incremental amount of CO2 was removed from the atmosphere by way of the Enviro-Rail Enviro-Cars in the operation.

e. These exemplary stationary deployments would be Environmentally Sound if the below criteria are first met:

i. There must be Track/Catenary or Direct-Connection power access of the ideal rating for the specific DAC/UEM process so to then deployed.

ii. The direct electric feedstock of the Track/Catenary or Direct power access must be carbon-neutral.

iii. The direct electric feedstock of the Track/Catenary or Direct-Connection power access must be in ample or excess supply.

iv. The direct electric feedstock of the Track/Catenary or Direct-Connection power access must be carbon-neutral and not divert away output from other regions within the larger electrical grid that would require increased production from non-carbon-neutral sources.

f. Enviro-Cars so equipped with this Stationary Operation Capability are able to operate continuously from a stationary or semi-stationary deployment such as a specifically constructed facility, yard, line or siding, an existing rail siding, abandoned rail line, existing rail yard or at various temporary locations during those periods when normal rail traffic is reduced or halted.

g. This type of deployment is imagined as being "en-masse" with many other like Enviro-Cars but could also consist of a smaller group or even individual units as might be an ideal deployment of UEM-Cars in neighborhoods or other locations with persistent air-quality issues.

h. During operation, these Enviro-Cars so equipped would power operations directly from Track or Catenary Electrification or Direct-Connection to overhead/underground power lines.

i. Alternatively, in situations where power is more desirable during "off-peak" hours, these units could power operations from their Battery Array during "peak" electric hours and then recharge their Battery Array from the grid power during the off-peak hours.

j. Moreover, a group of 10 or fewer Enviro-Cars could utilize a single Direct-Connection access point and then distribute such power amongst themselves through their Pass-Through Umbilical Cables thereby greatly simplifying set-up and reducing implementation costs.

k. Enviro-Cars so equipped with this Stationary Operation Capability can be imagined in the following deployments:

i. In a vast, remote desert region where several hundred CO2 DAC Enviro-Cars are powered by Direct-Connection to overhead power from a dedicated, large-scale Solar Farm Array.

ii. In major urban areas that experience moderate to severe air-quality issues either intermittently or continually and it is desirous to deploy, say, several dozen UEM-Cars in a centrally located, specifically constructed rail siding utilizing Direct-Connection Underground Power.

iii. Consisting of three dozen or so UEM-Cars in an urban area with mountainous geography which experiences severe temperature inversion-type air pollution in the winter months but enjoys relatively good air-quality during the summer months. Another urban area 1,000 miles away near the coast, on the other hand, experiences relatively good air quality during the winter months but often suffers from deleterious air-quality during the summer months. In this case, the two communities could jointly invest in this technology and share the same assets amongst themselves depending upon the time of year. During operation in the two urban centers, the UEM cars would have a stationary deployment, say, in an existing rail yard utilizing Direct-Connection Catenary Power but would be mobile between the two cities in the Spring and Fall using the connecting Railroad(s).

l. Enviro-Cars so equipped with this Stationary Operation Capability would have the following equipment in addition to that for Track/Catenary Electrification Capability or Direct-Connection Capability:

i. Higher capacity Fans and/or fan motors are installed in both the Front Air Fan and Rear Air Fan locations to improve Collection Chamber air-stream throughput.

CDAC Processing Car is a novel invention herein disclosed and an alternate embodiment of the Enviro-Rail Consist where there is an additional Railcar which is necessary for the then deployed array of processes.

a. In certain configurations especially those utilizing Liquid DAC methods or deployment of additional processes such as Syn-Gas production, the required process steps and the corresponding equipment may exceed the available equipment space within, upon or under the Enviro-Car and, in such an event, an additionally attached CDAC Processing Car may be utilized and attached to the DAC Consist directly behind the Enviro-Car.

b. This configuration is most relevant in Stationary Deployed Enviro-Cars where the additional kinetic requirement of this car is nullified. This allows different or additional processes to be employed by the Enviro-Rail System that might otherwise be kinetically inefficient if deployed in-motion. Having these valuable additional processes self-contained and mobile would bring the same benefits in asset allocation, redeployment capability and loss-mitigation as outlined above.

c. This CDAC Processing Car would take the form most similar to that of a rail tank car or rail box car and have ample enclosed volume in which to install and operate the required equipment in a safe and efficient manner.

d. The inclusion of this additional car would also require that the corresponding Enviro-Cars and/or CO2 Tank Car(s) are outfitted with additional liquid or gas transfer hose(s) to supply/receive substances to/from this CDAC Processing Car as well as power cable Umbilicals in which to power its operation.

e. This CDAC Processing Car—if deployed in-motion—would require an obvious and substantial improvement in productivity, efficiency, capabilities or other such advantage over other single-car DAC systems in order to justify the increased complexity of the systems and the inclusion of this additional vehicle and corresponding mass to the consist. However, as technology improves in the future, processes are proven-out, capabilities become available or as conditions warrant this could be a needed and prudent addition to the overall Enviro-Rail System.

Syn-Gas Production Capability is a novel invention herein disclosed and an alternate embodiment of a CDAC Processing Car where there exist sufficient levels of power from Regenerative Dynamic Braking, Train Solar Array, Track/Catenary Electrification and/or Direct-Connection to allow for the in-situ synthesis and production of synthetic fuels such as Syn-Gas. Although not a preferred method because it is merely carbon-neutral and not carbon-negative, it is disclosed herein as a potential application of this technology. In this exemplary embodiment, the synthesis is undertaken within a CDAC Processing Car from the captured CO2 and gaseous hydrogen obtained from the electrolysis of water. This process, known as the Fischer-Tropsch Method, is an array of chemical reactions that converts a mixture of carbon containing gases and hydrogen into liquid hydrocarbons that can be used in place of regular fossil fuels in many applications—including Locomotives. CDAC Processing Cars so equipped with this Syn-Gas Production Capability can be imagined in the following deployment:

a. In a vast, remote desert region where several hundred CO2 DAC Enviro-Cars are powered by Direct-Connection to overhead power from a dedicated, large-scale Solar Farm Array.

b. Moreover, there are many dozen self-contained and mobile Syn-Gas CDAC Processing Cars which consist of an equal number of CDAC Processing Cars that have been outfitted with Syn-Gas synthesis components, equipment and processes. These Syn-Gas CDAC Processing Cars utilize the pure Carbon Dioxide output of the CO2 DAC Enviro-Cars as one of the primary synthesis inputs.

c. After the synthesis process, the Syn-Gas is stored within a dedicated Rail Tank Car designed for the transportation of fuels and is similar to the embodiment of the CO2 Tank Car.

d. In this way, a portion of the captured CO2 from the DAC processes is transformed into a carbon-neutral fuel which could offset some costs and allow for the harvesting of even more anthropogenic Carbon Dioxide from ambient environmental air.

CDAC Storage and Transportation Tank Car ("CDAC Tank Car") is a novel invention herein disclosed and has the structural embodiments of an enclosed, cylindrically shaped Rail Tank Car. This exemplary embodiment consists of a fundamentally normal and customary FRA Approved Rail Tank Car such as a 21,964-gallon non-coiled, insulated Tank Car designed for the transportation of Carbon Dioxide at up to 600 PSI and 286,000 lbs. gross rail load. However, the capacity of this Tank Car could vary based on specific deployment requirements—ranging from approximately 17,000-33,500 gallons. This exemplary CO2 Rail Tank Car would have the following modifications to make it suitable as a post-capture in-situ Carbon Dioxide Storage Tank as well as a post-capture in-situ Carbon Dioxide Rail Transportation Car such as that which embodies this novel invention CDAC Tank Car:

a. Appropriate fixed or flexible Hoses and/or Piping ("Inlet Hoses") to the Tank Car Inlet Valve ("Inlet Valve") of a similar diameter to the Enviro-Car Connection Hose if a connection cannot be made by the length of the Enviro-Car Connection Hose to the Tank Car Inlet Valve directly.
b. An Emergency Cut-Off or One-Way Valve ("Emergency Cut-Off Valve") located in an appropriate fixed location to the Tank Car Inlet Valve (if not already present) capable of immediate closing of the pressure stream upon a sudden drop in pressure such as might occur if the Connection Hose was inadvertently pulled apart without the Tank Car Inlet Valve first being closed.
c. A Pressure Monitoring Gauge ("Pressure Gauge") installed at an appropriate location upon the Tank Car or Inlet Valve with wireless transmission capabilities to enable monitoring of the PSI Pressure of the CDAC Tank Car by the DAC Control System and/or Locomotive Engineer while the System is in use.
d. Once the aforementioned appurtenances are installed and minor modifications performed upon to a normal and customary FRA approved Rail Tank Car it becomes the herein described CDAC Tank Car and becomes a component vehicle within the larger Enviro-Rail Consist.
e. Once the aforementioned appurtenances are installed and/or modifications are performed to a normal and customary FRA approved Rail Tank Car, it becomes the herein described CDAC Storage and Transportation Tank Car ("CDAC Tank Car") and becomes a component vehicle within the larger Enviro-Rail Consist when so to then deployed.

Railcar-Mounted Photovoltaic Cells ("Train Solar") is a novel invention herein disclosed where Thin-Film Photovoltaic Cells are installed atop some or all of the usual railcars that make up the entirety of a Train and which the resultant power is used for a variety of purposes. In this exemplary embodiment, this Train Solar System is used to augment the Regenerative Braking Energy to support the overall operation of the Enviro-Rail System. Many railcars have a large and unobstructed flat or curved top section that are well-suited for a retrofit of this type. This retrofit would, obviously, need to be made in advance to a large fleet of railcar types or deployments. Over time, the addition of mounted solar cells to the railcar pool could bring substantial additional carbon-neutral power to the overall Enviro-Rail System allowing for greater DAC productivity, additional Booster Unit capabilities and/or additional processes such as the synthesis of synthetic fuels from the captured CO2.

a. Each railcar so equipped is interconnected to each other railcar so equipped in series (or parallel—if appropriate) at the same time as other connections are made during normal and customary railyard Train-making operations and Railroad best practices
b. would have every Railcar so equipped grouped together at the front portion the larger Train and every Railcar not so equipped grouped together at the rear portion of the Train.
c. As much as 1,500-3,000 KW could be obtained in this way from solar power alone in certain deployments and such is provided at the Train Solar's terminal end to the rear-most Enviro-Car for immediate use, Battery Array replenishment and/or supply to other upstream Enviro-Cars within the larger Enviro-Rail Consist.
d. In another exemplary embodiment, the Train Solar Energy is used to charge small onboard battery arrays contained within or upon the individual Railcars which are detached from a Train for a period of time. In this way, when these Railcars are reattached to an Enviro-Rail Consist, there will be an extra surplus of energy with which to perform operations.
e. In yet another exemplary embodiment, the Train Solar Array is connected to a land-based fixed connection to supply inputs to a local energy system or the broader electrical grid when the Railcars are detached from a Train for a period of time. In this way, this extensive source of renewable carbon-neutral energy will not be wasted when the Railcars are detached from an Enviro-Rail Consist.

Railcar Automatic Interconnection Device ("RAID") is a novel invention herein disclosed that allows for automatic, hands-free electrical connections and/or interconnections between Railcars and other Railcars, Railcars and Locomotives and/or Locomotives and other Locomotives so equipped at the same time as one is coupled to another during normal and customary railyard Train-making operations.

a. The RAID System is a small physical device approximately six (6") inches wide by six to twelve (6"-12") inches deep by four (4") inches high installed upon the midline, inferior side of the Railcar couplers at both the front and rear ends at the same time that other such relevant electrical modifications or upgrades are performed to a Railcar or group of Railcars.
b. In this exemplary embodiment, these forward and aft devices are externally constructed of heavy-duty, high-strength ABS or similar property plastic with electrical insulative properties. Alternately, steel, aluminum or other metal could be used to increase durability if appropriate insulative properties are maintained between each interior terminal and the other, the exterior housing and/or the Locomotive coupler/frame.
c. Internally, these devices have two separate terminal connectors comprised of a conductive metal such as copper or brass with a positive (+) terminal always being on the right when facing that particular Railcar end and the negative (−) terminal always being on the left.
d. In one exemplary embodiment, the two terminal connectors progress into the form of blunt-end contactors mounted upon a spring compression system. In such an embodiment, when two Railcars so equipped are coupled together, the two blunt-end contactors opposite each other make contact and slightly compress each corresponding spring upon which they are mounted. This spring compression system ensures good contact is maintained between the two conductive blunt-end contactors despite reasonable movement and wear.
e. In this exemplary embodiment, each device has two distinct external halve-forms within its larger external form when facing a particular end. The right-half being of self-aligning, hollow, "female" form with the blunt-end contactor contained within and the left-half being of self-aligning, hollow, "male" form with the blunt-end contactor contained within.
f. In this exemplary embodiment, the right-half has a self-aligning insulative housing surrounding its spring-mounted blunt-end that is slightly larger than the left-half s self-aligning insulative housing surrounding its own spring-mounted blunt-end. This is an important safety feature which keeps any conductive surfaces away from accidental touch.

g. In this exemplary embodiment, the RAID System would automatically interconnect individual Railcars deployed with Railcar-Mounted Photovoltaic Cells within a particular Train which comprise the larger Train Solar System.

h. The RAID System is installed at the same time as the Thin-Film Photovoltaic Cells are installed atop the Railcars and the two RAID Devices mounted at each end of the Railcar are appropriately connected with medium-heavy gauge wiring to their array Photovoltaic Cells mounted atop their structure.

i. On those Railcar types that are not appropriate for the installation of Photovoltaic Cells upon them because they have no large and unobstructed flat or curved top section (i.e. "Flat Car" types, "Gondola" types, etc.) or other such reason, best practices would have Front and Rear RAID devices installed nonetheless but connected between them by jumper wires. This allows Railcars with PV Cells installed to be coupled to those without and not break the continuality of the connections within the larger Train Solar System.

j. In this way, the RAID interconnections are always made in series when two Railcars are coupled end-to-end and voltage is incrementally increased by a factor equal to the number of Railcars having mounted Photovoltaic Cells within that Train.

Railcar Manual Interconnection Device ("RMID") is a novel invention herein disclosed that allows for easy manual electrical connections and/or interconnections between Railcars and other Railcars, Railcars and Locomotives and/or Locomotives and other Locomotives so equipped at the same time as one is coupled to another during normal and customary railyard Train-making operations.

a. The RMID System is a small physical device approximately three (3") inches b. wide by three (3") inches high by six (6") inches high installed upon the two forward and aft terminal ends of the electrical wiring which requires connection or interconnection between Railcars. These terminal ends would emanate from the front and rear ends of the Railcar just below the couplers, offset from the midline and adjacent to the existing Train brake air hoses. These connectors are installed at the same time that other such relevant electrical modifications or upgrades are performed to a Railcar or group of Railcars.

c. In this exemplary embodiment, these forward and aft devices resemble common "glad-hand" style air-hose connectors and are externally constructed of heavy-duty, high-strength ABS or similar property plastic with electrical insulative properties. Alternately, steel, aluminum or other metal could be used to increase durability if appropriate insulative properties are maintained between each interior terminal and the other, the exterior housing and/or the Locomotive coupler/frame.

d. In this exemplary embodiment, each individual connector makes up a half-form of the whole but when two Railcars are coupled together end-to-end and the RMID connection is made, the whole form is reveled.

e. Internally, these devices have two separate terminal connectors comprised of a conductive metal such as copper or brass with a positive (+) terminal always being on the furthest end of the connector and the negative (−) terminal always being on the nearest end of the connector.

f. In this exemplary embodiment, the RMID System would interconnect individual Railcars deployed with Railcar-Mounted Photovoltaic Cells within a particular Train which comprise the larger Train Solar System.

g. The RMID System is installed at the same time as the Thin-Film Photovoltaic Cells are installed atop the Railcars and the two RMID Devices mounted at each end of the Railcar are appropriately connected with medium-heavy gauge wiring to their array Photovoltaic Cells mounted atop their structure.

h. On those Railcar types that are not appropriate for the installation of Photovoltaic Cells upon them because they have no large and unobstructed flat or curved top section (i.e. "Flat Car" types, "Gondola" types, etc.) or other such reason, best practices would have Front and Rear RMID devices installed nonetheless but connected between them by jumper wires. This allows Railcars with PV Cells installed to be coupled to those without and not break the continuality of the connections within the larger Train Solar System.

i. In this way, the RMID interconnections are always made in series when two Railcars are coupled end-to-end and voltage is incrementally increased by a factor equal to the number of Railcars having mounted Photovoltaic Cells within that Train.

Referring now to FIGS. 11-37, various views of an example of an Enviro-Rail Car are shown. In FIG. 13, we see the front-left view of an exemplary Enviro-Rail Car that has an approximate length of 60 feet, width of 10 feet and height of 17.5 feet. We note the generalized location of the Front Air Intake and Rear Air Vent. The Front Intake takes in ambient air flowing at high speed within the slipstream of the moving Train. By way of its funnel shape, this inflow of high-velocity air is compressed and directed downward into the Collection Chamber where it interacts with that particular DAC process or method so utilized at that time. Thereafter, the ambient air—scrubbed of most traces of CO2— is dispelled through the Rear Vent and back into the atmosphere.

Figure 11:
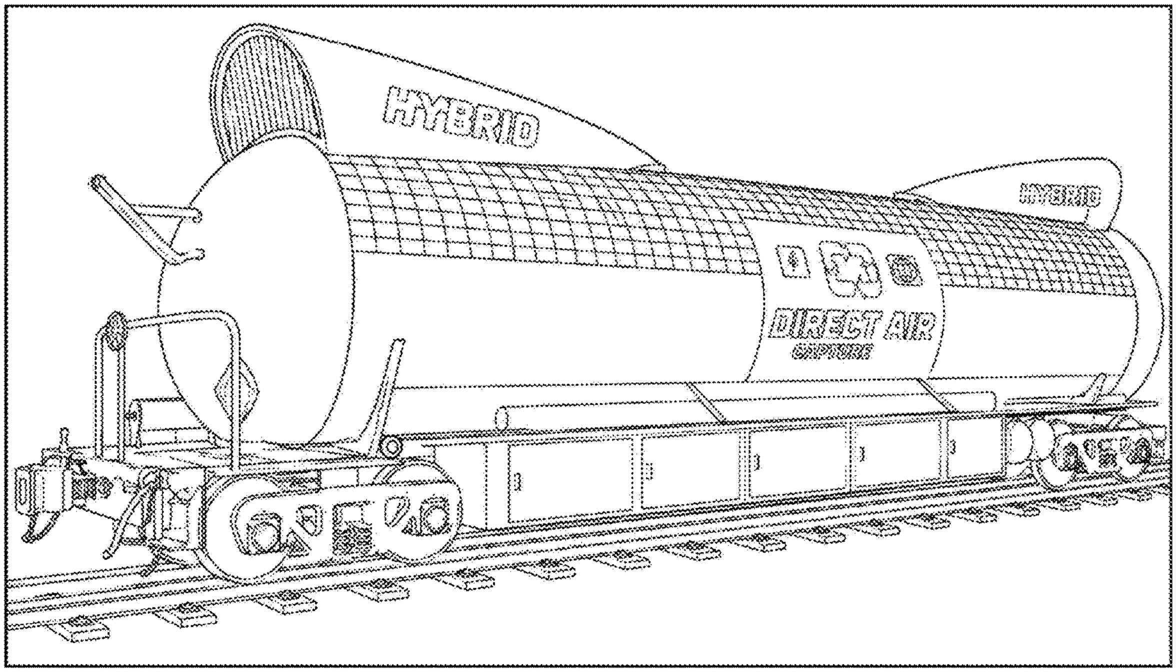
FIG. 11 is a front-left perspective view of an exemplary Enviro-Rail Car.

FIG. 11 shows a left view of an exemplary CDAC-Car that has an approximate length of 60 feet, width of 10 feet and height of 17.5 feet.

Figure 12:
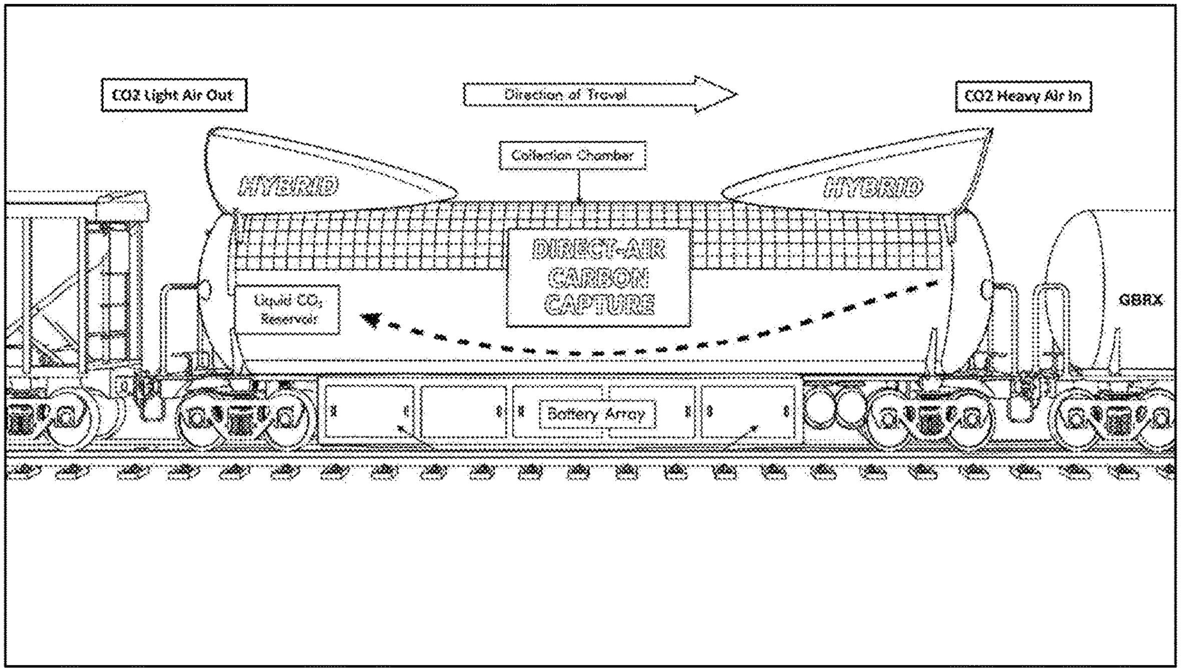
FIG. 12 shows a left view of an exemplary CDAC-Car.
Figure 13:
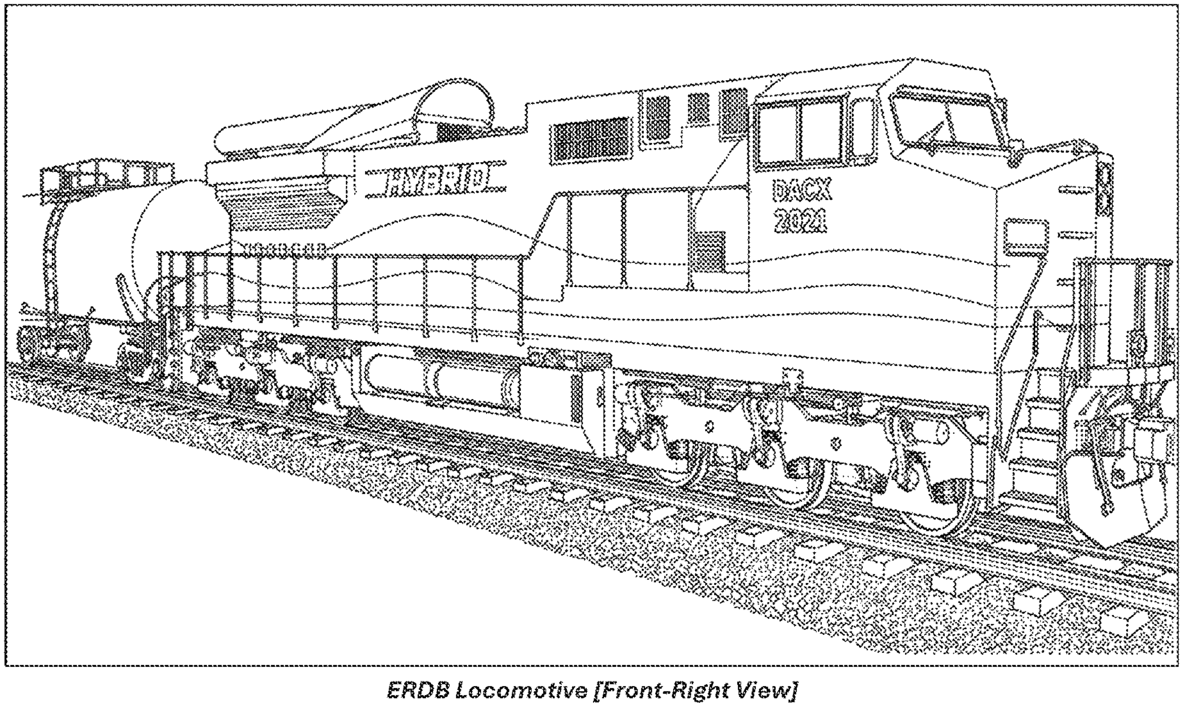
FIG. 13 shows a front-left view of an exemplary ERDB Locomotive.

FIG. 12 shows a right view of an exemplary CDAC-Car that has an approximate length of 60 feet, width of 10 feet and height of 17.5 feet and basic operation thereof.

FIG. 13 shows a front-left view of an exemplary ERDB Locomotive that has an approximate length of 72 feet, width of 10 feet and height of 16 feet. The primary purpose of this ERDB Locomotive is to provide normal and customary primary motive-power to put the entire Train and Enviro-Cars into motion and to provide the Regenerative Dynamic Braking Power necessary to operate the Enviro-Cars.

Figure 14:
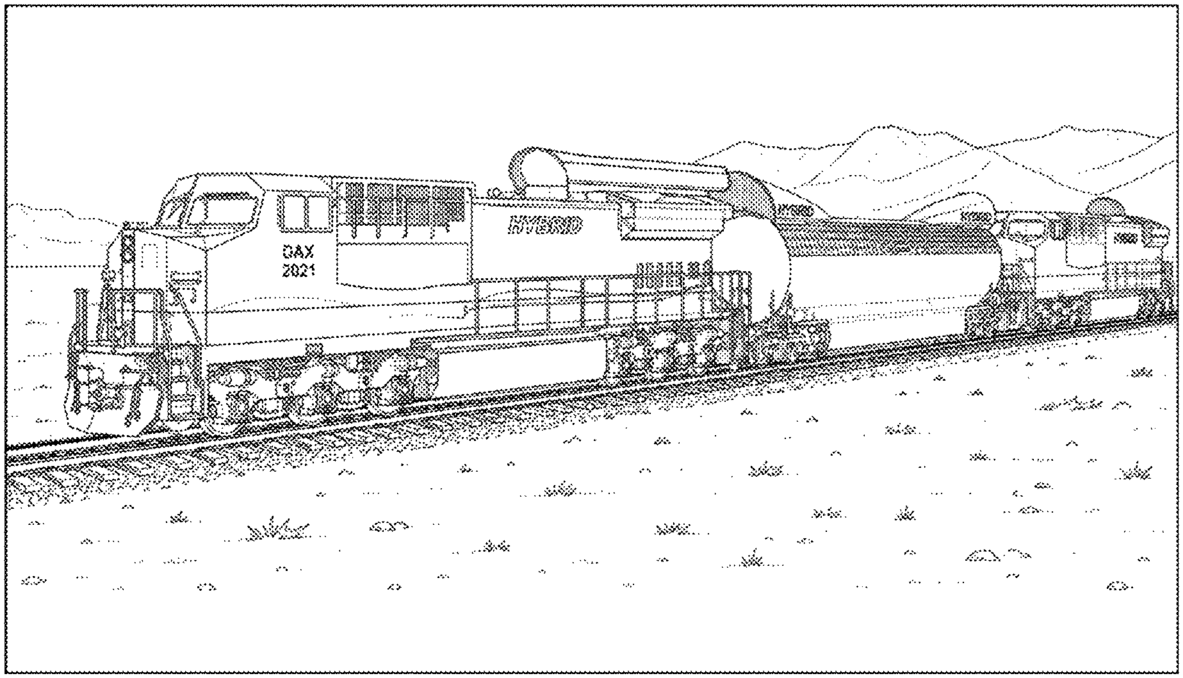
FIG. 14 shows a left-side view of an exemplary ERDB Locomotive.

FIG. 14 shows a left-side view of an exemplary ERDB Locomotive. We also notice the LEDA Array mounted atop the ERDB locomotive thereby creating a direct-connection between it and the attached LEM-Car for complete exhaust and emissions transference.

Figure 15:
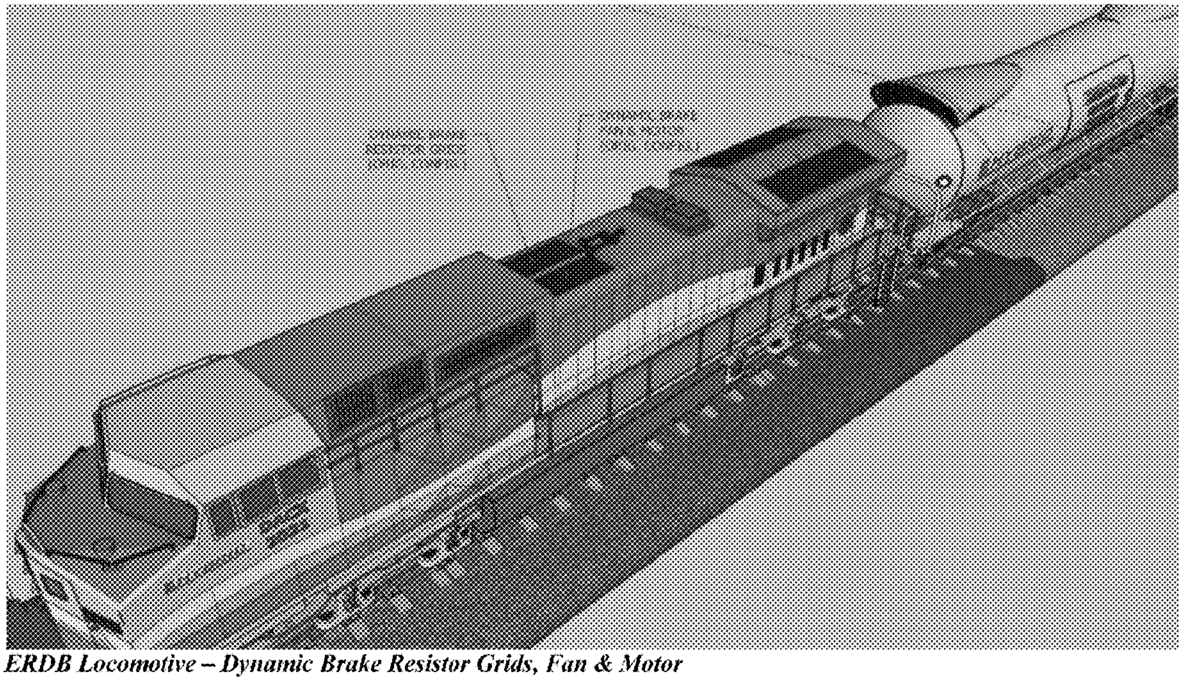
FIG. 15 shows a view of the top of an exemplary ERDB Locomotive.

FIG. 15 shows a view of the top of an exemplary ERDB Locomotive showing the location of the Dynamic Brake Resistance Grids, Fan and Motor. Following a minor modification to ERDB Locomotives, they will have the necessary equipment to either route their Regenerative Dynamic Braking Power to an Enviro-Car when so connected or to utilize their original resistance-based dissipation design when not so connected.

Figure 16:
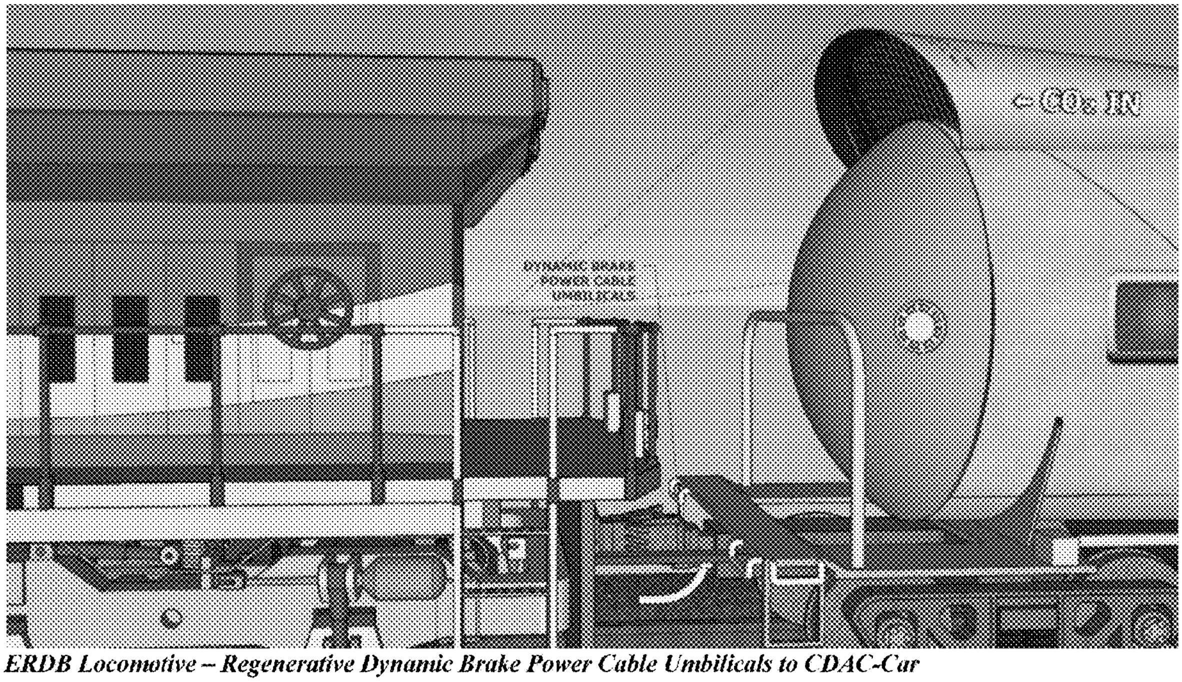
FIG. 16 shows a view of the rear of an exemplary ERDB Locomotive.

FIG. 16 shows a view of the rear of an exemplary ERDB Locomotive showing the location of the Dynamic Brake Power Cable Umbilicals that connect the ERDB Locomotive to the most forward Enviro-Car and provide the primary means of Enviro-Car Battery Array replenishment which energy is subsequently used by the Enviro-Car components and processes during operation.

Figure 17:
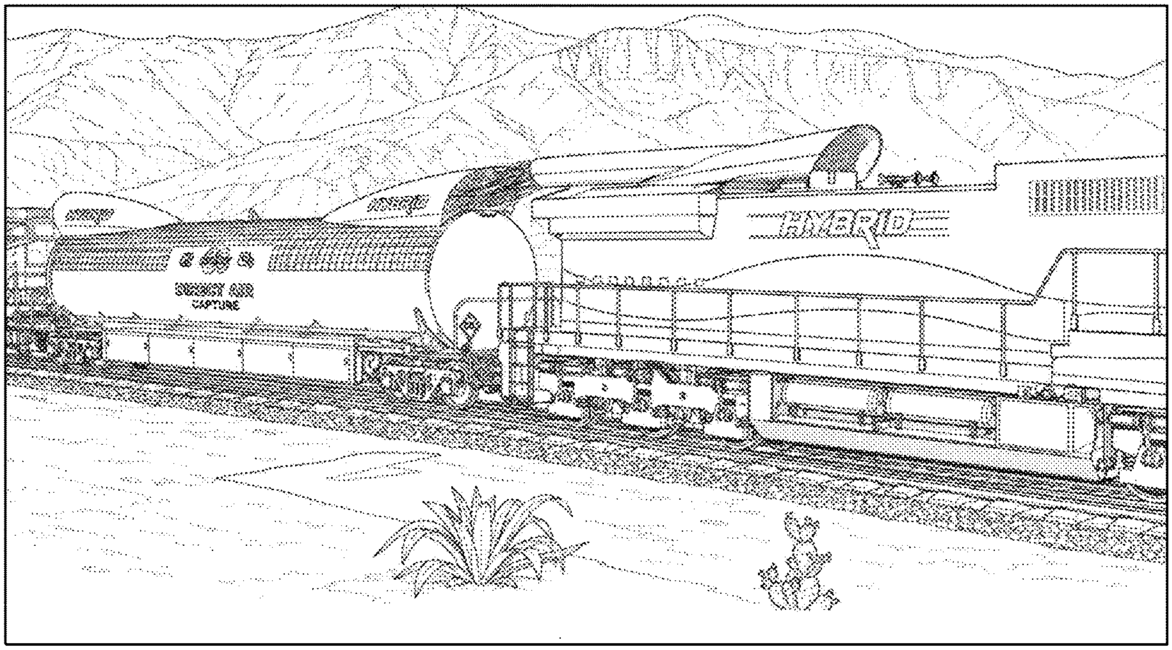
FIG. 17 shows a view of the right-side of an exemplary Locomotive Exhaust Transfer Array.

FIG. 17 shows a view of the right-side of an exemplary Locomotive Exhaust Transfer Array ("LETA") which indirectly transfers the ERDB Locomotive exhaust and emissions into the Front Intake of the attached LEM-Car.

Figure 18:
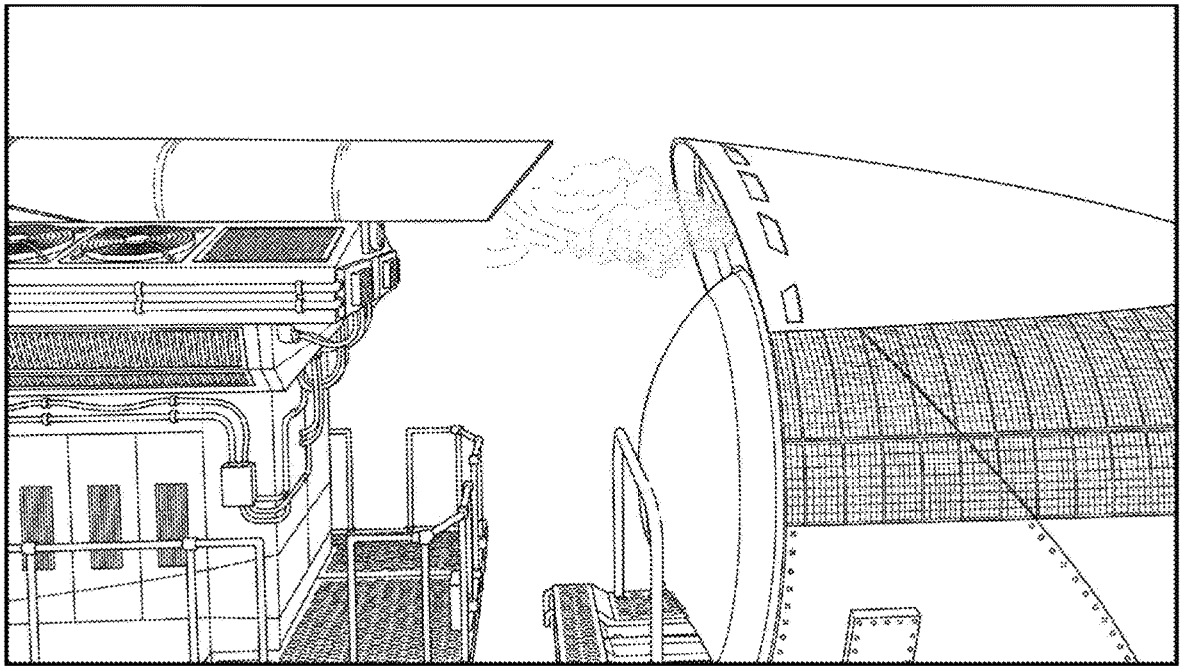
FIG. 18 shows the front-left view of an exemplary Locomotive Exhaust Transfer Array.

FIG. 18 shows the front-left view of an exemplary Locomotive Exhaust Transfer Array ("LETA"), the open, funnel-shaped air-intake and its placement just above and forward of the ERDB Locomotive exhaust stacks.

Figure 19:
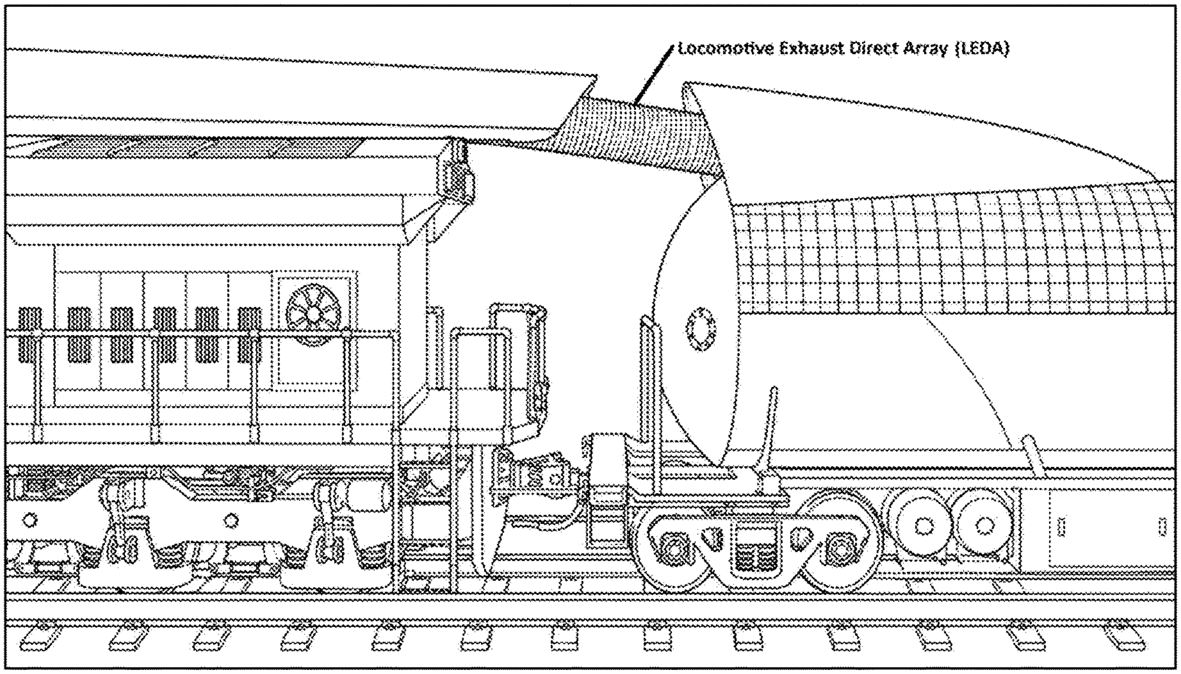
FIG. 19 shows a left view of an exemplary Locomotive Exhaust Direct Array.

FIG. 19 shows a left view of an exemplary Locomotive Exhaust Direct Array ("LEDA") which directly transfers the ERDB Locomotive exhaust and emissions into the Front Inlet of the attached LEM-Car.

Figure 20:
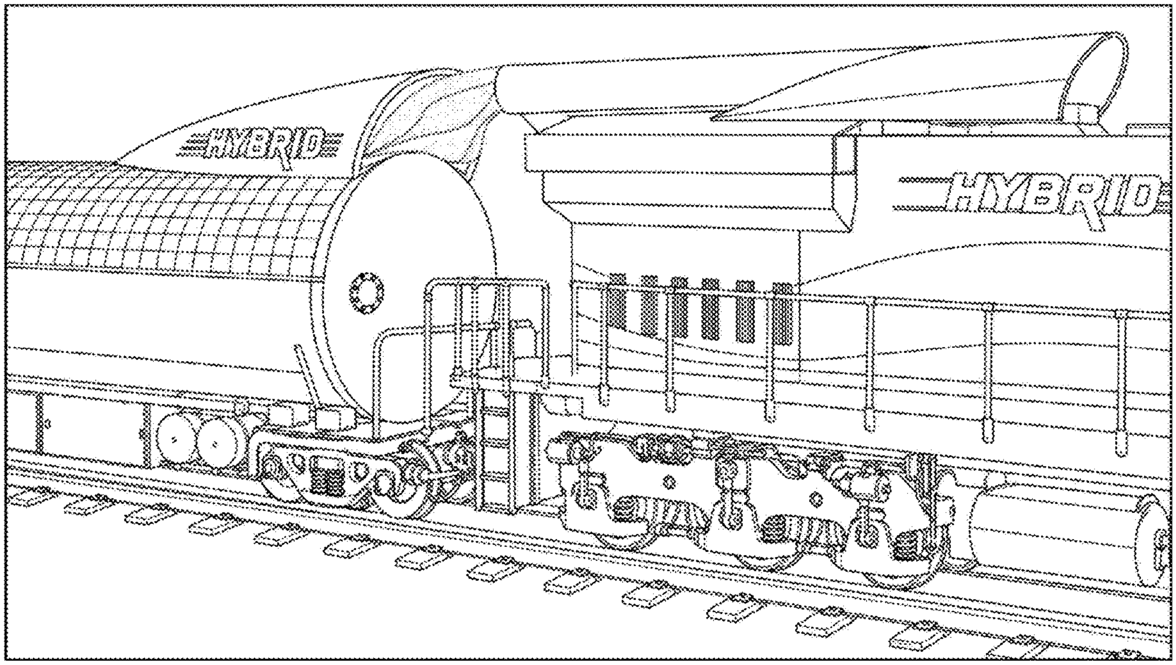
FIG. 20 shows the left view of an exemplary Locomotive Exhaust Transfer Array.

FIG. 20 shows the left view of an exemplary Locomotive Exhaust Transfer Array ("LETA") and exemplary exhaust emanating from the most rearward end of the LETA Tube and transferring into the Front Intake of the attached LEM-Car.

Figure 21:
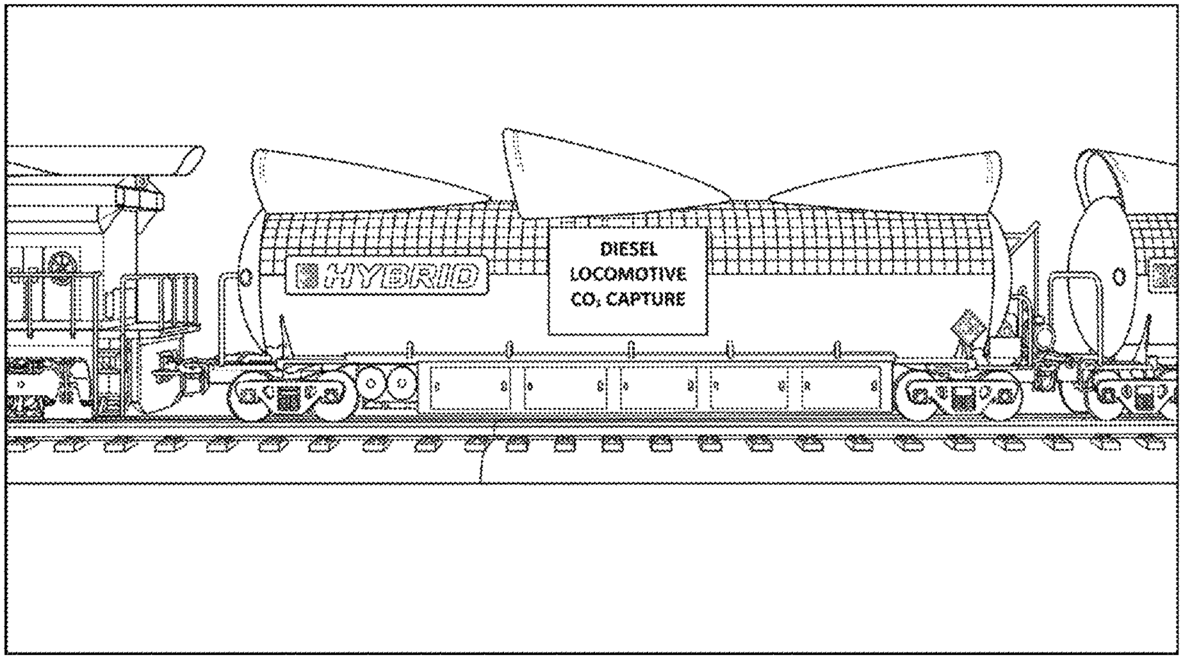
FIG. 21 shows a left view of an exemplary standard configuration CDAC-Car.

FIG. 21 shows a left view of an exemplary standard configuration CDAC-Car that has an approximate length of 60 feet, width of 10 feet and height of 17.5 feet. The primary purpose of this Enviro-Car is to contain the systems, components, equipment, parts, processes and materials necessary to effectively harvest Carbon Dioxide gas from the ambient atmospheric air.

Figure 22:
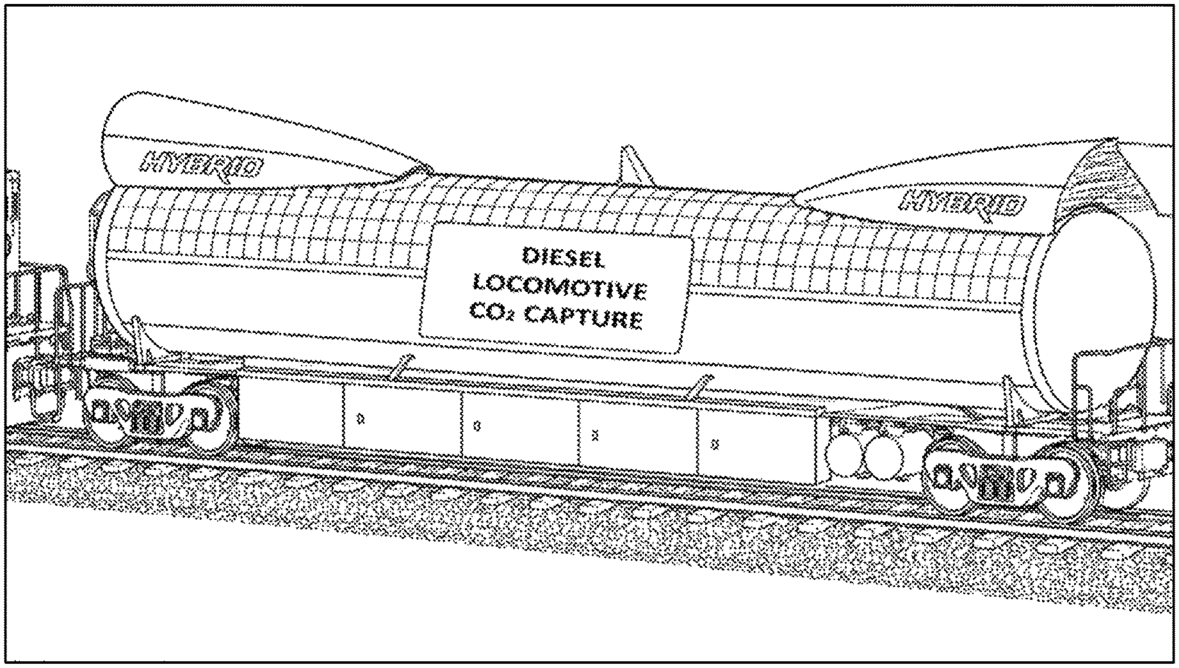
FIG. 22 shows a left view of an exemplary standard configuration LEM-Car with LEDA.

FIG. 22 shows a left view of an exemplary standard configuration LEM-Car with LEDA that has an approximate length of 60 feet, width of 10 feet and height of 17.5 feet. The primary purpose of this Enviro-Car is to contain the systems, components, equipment, parts, processes and materials necessary to effectively mitigate Emission Particulates and Gases from the exhaust of Locomotives during operation.

Figure 23:
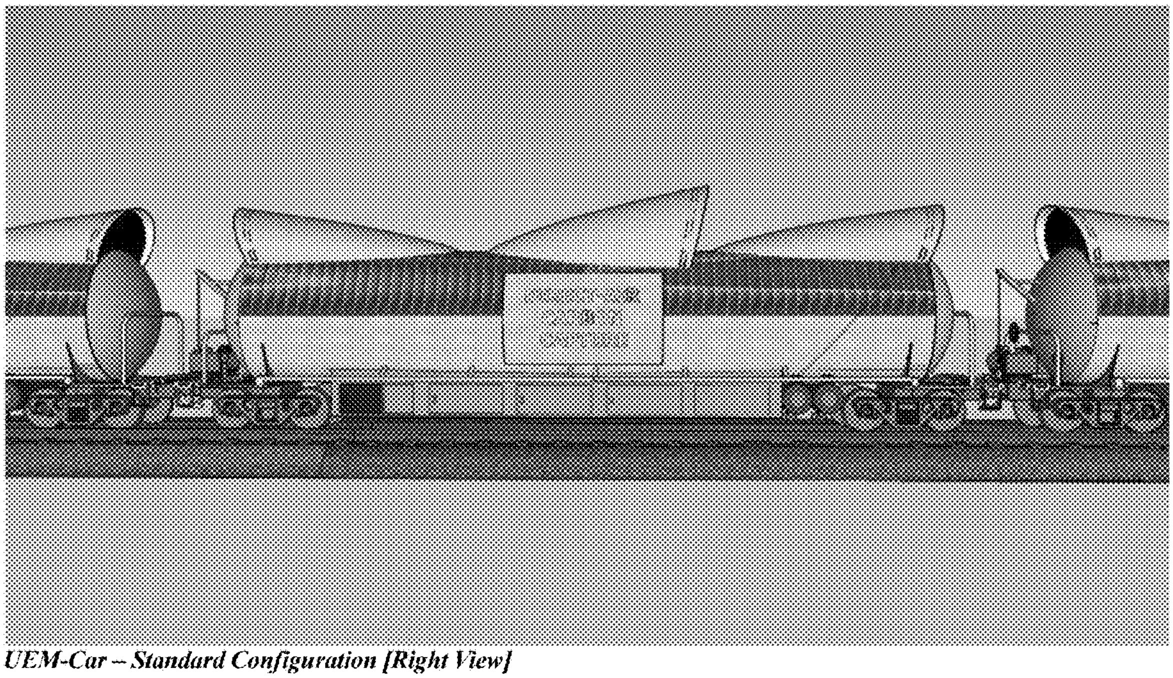
FIG. 23 shows a left view of an exemplary standard configuration UEM-Car.

FIG. 23 shows a left view of an exemplary standard configuration UEM-Car that has an approximate length of 60 feet, width of 10 feet and height of 17.5 feet. The primary purpose of this Enviro-Car is to contain the systems, components, equipment, parts, processes and materials necessary to effectively mitigate Localized Air-Pollution particulates and gases from the ambient air within urban areas.

Figure 24:
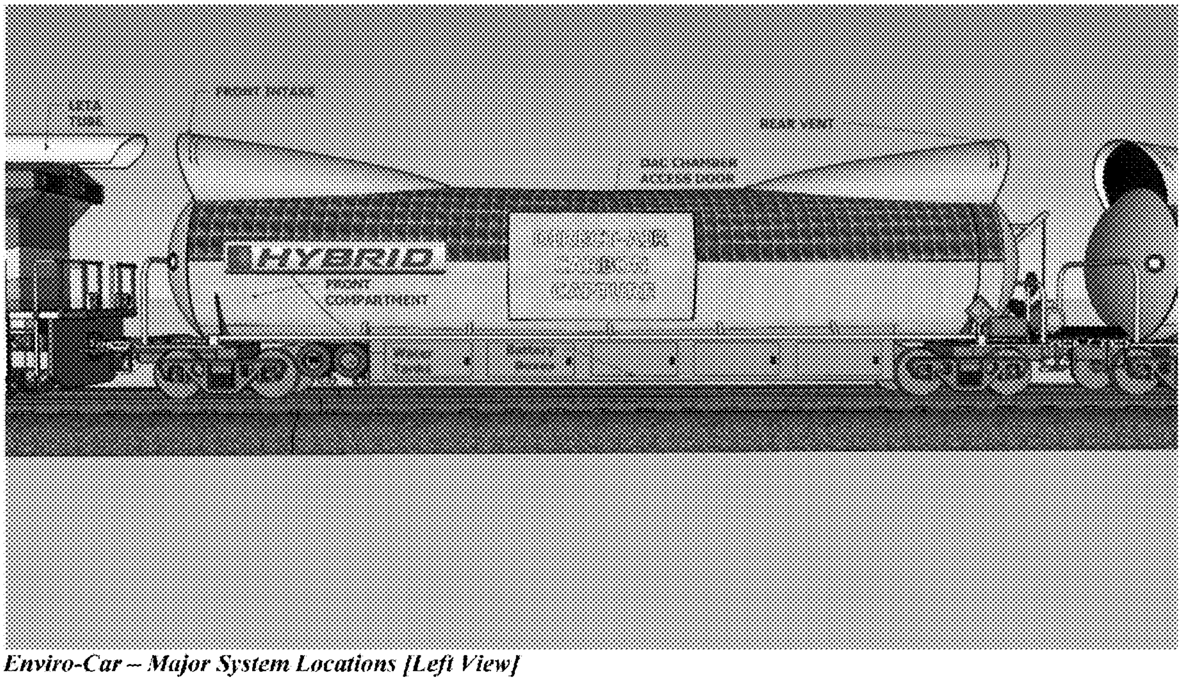
FIG. 24 shows the general locations of various major systems comprising an exemplary Enviro-Car.

FIG. 24 shows the general locations of various major systems comprising an exemplary Enviro-Car. We see the location of the Battery Compartments, Water Tanks and Collection Chamber Access Door.

a. We also take note that Enviro-Cars have some of the same design features as a normal and customary Rail Tank Cars that have been extensively modified. This is indeed true as the general design characteristics of Rail Tank Cars do possess many elements and features that are likewise needed in the Enviro-Car System.
b. For instance, an ideal Enviro-Car would have a large, voluminous interior, that is air-tight and capable of achieving pressures without leakage. Rail tank cars also possess this capability.
c. An ideal Enviro-Car would also have the capability to achieve partial interior vacuum pressure. While rail tank cars are not designed to operate a vacuum pressure, their overall design lends well to easily being modified to achieve this design parameter. This is accomplished with the addition of circular and oval-shaped (diagonally placed) rib girders supporting the inside circumference of the Collection Chamber with numerous cut-out areas that allow sufficient air-flow and longitudinally placed long, narrow rectangular girders installed in notches around the outer circumference of the rib girders where it contacts the inner hull of the Collection Chamber.
d. Obviously, rail tank cars are also FRA approved for transport by rail and possess all the necessary components, parts and equipment for this mode of transportation. Enviro-Cars must also meet this requirement.
e. While it is anticipated that Enviro-Cars will be newly constructed and custom built, it stands to reason that during the early days of the project that Enviro-Cars may be retrofitted and reengineered upon the original platform of surplus rail tank cars. Nonetheless, the capacity to build an Enviro-Car new without extensive investment in new engineering, design development, new tooling or equipment, testing, FRA approvals or the like is highly attractive and add to the overall economic feasibility of the concept.
f. However, this is not to imply that rail tank cars are the only blueprint or platform that this technology may be built upon. Indeed, there are other imagined concepts for base design and overall appearances which are included hereunder. Some use a generalized rail box car design as the basis for construction. Some use a combination of design elements and features from a plurality of current Railcar designs. Others are of completely novel design and embodiment.
g. As a result, while the present invention has been illustrated and described in one or more particular ways and while the embodiments have been described in considerable detail, it is not the intention of the applicants to restrict or in any way limit the scope of the invention to such details.

Figure 25:
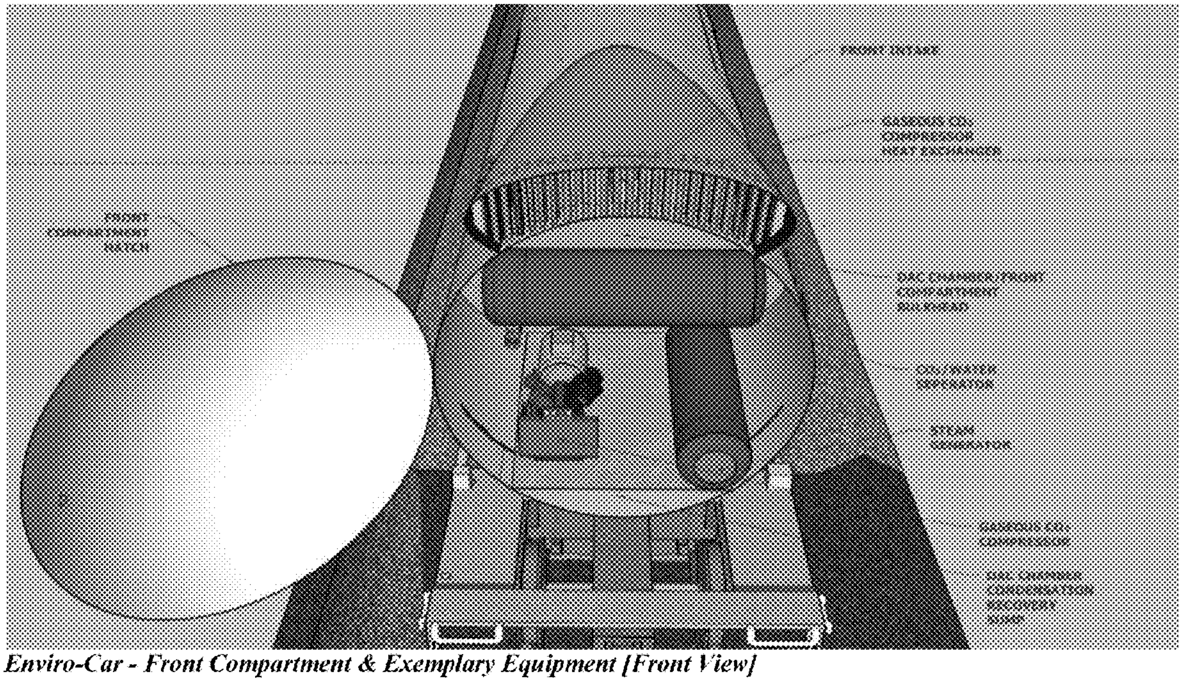
FIG. 25 shows a front view of an exemplary Enviro-Car.

FIG. 25 shows a front view of an exemplary Enviro-Car showing the location of the Front Compartment and the exemplary components and equipment required by that particular DAC process or method so utilized at that time. In this exemplary case of utilizing Heat-Desorbed Solid Adsorbent Media Cells within the Collection Chamber, we see the presence of an electrically-operated Steam Generator, an electrically-operated Collection Chamber Vacuum Pump, an electrically-operated CO2 Compressor and a CO2/Water Separator. It is important to realize that this illustration is for general informational purposes and there is a number of different components, pieces of equipment, parts, piping and/or wiring not therein represented that are otherwise present in the actual production Vehicle. We also see the large, dome-shaped Front Compartment Access Door which is mounted on a single large hinge located on the right side of the vehicle and is latched closed by means of a large compression-style latch mechanism located on the opposite side.

In FIG. 25 we also note the presence of a Collection Chamber Water Condensation Collection Sump located under the floor of the Front Compartment. This sump is designed to collect any water condensation drippings that might occur within the Collection Chamber which likely will result from exposing the relatively cool metal surfaces comprising the Collection Chamber walls, SAM Media Housings, etc. to a volume of steam water vapor during the desorption process. This condensation-formed liquid water will be routed from the Collection Chamber into the Collection Chamber Water Condensation Collection Sump by a network of channels, collection pools, pipes and automatic valves located upon the Collection Chamber floor. After a sufficient level of water accumulates in the Collection Chamber Water Condensation Collection Sump, it will then be discharged back into the Water Reservoirs located directly beneath in the undercarriage of the Vehicle so as to prolong the time between filling of these reservoirs with fresh water during service stops.

As shown in FIG. 25, we also note the presence of the diagonally placed Collection Chamber/Front Compartment Bulkhead which comprises the far wall of the Front Compartment. This concurrently comprises the Front Air Ramp within the Collection Chamber and allows for the proper routing of ambient air from the slipstream of the moving Train down and then laterally trough the body of the Collection Chamber. While shown in this illustration as being a flat, diagonal bulkhead, depending on the Vacuum requirements of that particular DAC process or method so utilized, this bulkhead may take the form of a vacuum-suitable domed shaped structure as well.

With further reference to FIG. 25, we can also see that one of the defining characteristics of this Front Compartment is that its large size and easy access allows for components, equipment, parts and even complete configurations to be changed, upgraded, added, removed and maintained as necessary as required by that particular DAC process or method so utilized at that time. For instance, with the deployment of a Rotary DAC configuration, the equipment in the Front Compartment might be comprised of the shown electrically-operated Steam Generator, an electrically-operated CO2 Compressor and a CO2/Water Separator with the addition of ductwork, an electrically-operated rotation motor, a portion of the rotation shaft and a negative-pressure blower. In this configuration there would likely be no vacuum requirement for the overall Collection Chamber so the Collection Chamber Vacuum Pump could be eliminated.

Figure 26:
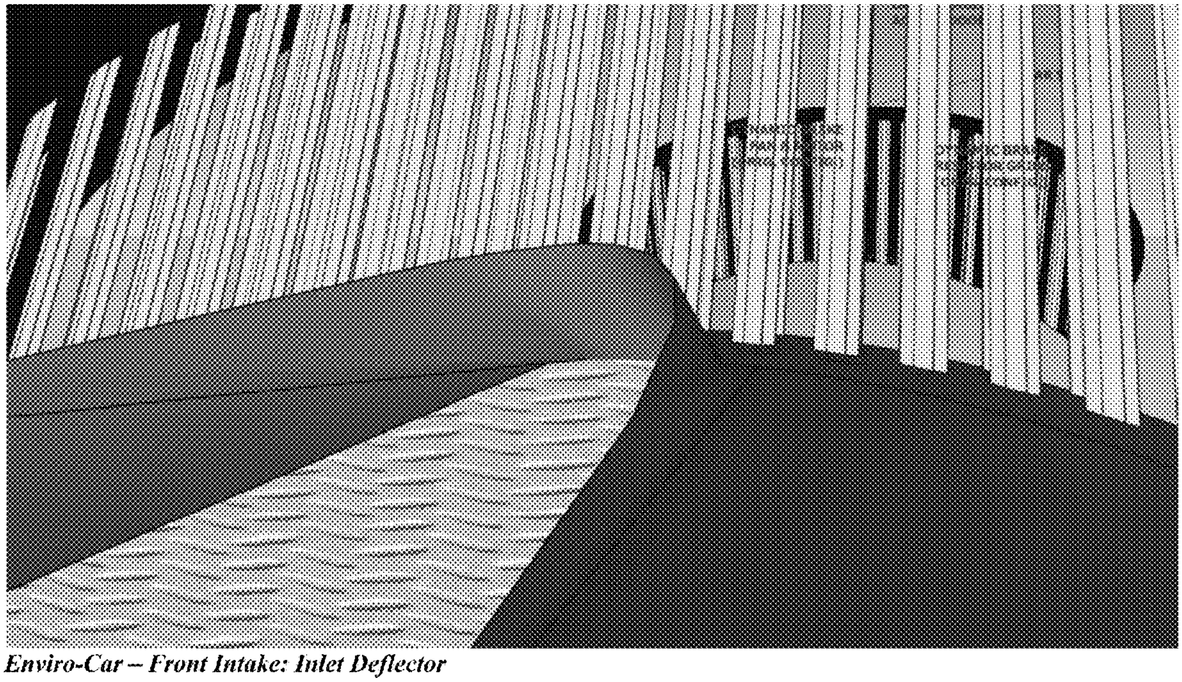
FIG. 26 shows an exemplary structure of the Front Air Inlet.

FIG. 26 shows an exemplary structure of the Front Air Inlet which has a shape that deflects away foreign objects, insects and other debris from traveling down into the inlet while, at the same time, maximizing air-flow down into the Collection Chamber from the compressive action of the Front Air Intake traveling forward at high speed in the slipstream of the Train. While this Inlet is illustrated as being a size that is relatively small when compared to the Front Intake as a whole, this is only to observe the features and characteristics of the Inlet and is not necessarily representative of an actual deployed embodiment. In reality, this Inlet would be much larger and much more similar to the interior dimensions of the Intake that surrounds it.

Figure 27:
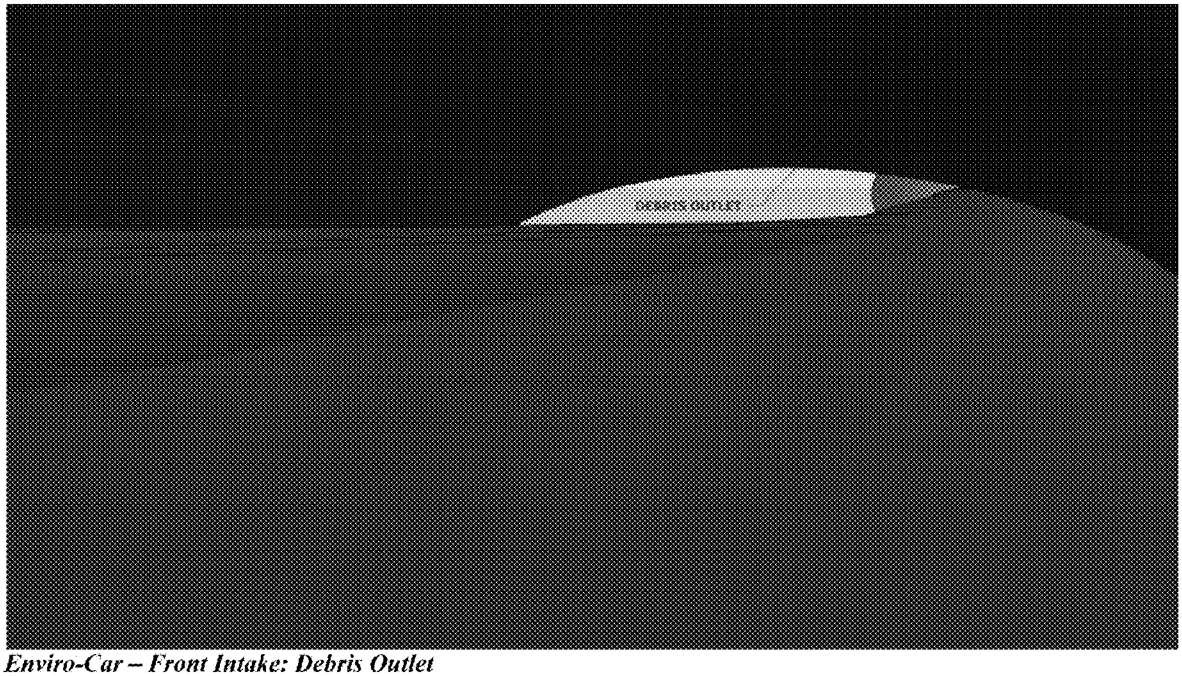
FIG. 27 shows a small outlet located at the rear of the Front Air Intake.

FIG. 27 shows a small outlet located at the rear of the Front Air Intake which allows debris to escape from the Front Intake without accumulating at the rear of the structure. This is an important design feature as debris traveling down through the Collection Chamber and, subsequently, through the SAM Media would inhibit performance over time.

Figure 28:
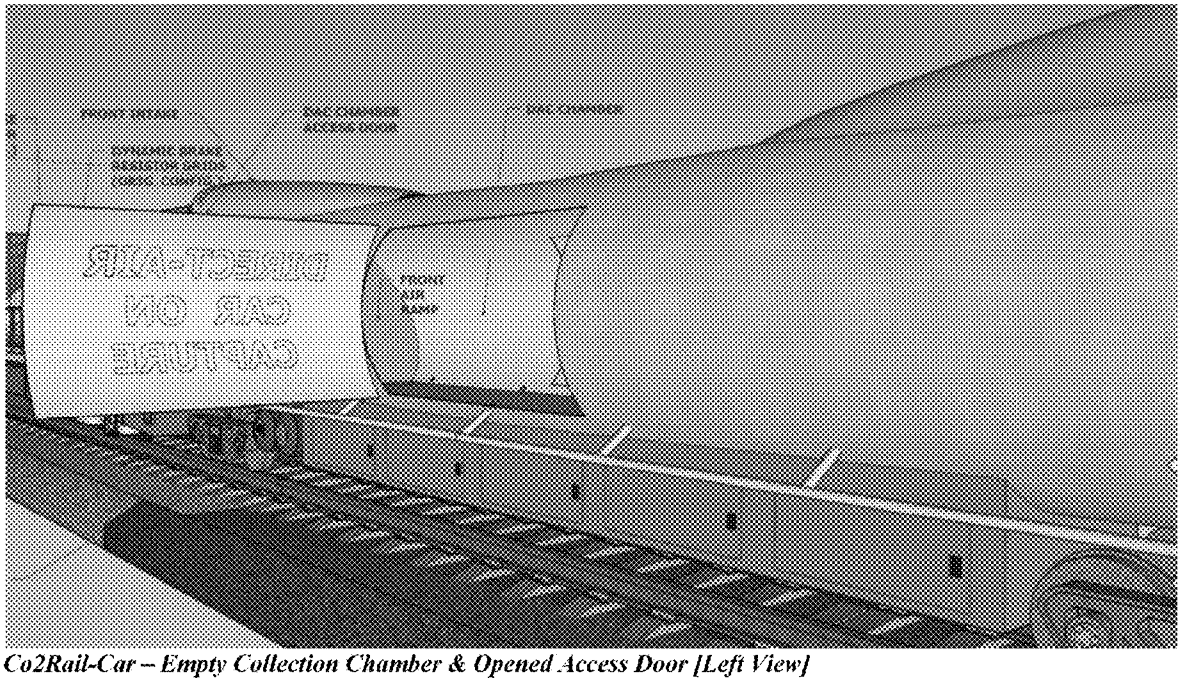
FIG. 28 shows a left view of an exemplary Collection Chamber through the open Collection Chamber Access Door.

FIG. 28 shows a left view of an exemplary Collection Chamber through the open Collection Chamber Access Door located within the larger Enviro-Car that has an approximate interior length of 50 feet, width of 10 feet and height of 10 feet with an approximate interior volume of 4,000 cu. ft. While shown in this illustration as an open area, in actual deployment this interior volume would be filled with SAM Cells as required by that particular DAC process or method so utilized at that time. As can be clearly noticed, the Collection Chamber is a voluminous chamber that can contain a great many SAM Cells and can thereby achieve a maximum level of ambient Carbon Dioxide absorption. The large side access door allows for easy and safe access to the Collection Chamber for periodic maintenance or SAM Cell replacement.

Figure 29:
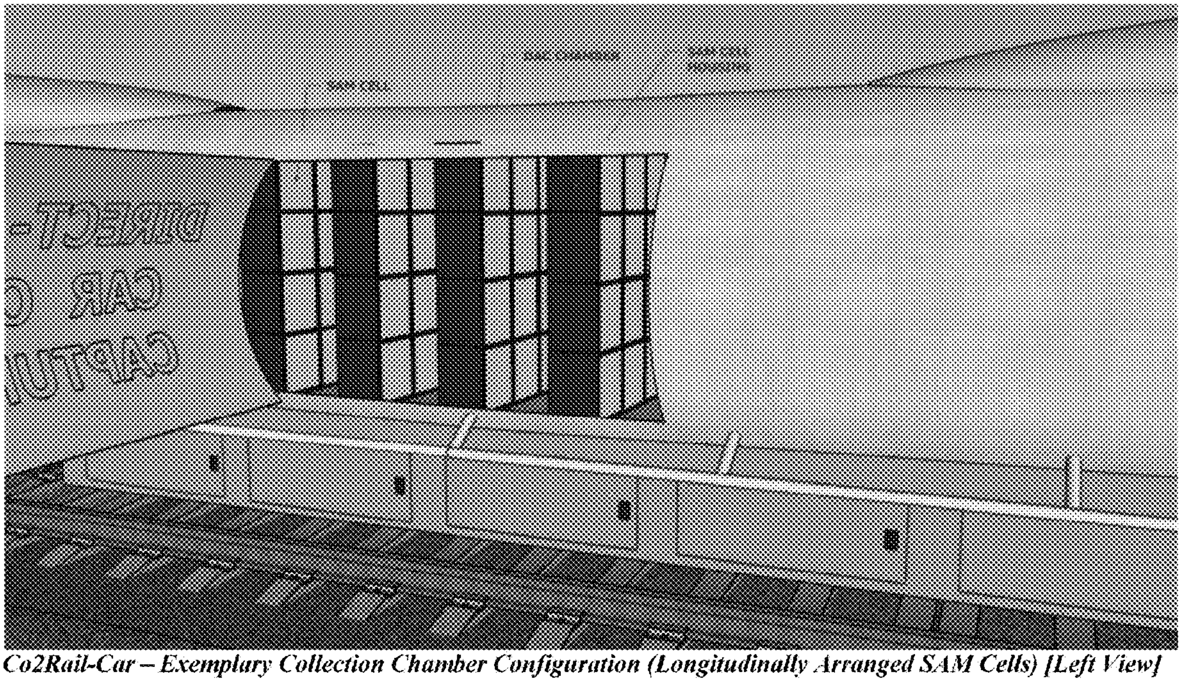
FIG. 29 shows an exemplary embodiment of Solid SAM Cells.

FIG. 29 shows an exemplary embodiment of Solid SAM Cells arranged in a longitudinal direction along the length of the Collection Chamber. In this arrangement the intake-air would travel down the Front Air Ramp and immediately encounter the first grid of SAM Cells which are arranged around the entire left, right and top circumference of the Collection Chamber. These SAM Cells would primarily consist of modular cubiform blocks with those encompassing the circumference being of an arched or curved shape of the same depth as the blocks.

a. While shown in this illustration as being intermittently placed along the longitudinal length so that the arrangement can be easily observed, the SAM Cells would most likely be placed in a continual arrangement. Depending upon the required length of interaction to achieve the optimal CO2 absorption level, this arrangement could be subdivided into two or more distinct sub-chambers. While this subdivision could take numerous forms, one possible subdivision would have the Intake Air proceed down the Front Air Ramp and the split into two volumes along the left and right side of the Collection Chamber by a forwardly placed wedge-shaped bulkhead.

b. From here on both the left and right sides, it would encounter side-entry points to two or more cubiform SAM Cell arrangements and is forced within and through one of them. After traveling that distance so then deployed at that time and having the majority of its Carbon Dioxide load thusly removed, the Intake Air would exit the SAM Cells and immediately encounter ducting extending diagonally from the floor to the ceiling of the Collection Chamber. The flat, horizontal structure of the ceiling would comprise the shared exit ducting for the two or more distinct SAM Cell arrangements and would thusly direct the Intake Air back towards the rear of the Vehicle and out the Rear Air Vent and return such to the atmosphere.

Figure 30:
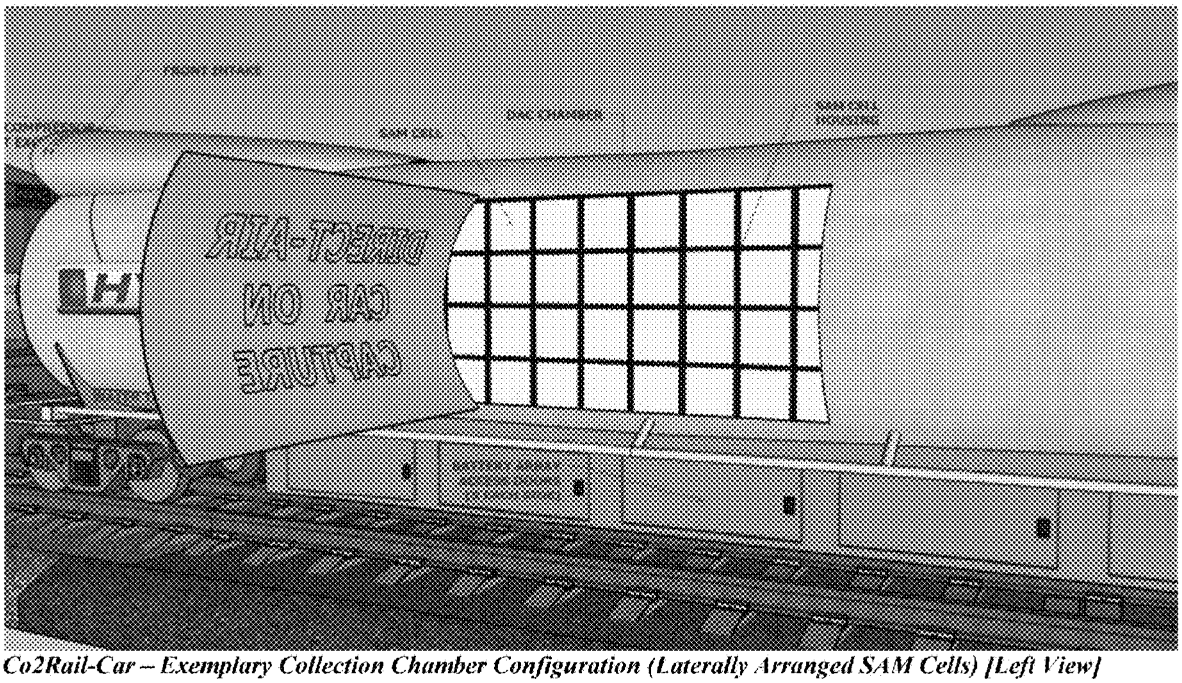
FIG. 30 shows an exemplary embodiment of Solid SAM Cells.

FIG. 30 shows an exemplary embodiment of Solid SAM Cells arranged in a latitudinal direction across the width of the Collection Chamber. In this arrangement the intake-air would travel down the Front Air Ramp and then laterally along an angled bulkhead towards its right (Vehicle left) until it encounters the curved wall of the Collection Chamber's left one-quarter circumference.

a. Since the SAM Cells are in a cubiform arrangement, the left (and right) side of the Collection Chamber intrinsically possess de-facto air-flow chambers and the intake-air would travel back along this right (Vehicle left) one-quarter circumference. Encountering another bulkhead at the far end of the SAM Cell cubiform arrangement, the Intake Air is forced within and through the laterally arranged SAM Cell Array.

b. After traveling through the SAM Cells for a distance of approximately six (6) feet and having the majority of its Carbon Dioxide load thusly removed, the Intake Air would exit the SAM Cells and immediately encounter the Collection Chamber's right one-quarter circumference wall. Since the forward part of this curved chamber is block by another bulkhead the Intake Air is forced towards the rear of the Collection Chamber. Another angled bulkhead extending from the end of the SAM Cell Array Cubiform up the Rear Air Ramp and towards the right (Vehicle left) would thusly direct the Intake Air back out the Rear Air Vent and return such to the atmosphere.

c. Importantly, in this arrangement approximately the top one-quarter circumference of the Collection Chamber is of a flat, horizontal structure and would impede any bypass air-flow above and around the SAM Cell's cubiform structure.

d. During the desorption process, steam is released from Steam Generator located in the Front Compartment and travel throughout the Collection Chamber in the same fashion except it would remain constrained within the Collection Chamber as both the Front Intake and Rear Vent are blocked and inaccessible.

e. If SAM Cell technology improves to the point that, say, three feet of SAM Media is all that is required to remove the majority of Carbon Dioxide from a volume of air with a given velocity, an alternative embodiment could have the structure of the SAM Cells within the Collection Chamber arranged in a latitudinal direction across the width of the Collection Chamber but bifurcated down the middle thereby creating two distinct SAM Cell arrays—left and right.

f. In this arrangement the intake-air would travel down the Front Air Ramp and then by focused towards the middle by two angled bulkheads until it encounters the bifurcation channel g. Encountering another bulkhead at the far end of the twin left and right SAM Cell cubiform arrangement, the Intake Air is forced within and through one of the two laterally arranged SAM Cell Arrays.

h. After traveling through the SAM Cells for a distance of approximately three (3) feet and having the majority of its Carbon Dioxide load thusly removed, the Intake Air would exit the SAM Cells and immediately encounter the Collection Chamber's right or left one-quarter circumference wall.

i. Since the forward part of this curved chamber is block by another bulkhead the Intake Air is forced towards the rear of the Collection Chamber. Here it would encounter the other volume of Intake Air that had proceeded through the opposite SAM Cell Array and, together, travel up the Rear Air Ramp and out the Rear Air Vent and return to the atmosphere.

j. Importantly, in this arrangement approximately the top one-quarter circumference of the Collection Chamber is of a flat, horizontal structure and would impede any bypass air-flow above and around the SAM Cell's twin cubiform structure.

k. During the desorption process, steam is released from Steam Generator located in the Front Compartment and travel throughout the Collection Chamber in the same fashion except it would remain constrained within the Collection Chamber as both the Front Intake and Rear Vent are blocked and inaccessible.

Figure 31:
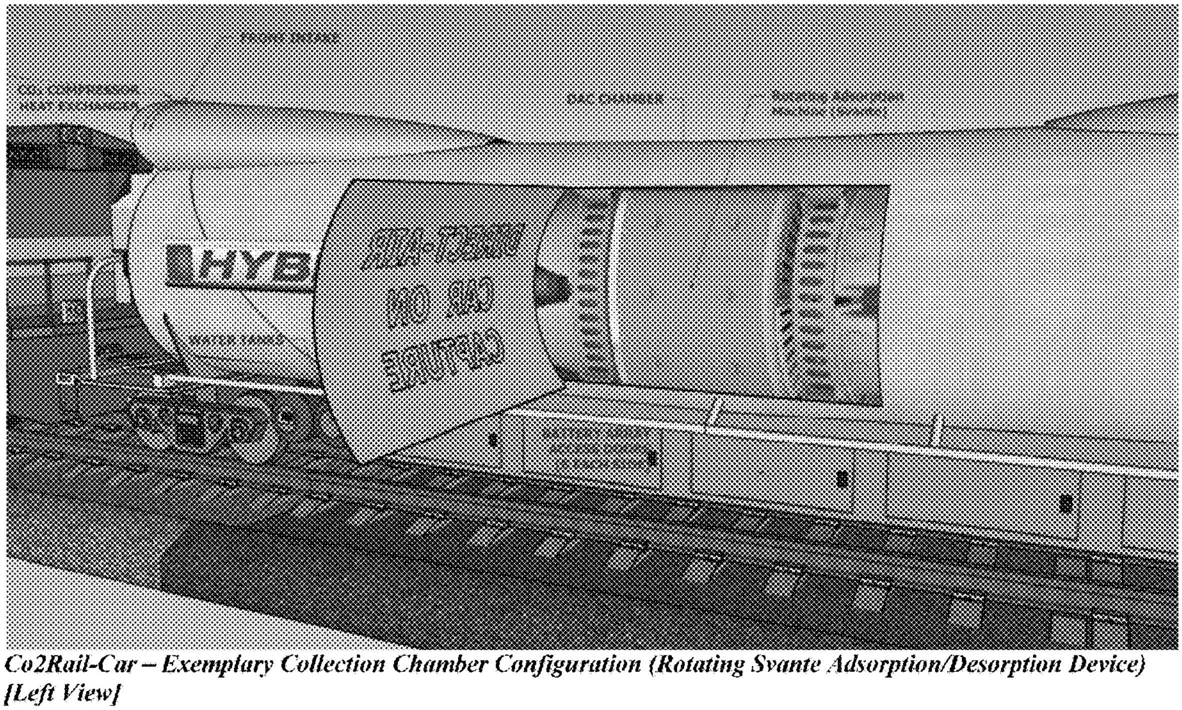
FIG. 31 shows an exemplary embodiment of a Svante Rotary Adsorption/Desorption Device installed within the Collection Chamber.

FIG. 31 shows an exemplary embodiment of a Svante Rotary Adsorption/Desorption Device installed within the Collection Chamber.

Figure 32:
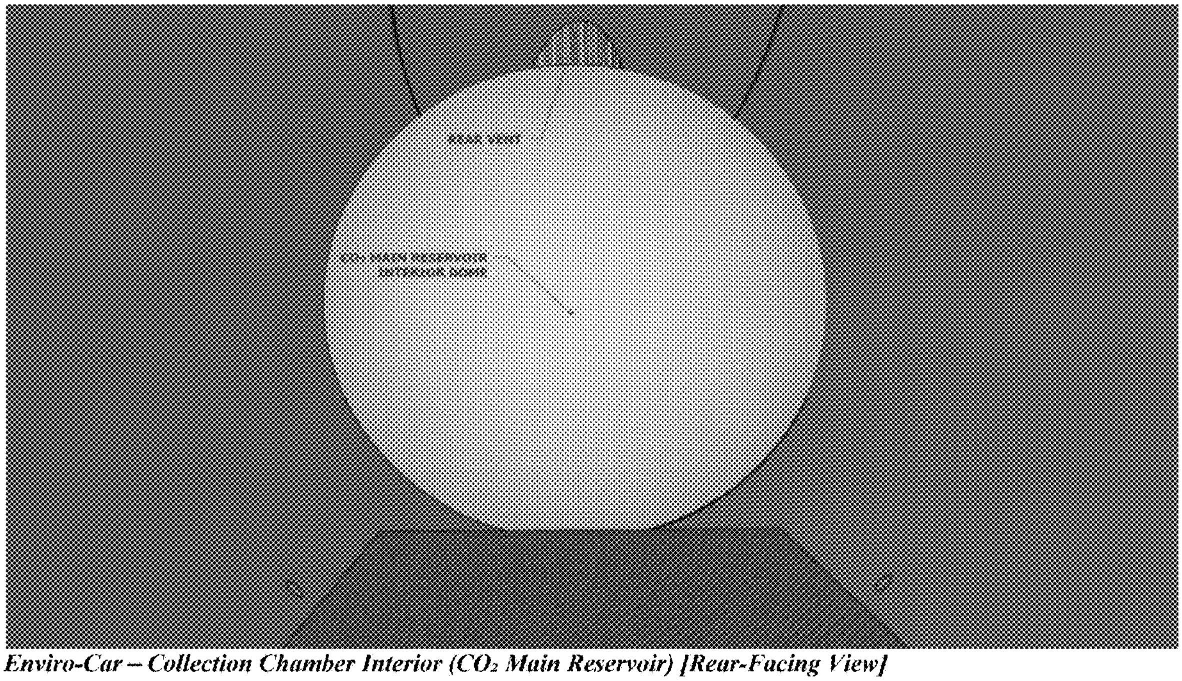
FIG. 32 shows an exemplary embodiment of the rear portion of the Collection Chamber.

FIG. 32 shows an exemplary embodiment of the rear portion of the Collection Chamber. Specifically, the domed interior wall of the CO2 Main Reservoir. This is a large, semi-spherical reservoir capable of handling a fairly large volume of gas and/or liquid CO2 at high-pressures prior to final discharge into an Attached or Unattached CDAC Tank Car in a liquid state. The CO2 Main Reservoir has a structure that is comprised of both this interior domed wall as well as the similar, unseen (see FIG. 36) exterior dome of the rear end of the Enviro-Car together with the cylindrical circumference of a longitudinal portion of the Collection Chamber separating these two domed walls. The Outlet shown at the top of the Collection Chamber in this illustration is depicted as being a size that is relatively small when compared to the Rear Vent as a whole. This is only to observe the features and characteristics of the Collection Chamber and is not necessarily representative of an actual deployed embodiment. In reality, this Outlet would be much larger and much more similar to the interior dimensions of the Vent that surrounds it.

Figure 33:
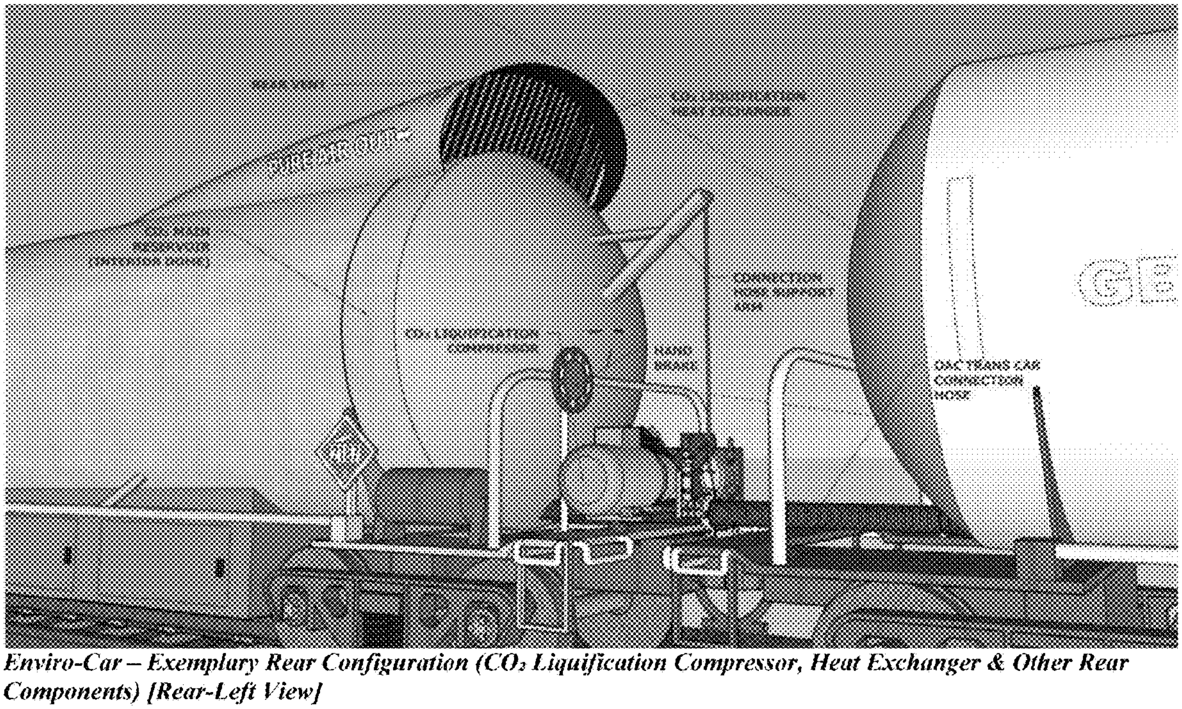
FIG. 33 shows an exemplary embodiment of the rear portion of the Enviro-Car.
Figure 34:
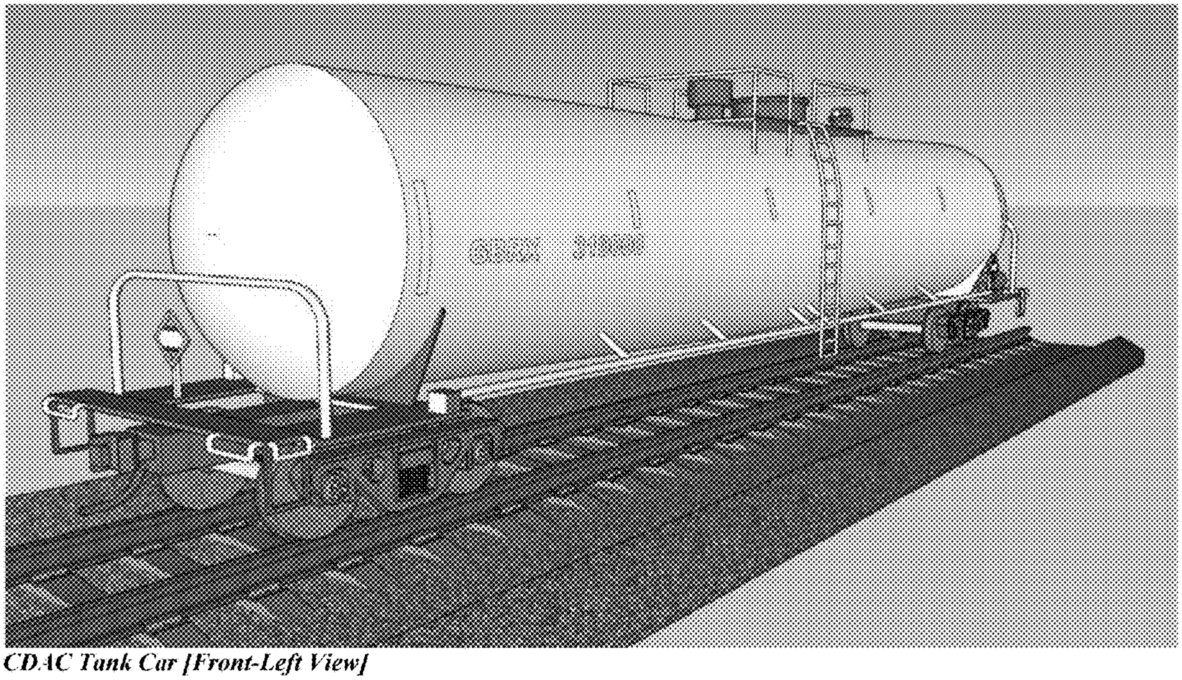
FIG. 34 shows an exemplary CDAC Tank Car.

FIG. 33 shows an exemplary embodiment of the rear portion of the Enviro-Car. Here we observe the domed exterior wall of the CO2 Main Reservoir and the equipment necessary to liquefy and transfer the recovered CO2 into the Attached CDAC Tank Car, shown in FIG. 34. This rear-mounted CO2 Liquification Compressor would both further compress and then cool the contents of the CO2 Main Reservoir into a liquid state utilizing the Rear Vent Heat Exchanger prior to final Enviro-Car to CDAC Tank Car offloading. In an alternate embodiment the contents of CO2 Main Reservoir may be cooled by an unseen evaporator and cooling compressor unit that utilizes the Rear Vent Heat Exchanger. This in conjunction with the Front Compartment CO2 Compressor incrementally increasing the overall pressure within the CO2 Main Reservoir during desorption cycles, would have the effect of bringing most of the contents of the CO2 Main Reservoir into a pre-discharge liquid state. In this alternative embodiment the rear-mounted CO2 Liquification Compressor could take the form of a smaller liquid CO2 transfer pump to achieve final Enviro-Car to CDAC Tank Car off-loading.

Figure 35:
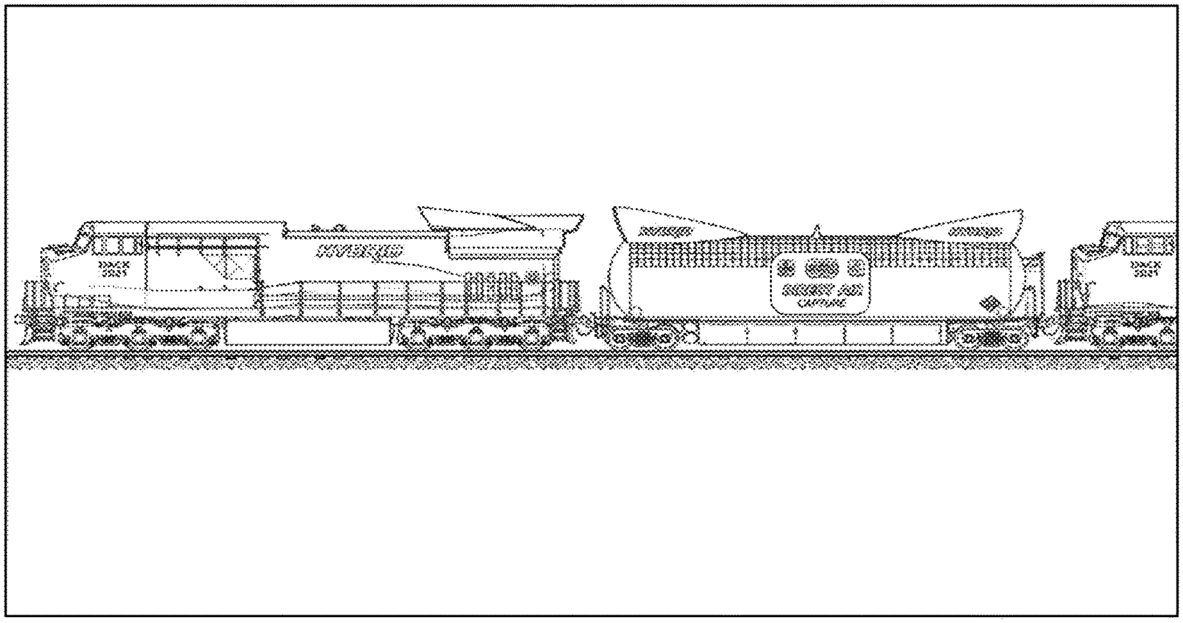
FIG. 35 shows a front-right view of an exemplary embodiment of an Enviro-Rail Consist in "Lite-Deployment."

FIG. 35 shows a front-right view of an exemplary embodiment of an Enviro-Rail Consist in "Lite-Deployment" where there are only two attached CDAC-Cars and no LEDA or LETA installed upon the ERDB Locomotive.

Figure 36:
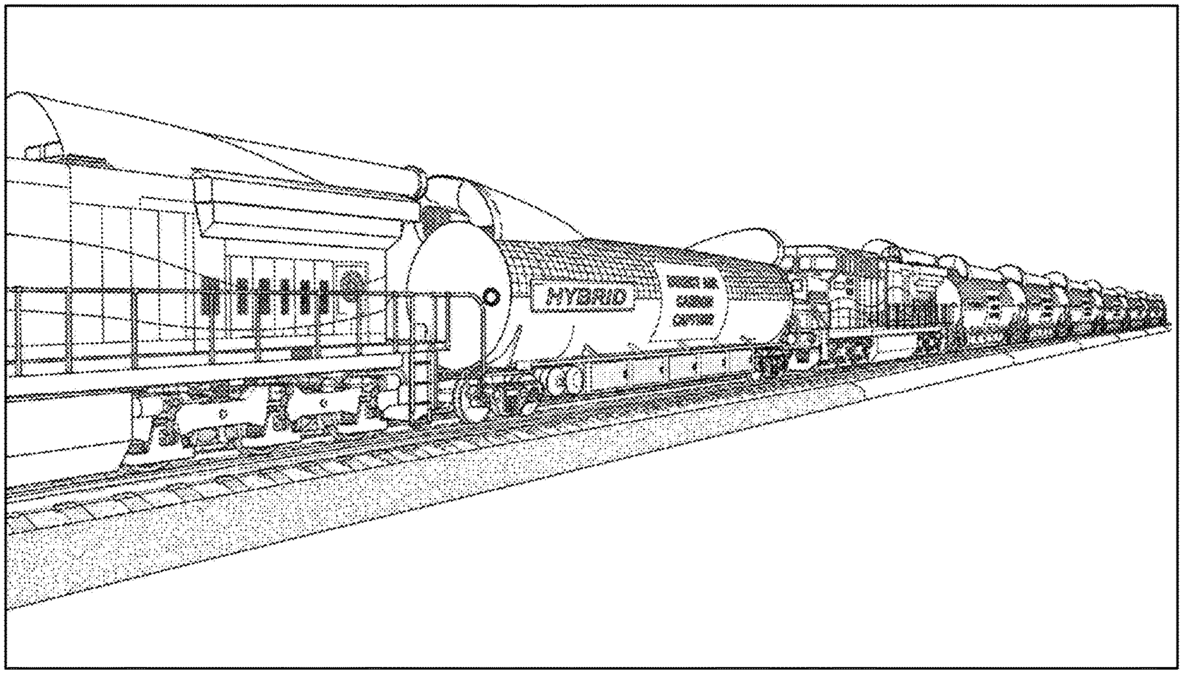
FIG. 36 shows a front-left view of an exemplary embodiment of an Enviro-Rail Consist in "Moderate-Deployment."

FIG. 36 shows a front-left view of an exemplary embodiment of an Enviro-Rail Consist in "Moderate-Deployment" where there are two ERDB Locomotives, two attached LEM-Cars, one attached UEM Car and three attached CDAC-Cars.

Figure 37:
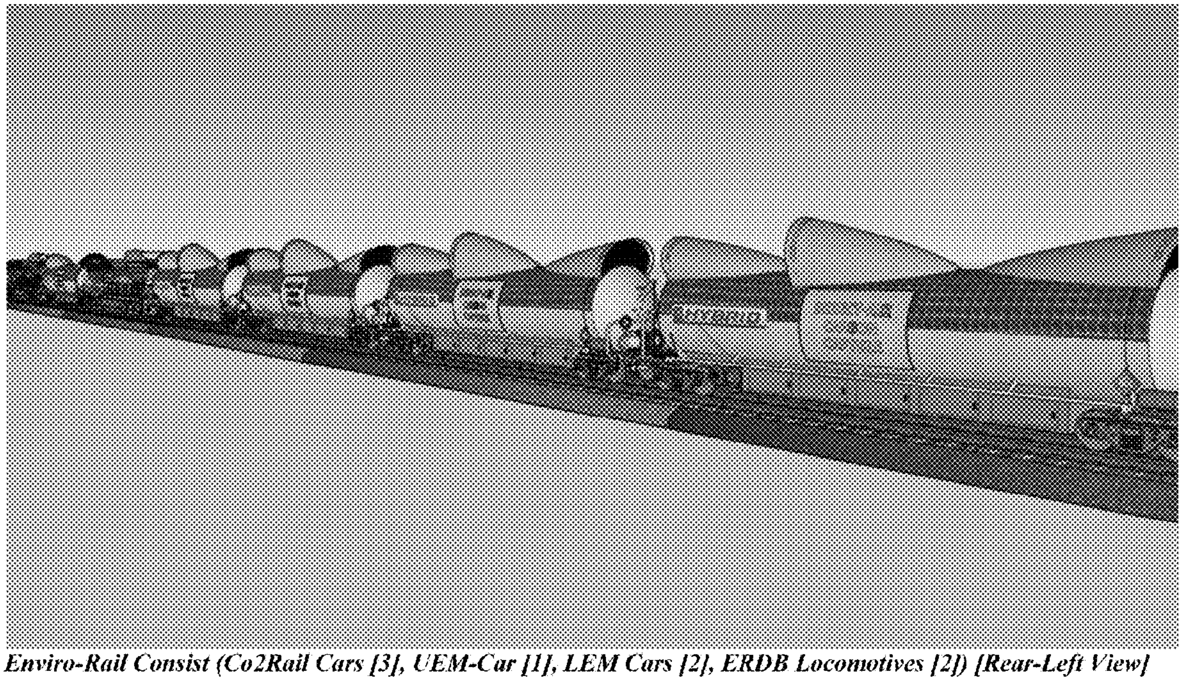
FIG. 37 shows a rear-left view of an exemplary embodiment of an Enviro-Rail Consist in "Moderate-Deployment."

FIG. 37 shows a rear-left view of an exemplary embodiment of an Enviro-Rail Consist in "Moderate-Deployment" where there are three attached CDAC-Cars, one attached UEM Car, two attached LEM-Cars, and two ERDB Locomotives.

While not shown for purposes of clarity throughout the illustrations, there is a vast network of pumps, pipes, valves, hoses, tanks and/or other such components which route both gases and liquids to or from their designated design performance locations during the operation of the DAC Consist.

While not shown for purposes of clarity throughout the illustrations, there is a vast array of cables, wires, connectors, harnesses, conduits, relays, interlocks, rectifiers, inverters, motors, pumps, automatic valves, compressors, heating elements, charging systems, discharging systems, current modulators, sensors, alerting systems, lights, telemetry systems, consoles, human interface devices and/or other such components which pertain to the electrical and various control system's design.

Systems, components, equipment, parts, processes, materials and/or entire cars are only exemplary in these illustrations and there may be more, less or different than shown as required by the particular process or method so utilized at that time. In exemplary embodiments, the following methodology is used:

a. Connect the Enviro-Car to the rear of ERDB Locomotive(s) and connect the Dynamic Brake Power Cable Umbilical and Train brake air hoses to the Enviro-Car.

b. Connect additional Enviro-Car(s) to the rear of the first Enviro-Car and connect the appropriate cables and hoses if a multiple Enviro-Car deployment is desired.

c. Connect the CO Tank Car to the rear of the Enviro-Car(s) and connect the CO2 Connection Hose, Railcar-Mounted Photovoltaic Cells connection and Train brake air hoses to the CDAC Tank Car.
d. Connect all additional regular revenue service railcars comprising the Train to the rear of the CDAC Tank Car and attach the Railcar-Mounted Photovoltaic Cells connection and Train brake air hoses.
e. Power on the Enviro-Car and set to automatic operation.
f. The Enviro-Car is powered by residual Battery Array power until the Enviro-Car is set into motion with the Train and the ERDB Locomotive has activated a Dynamic Braking operation cycle.
g. Set the Locomotive(s) attached to the Enviro-Car, CDAC Tank Car and the multitude of other normal and customary railcars into motion.
h. CDAC-Car automatically begins an CO2 absorption cycle by taking ambient air in through its Front Air Intake and passing such through the SAM Cells so utilized at that time.
i. Either continuously (i.e. Rotary DAC) or when necessary, the CDAC-Car automatically initiates a Desorption Cycle which purges the captured CO2 from the SAM Cells where it is then compressed, cooled and liquified.
j. Continue these absorption/desorption cycles continuously so long as certain conditions are met such as being kept in forward motion, having sufficient power and water reserves and having sufficient CO2 Tank Car storage capacity.
k. Continue these absorption/desorption cycles intermittently if certain conditions are not met such as being kept in forward motion or having sufficient power reserves but resume once conditions allow.
l. As the Enviro-Rail Vehicle Consist of one or more Enviro-Cars is transported in-motion behind the Locomotive Consist in a regular revenue service Train, a significant amount of ambient air is taken in by the Intake Vent at a nominal velocity of up to 69 miles per hour. This air travels down and through Collection Chamber where it makes contact with the SAM Cells and a portion of the ambient Carbon Dioxide is taken up by the media in the chemical process so thereto applicable to that particular type of SAM Cells being deployed at that time. After a period of time of mere seconds, that volume of air—minus the partial pressure of the adsorbed CO2—then exits the Collection Chamber after traveling up the Rear Air Ramp and then is discharged back into the atmosphere by the Rear Outlet—with as much as 90% of its previous Carbon Dioxide load concentration having been removed and isolated by the SAM Cells.
m. While it is easiest to understand this technology with the imagining of the Collection Chamber housing a single large SAM Cell array extending longitudinally front to back, this most likely would not be the most ideal or efficient arrangement. For instance, if SAM Cell technology improves to the point that, say, two feet of SAM Media is all that is required to remove the majority of Carbon Dioxide from a volume of air with a given velocity, multiple SAM Cell arrays would be greatly preferred to a single. In that case, the Collection Chamber could be ducted and/or subdivided to allow full CO2 absorption of, say, twenty different volumes of air or have twenty different longitudinal or lateral SAM Cell Array air application points rather than over-adsorbing only one volume of air contained within a single Collection Chamber with a single SAM Cell Array. In this case, the front part of the media might contain the majority of adsorbed CO2 and media absorption rates would decrease to minimal as the Intake Air travels back through the media due to concentration of CO2 now being far diminished. In summary, as improvements in DAC Media technology and methods occur, the length of SAM Cells required for exposure to a given volume of air in the Collection Chamber can be reduced and multiples of separate SAM Cell arrays can be deployed with multiple air inlets, bulkheads and/or ducting. This would, thereby, multiply the overall CDAC-Car Carbon Dioxide absorption rates by a similar factor.
n. It is estimated that this adsorption process can continue uninterrupted for between 15-45 minutes before the SAM Cells reach their saturation point. This saturation point in time will vary based upon a number of factors such the type and efficiency of the particular SAM Cells being deployed at that time, number of SAM Cells being deployed at that time, configuration of the variable Intake Vent, configuration of the SAM Cells within the Collection Chamber, ambient air temperature, ambient air pressure, average forward speed of the Train, etc. This saturation point will be measured on a running basis by an appropriate CO2 concentration measuring device and will be continually reported to the DAC Control System without the need for Human monitoring or intervention.
o. When the DAC Control System determines that an optimal CO2 saturation point has been reached by the SAM Cells and the point of diminishing marginal utility will soon be surpassed, the Desorption Process will be automatically initiated.
p. The Desorption Process first begins with the DAC Control System implementing the mechanical process of closing the Front Intake and Rear Vent Vacuum Doors. This process will take approximately 30-60 seconds to complete.
q. After these doors are fully closed, the DAC Control System will then initiate the operation of the Vacuum Pump(s) to evacuate the ambient air from the Collection Chamber. This process will take between 5-10 minutes to substantially evacuate the ambient air in order to create a sufficient vacuum to both potentiate the desorption process and also to ensure the highest purity of CO2 output.
r. During the period of time that the Vacuum is being created, the DAC Control System will, in this exemplary case, initiate the pre-discharge operation state of the Steam Generators and the super-heating of the appropriate water reserve volume while under pressure. After a sufficient vacuum is created in the Collection Chamber the DAC Control System will then initiate the discharge operation state of the of the Steam Generator (s) and the opening of the Steam Output Valve to flood the Collection Chamber with this superheated, high-pressure water vapor. This process will take approximately 2-3 minutes to complete and bring the entire Collection Chamber up to the optimal temperature to potentiate the Desorption Process.
s. Once the ideal Desorption Temperature has been reached, the SAM Cells will begin to desorb and release their saturation of Carbon Dioxide back into the now sealed Collection Chamber. Once this begins, the DAC Control System will initiate the operation of the CO2 Compressor(s) to begin the evacuation of the CO2 and the non-condensed water vapor from the Collection Chamber. After compression, this volume of CO2 and Water will be routed into the Air Dryer located in the Front Compartment of the DAC/LEM-Car.

t. Since now in a compressed state, the once water vapor will have condensed out of the gas volume and settle at the bottom of the Air Dryer reservoir tank. Once a sufficient volume of this nearly 100% pure distilled water is reached within the Air Dryer reservoir tank, an under-tank automatic drain valve will open and route the pressurized water volume back into the Water Reservoir Tank (located directly beneath in the under-carriage of the DAC/LEM-Car) until the water is fully drained and the under-tank automatic drain valve will then close. Since a significant volume of water has now been discharged, compression can continue uninterrupted before the maximum operating pressure is reached within the Air Dryer reservoir tank.

u. After approximately three Drain Cycles, at a point prior to the maximum operating pressure being reached within the Air Dryer and after the water volume has been completely drained, the DAC Control System will initiate the operation of an automatic valve which will open the reservoir volume of nearly pure Carbon Dioxide Gas to either, some or all of the following:
  i. Front Intake Heat Exchanger (if so equipped).
  ii. The energy-recapturing Steam Generator water reservoir Heat Exchanger (if so equipped).
  iii. The second stage of the CO2 Compression Pump for liquification (if so equipped).
  iv. To the rear of the vehicle and into the CO2 Reservoir Tank for temporary staging prior to liquification (if so equipped).
  v. To the Rear Vent Heat Exchanger (if so equipped).
  vi. To the Rear CO2 Liquification Compressor (if so equipped).

v. After appropriate compression, cooling and/or liquification, the captured and liquified CO2 is either temporarily stored in the CO2 Main Reservoir or off-loaded from the DAC/LEM-Car and discharged into the CDAC Tank Car for short-term storage and transportation to the final sequestration destination and/or for use in other processes.

w. As improvements in DAC absorption technology are on-going and it is anticipated that this trend will continue into the future, it is important for any Enviro-Rail Technology to be modular and easily upgradable. The particular process, method or manufacturing techniques to be used in production may be improved from time to time. The Enviro-Rail technology described herein does just that and allows for the components, equipment, parts and even complete configurations to be changed, upgraded, added and removed as necessary as other technologies are proven out or change over time.

x. An ideal deployment of this technology would have different configurations of Enviro-Cars being used on different rail routes with differing speed, geography or other characteristics. For instance, since those configurations requiring higher Regenerative Braking Energy inputs might be best deployed in mountainous or frequent-stop rail routes such as those in the American West or Eastern States.

y. Daily servicing of the Enviro-Rail Consist at fueling and/or crew change stops would entail the emptying the held contents of the CO2 Main Reservoir into a Non-Attached CO2 Tank Car, refilling the water reservoir tanks with fresh water and/or perhaps switching out any Attached CDAC Tank Car with another if the capacity of the then attached car will soon be reached.

z. Once the SAM Cells have reached the extent of their useful life, the Enviro-Car is brought into an existing maintenance facility where the depleted SAM Cells are removed and replaced with fresh. Depending on the particular DAC process or method so utilized at that time these depleted SAM Cells may either be properly disposed of, recycled or returned to the manufacturer for refurbishment.

aa. An ideal deployment of this technology on Class-One (National) Railroads would have the host railroad attempt to anticipate when an Attached CDAC Tank Car will achieve its full capacity and have that car routed near the general vicinity of its final sequestration point—thereby minimizing non-productive CDAC Tank Car transportation costs and indirect environmental impact. For instance, if it is anticipated that a CDAC Tank Car in service on a particular DAC Consist located near Chicago, IL will reach capacity within four days, that car would, ideally, be routed on another DAC Consist heading to the ultimate sequestration point in, say, Texas. Thereby, after that consist reaches Texas, this particular CDAC Tank Car would be at capacity and is switched out in the destination yard and added to other full CDAC Tank Cars that would ultimately comprise a full or partial Train sent to the final sequestration point, in this case, a spent oil well in the Texas oil fields drilled into deep shale that possesses minimal chance of future leakage back into the atmosphere.

bb. Exemplary embodiments of the invention herein result in a reduction of ambient CO2 from the atmosphere and an inventory of highly pure Carbon Dioxide gas for sequestration or other such purposes.

Any and all estimates, forecasts, predictions, projections and/or forward-looking statements contained herein are for informational purposes only, exemplary in nature and contingent upon a variety of factors—both known and unknown. Any such statements are not intended to limit the scope or language of any future claims in any way nor is it the intention of the applicants to restrict or in any way limit the scope of the invention to such details. Therefore, the inventive concept, in its broader aspects, is not limited to these specific details. Accordingly, departures may be made from such details without departing from the spirit or scope of the applicant's general inventive concept.

The embodiments described herein are only exemplary and not intended to limit the scope or language of any future claims in any way which will have all of their full ordinary meanings. While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the sorbent aeration media need not be of the type or category as described herein. Indeed, the Enviro-Rail system can be easily adapted, changed or upgraded mid-stream to capitalize upon improvements or prove-outs in current media technologies and even those anticipated in the future. As another example, although certain desorption processes are discussed herein such as heat, pressure, vacuum or humidity, the application is not limited to these and could just as easily utilize other methods of desorption. Many benefits from this technology would be obtained by deploying other form factors of the Enviro-Car besides the ones described herein by using any of the related systems and methods (e.g., ambient air intake through slipstream of moving Train, capturing and utilizing the Regenerative Dynamic Braking, Train Solar Array Energy and/or other power methods, utilizing Rail Equipment to mitigate air-pollution, etc.). In this broader context, the terms Enviro-Rail, Enviro-Car, CDAC-Car, LEM-Car, UEM-Car, etc. can mean any of these technologies and the terms can be thought of as a manufacturing site. As another example, the steps of all processes and methods herein can be performed in any order, unless two or more steps are expressly stated as being performed in a particular order, or certain steps inherently require a particular order. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A train comprising:

an energy capture system for generating electrical power;

a locomotive; and a carbon capture train car that is separably connected to the locomotive via a coupler, the carbon capture train car comprising:

an intake comprising an opening that extends into a slipstream of the train, wherein the opening is configured to receive ambient air from a slipstream of the train;

a carbon capture system in fluid communication with the intake, the carbon capture system comprising a collection chamber, a desorption chamber, and a compressor;

an energy storage device for storing electrical power received from the energy capture system via a power transfer interface and for providing electrical power to the carbon capture system; and a carbon dioxide storage container for storing carbon dioxide compressed by the compressor of the carbon capture system.

2. The train of claim 1, wherein the energy capture system is a regenerative braking system.

3. The train of claim 1, wherein the energy capture system comprises a solar panel array for providing electrical power to the energy storage device.

4. The train of claim 1, wherein the energy storage device comprises at least one of a battery, a fly wheel, a fuel cell, and a capacitor.

5. A train comprising:

an energy capture system for generating electrical power;

a locomotive comprising an internal combustion engine and an exhaust for expelling exhaust gasses from the internal combustion engine; and a carbon capture train car that is separably connected to the locomotive via a coupler, the carbon capture train car comprising:

an intake comprising an opening configured to receive a stream of the exhaust gasses from the exhaust of the locomotive, the exhaust gasses comprising carbon dioxide and pollutants;

a carbon capture system in fluid communication with the intake, the carbon capture system comprising a collection chamber, a desorption chamber, and a compressor;

an energy storage device for storing electrical power received from the energy capture system via a power transfer interface and for providing electrical power to the carbon capture system; and a carbon dioxide storage container for storing carbon dioxide compressed by the compressor of the carbon capture system;

wherein the intake of the carbon capture train car is configured to capture ambient air from a slipstream of the train, and wherein the ambient air is mixed with the exhaust gasses of the locomotive prior to the exhaust gasses flowing into the collection chamber.

6. The train of claim 2, wherein the regenerative braking system is arranged in the locomotive.

7. The train of claim 1, further comprising a pump for reducing a collection chamber pressure of the collection chamber.

8. The train of claim 1, further comprising an outlet valve in fluid communication with the carbon dioxide storage container for dispensing the stored carbon dioxide from the carbon dioxide storage container during a scheduled stop of the train.

9. The train of claim 1, wherein the intake comprises a fan configured to increase a flow rate of the ambient air through the intake.

10. The train of claim 1, wherein the opening of the intake faces toward a front of the carbon capture train car.

11. The train of claim 5, wherein the energy capture system is a regenerative braking system.

12. The train of claim 5, wherein the energy capture system comprises a solar panel array for providing electrical power to the energy storage device.

13. The train of claim 5, wherein the energy storage device comprises at least one of a battery, a fly wheel, a fuel cell, and a capacitor.

14. The train of claim 11, wherein the regenerative braking system is arranged in the locomotive.

15. The train of claim 5, further comprising a pump for reducing a collection chamber pressure of the collection chamber.

16. The train of claim 5, further comprising an outlet valve in fluid communication with the carbon dioxide storage container for dispensing the stored carbon dioxide from the carbon dioxide storage container during a scheduled stop of the train.

17. The train of claim 5, further comprising an exhaust transfer interface for transferring exhaust gasses of the locomotive from the exhaust of the locomotive to the intake of the carbon capture train car.

18. A train comprising:

an energy capture system for generating electrical power;

a locomotive comprising an internal combustion engine and an exhaust for expelling exhaust gasses from the internal combustion engine; and a carbon capture train car that is separably connected to the locomotive via a coupler, the carbon capture train car comprising:

an intake comprising an opening configured to receive a stream of the exhaust gasses from the exhaust of the locomotive, the exhaust gasses comprising carbon dioxide and pollutants;

an exhaust transfer interface for transferring exhaust gasses of the locomotive from the exhaust of the locomotive to the intake of the carbon capture train car, wherein the exhaust transfer interface comprises an intake opening and a discharge opening, and wherein the discharge opening of the exhaust transfer interface is spaced apart from the intake of the carbon capture train car;

a carbon capture system in fluid communication with the intake, the carbon capture system comprising a collection chamber, a desorption chamber, and a compressor;

an energy storage device for storing electrical power received from the energy capture system via a power transfer interface and for providing electrical power to the carbon capture system; and a carbon dioxide storage container for storing carbon dioxide compressed by the compressor of the carbon capture system.

19. The train of claim 18, wherein the intake opening of the exhaust transfer interface is larger than the discharge opening of the exhaust transfer interface.

* * * * *